(12) United States Patent
Mendoza et al.

(10) Patent No.: US 6,738,886 B1
(45) Date of Patent: *May 18, 2004

(54) METHOD AND SYSTEM FOR AUTOMATICALLY DISTRIBUTING MEMORY IN A PARTITIONED SYSTEM TO IMPROVE OVERALL PERFORMANCE

(75) Inventors: Dwight Anthony Mendoza, Yorktown Heights, NY (US); David Z. Schnee, East Meadow, NY (US)

(73) Assignee: Barsa Consulting Group, LLC, Purchase, NY (US)

( * ) Notice: Subject to any disclaimer, the term of this patent is extended or adjusted under 35 U.S.C. 154(b) by 134 days.

This patent is subject to a terminal disclaimer.

(21) Appl. No.: 10/121,172

(22) Filed: Apr. 12, 2002

(51) Int. Cl.[7] .............................................. G06F 12/08
(52) U.S. Cl. ...................................................... 711/173
(58) Field of Search ................................ 711/147, 153, 711/154, 170, 173

(56) References Cited

U.S. PATENT DOCUMENTS

| | | |
|---|---|---|
| 5,659,786 A | 8/1997 | George et al. |
| 5,784,702 A | 7/1998 | Greenstein et al. |
| 6,223,202 B1 | 4/2001 | Bayeh |
| 6,247,109 B1 | 6/2001 | Kleinsorge et al. |
| 6,260,068 B1 | 7/2001 | Zalewski et al. |
| 6,279,098 B1 | 8/2001 | Bauman et al. |
| 6,366,945 B1 * | 4/2002 | Fong et al. .................. 709/104 |
| 6,438,573 B1 | 8/2002 | Nilsen |
| 6,453,392 B1 | 9/2002 | Flynn, Jr. |
| 6,625,638 B1 * | 9/2003 | Kubala et al. ............... 709/105 |

FOREIGN PATENT DOCUMENTS

WO    WO 01/23974    4/2001

* cited by examiner

Primary Examiner—Kevin L. Ellis
(74) Attorney, Agent, or Firm—Brown, Raysman, Millstein, Felder & Steiner LLP

(57) ABSTRACT

A system and method for automatically reallocating resources among partitions based on factors including relative resource pain rates and user assigned priority. A tuner executes several tasks, including determining relative memory pain rates for partitions and allocating memory among partitions so that future relative memory pain rates obtained after the allocation will be more evenly distributed among the partitions than current relative memory pain rates are distributed. Also, the tuner determines current relative processor and interactive pain rates for partitions and allocates processor and interactive power among these partitions so that future relative processor and interactive pain rates obtained after the allocation will be more evenly distributed among the partitions than current relative processor and interactive pain rates are distributed. Also, the tuner creates a table showing, for a given system configuration, processor and interactive power amounts that may be validly allocated in combination to a partition.

24 Claims, 39 Drawing Sheets

Table 1

| Disk Characteristics | | Weight |
|---|---|---|
| Basic ASP | Unprotected | Uncompressed | 1.00 |
| Basic ASP | Unprotected | Compressed | 0.80 |
| Basic ASP | Mirrored | Uncompressed | 1.20 |
| Basic ASP | Mirrored | Compressed | 0.96 |
| Basic ASP | RAIDed | Uncompressed | 0.80 |
| Basic ASP | RAIDed | Compressed | 0.64 |
| Independent ASP | Unprotected | Uncompressed | 0.50 |
| Independent ASP | Unprotected | Compressed | 0.40 |
| Independent ASP | Mirrored | Uncompressed | 0.60 |
| Independent ASP | Mirrored | Compressed | 0.48 |
| Independent ASP | RAIDed | Uncompressed | 0.40 |
| Independent ASP | RAIDed | Compressed | 0.32 |

Fig. 3

| Col./Row | 1 | 2 | 3 | 4 | 5 | 6 | 7 | 8 | 9 | 10 | 11 | 12 |
|---|---|---|---|---|---|---|---|---|---|---|---|---|
| | Partition Number | Assigned Priority | Relative Priority | Current Pain Rate | Current Relative Pain Rate | Current Resource | Target Resource | Final Resource | Final Pain Rate | Memory Gain | Memory Loss | Final Relative Pain Rate |
| 1 | 1 | 10 | 2 | 20 | 40 | 200 | 370.37 | 244.90 | 16.33 | 44.90 | | 32.67 |
| 2 | 2 | 10 | 2 | 15 | 30 | 8000 | 11111.11 | 7346.94 | 16.33 | | 653.06 | 32.67 |
| 3 | 3 | 20 | 1 | 50 | 50 | 200 | 462.96 | 306.12 | 32.67 | 106.12 | | 32.67 |
| 4 | 4 | 10 | 2 | 23 | 46 | 250 | 532.41 | 352.04 | 16.33 | 102.04 | | 32.67 |
| 5 | 5 | 0 | - | 0 | - | 100 | 756.18 | 500.00 | 0.00 | 400.00 | | - |
| 6 | | 50 | | 108 | | 8750 | 13233.03 | 8750.00 | 81.67 | | | |
| 7 | | Average current pain rate = | | 21.60 | | | Final average pain rate = | | 16.33 | | | |

Fig. 7

| Col./Row | 1 | 2 | 3 | 4 | 5 | 6 | 7 | 8 | 9 | 10 | 11 | 12 |
|---|---|---|---|---|---|---|---|---|---|---|---|---|
| | Partition Number | Partition Type | Assigned Priority | Relative Priority | Current Proc. Pain Rate | Current Rel. Proc. Pain Rate | Current Int. Pain Rate | Current Rel. Int. Pain Rate | Current Proc. Res. | Current Int. Res. | Target Proc. Res. | Target Int. Res. |
| 1 | 1 | S | 10 | 2 | 75 | 150 | 75 | 150 | 8.00 | 14 | 27.78 | 40 |
| 2 | 2 | S | 10 | 2 | 100 | 200 | 50 | 100 | 7.00 | 8 | 32.41 | 15 |
| 3 | 3 | P | 20 | 1 | 25 | 25 | 20 | 20 | 3.00 | 16 | 1.74 | 6 |
| 4 | 4 | P | 10 | 2 | 1 | 2 | 95 | 180 | 3.00 | 31 | 0.14 | 113 |
| 5 | 5 | P | 10 | 2 | 15 | 30 | 20 | 40 | 3.00 | 31 | 2.08 | 24 |
| 6 | | | 60 | | 216 | | 260 | | 24.00 | 100 | 64.14 | 199 |

Average Current Processor Pain Rate = 43.20
Average Current Interactive Pain Rate = 52.00

| Col./Row | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|
| | Ideal Proc. Res. | Ideal Int. Res. | Rule Proc. Res. | Rule Int. Res. | Table Proc. Res. | Table Int. Res. | Final Proc. Res. | Final Int. Res. | Final Proc. Pain Rate | Final Int. Pain Rate | Proc. Gain | Proc. Loss | Int. Gain | Int. Loss | Final Rel. Proc. Pain Rate | Final Rel. Int. Pain Rate |
| 1 | 10.39 | 20 | 10.39 | 21 | 10.39 | 21 | 10.46 | 20 | 57.34 | 51.50 | 2.46 | | 6 | | 114.68 | 103.00 |
| 2 | 12.13 | 8 | 12.13 | 8 | 10.44 | 10 | 10.51 | 10 | 66.57 | 41.20 | 3.51 | | 2 | | 133.15 | 82.40 |
| 3 | 0.65 | 3 | 1 | 3 | 1 | 3 | 1.01 | 3 | 74.47 | 109.87 | | 1.99 | | 13 | 74.47 | 109.87 |
| 4 | 0.05 | 57 | 1 | 57 | 1 | 57 | 1.01 | 55 | 2.98 | 53.22 | | 1.99 | 24 | | 5.96 | 106.43 |
| 5 | 0.78 | 12 | 1 | 12 | 1 | 12 | 1.01 | 12 | 44.68 | 53.22 | | 1.99 | | 19 | 89.36 | 106.43 |
| 6 | 24.00 | 100 | 25.52 | 101 | 23.83 | 103 | 24.00 | 100 | 246.04 | 309.00 | | | | | | |

Final Average Processor Pain Rate = 49.21
Final Average Interactive Pain Rate = 61.80

Fig. 12A

| Col./Row | 15 Rule Proc. Res. | 16 Rule Int. Res. | 17 Table Proc. Res. | 18 Table Int. Res. | 19 Final Proc. Res. | 20 Final Int. Res. | 21 Final Proc. Pain Rate | 22 Final Int. Pain Rate | 23 Proc. Gain | 24 Proc. Loss | 25 Int. Gain | 26 Int. Loss | 27 Final Rel. Proc. Pain Rate | 28 Final Rel. Int. Pain Rate |
|---|---|---|---|---|---|---|---|---|---|---|---|---|---|---|
| 1 | 10.46 | 20 | 10.46 | 20 | 10.50 | 20 | 57.12 | 52.50 | 2.50 | | 6 | | 114.24 | 105.00 |
| 2 | 10.51 | 11 | 10.44 | 11 | 10.48 | 11 | 66.77 | 36.36 | 3.48 | | 3 | | 133.54 | 72.73 |
| 3 | 1 | 3 | 1 | 3 | 1.00 | 3 | 74.69 | 106.67 | | 2.00 | | 13 | 74.69 | 106.67 |
| 4 | 1 | 54 | 1 | 54 | 1.00 | 54 | 2.99 | 54.54 | | 2.00 | 23 | | 5.98 | 109.07 |
| 5 | 1 | 12 | 1 | 12 | 1.00 | 12 | 44.81 | 51.67 | | 2.00 | | 19 | 89.63 | 103.33 |
| 6 | 23.97 | 100 | 23.90 | 100 | 24.00 | 100 | 246.38 | 301.73 | | | | | | |

Final Average Processor Pain Rate = 49.28
Final Average Interactive Pain Rate = 60.35

Fig. 12B

| Col./Row | 15 Rule Proc. Res. | 16 Rule Int. Res. | 17 Table Proc. Res. | 18 Table Int. Res. | 19 Final Proc. Res. | 20 Final Int. Res. | 21 Final Proc. Pain Rate | 22 Final Int. Pain Rate | 23 Proc. Gain | 24 Proc. Loss | 25 Int. Gain | 26 Int. Loss | 27 Final Rel. Proc. Pain Rate | 28 Final Rel. Int. Pain Rate |
|---|---|---|---|---|---|---|---|---|---|---|---|---|---|---|
| 1 | 10.50 | 20 | 10.50 | 20 | 10.53 | 20 | 57.00 | 52.50 | 2.53 | | 6 | | 114.00 | 105.00 |
| 2 | 10.48 | 10 | 10.44 | 10 | 10.47 | 10 | 66.88 | 40.00 | 3.47 | | 2 | | 133.76 | 80.00 |
| 3 | 1.00 | 3 | 1 | 3 | 1.00 | 3 | 74.81 | 106.67 | | 2.00 | | 13 | 74.81 | 107.09 |
| 4 | 1.00 | 55 | 1 | 55 | 1.00 | 55 | 2.99 | 53.55 | | 2.00 | 24 | | 5.99 | 107.09 |
| 5 | 1.00 | 12 | 1 | 12 | 1.00 | 12 | 44.89 | 51.67 | | 2.00 | | 19 | 89.78 | 103.33 |
| 6 | 23.98 | 100 | 23.94 | 100 | 24.00 | 100 | 246.57 | 304.38 | | | | | | |

Final Average Processor Pain Rate = 49.31
Final Average Interactive Pain Rate = 60.88

| Col./Row | 15 Rule Proc. Res. | 16 Rule Int. Res. | 17 Table Proc. Res. | 18 Table Int. Res. | 19 Final Proc. Res. | 20 Final Int. Res. | 21 Final Proc. Pain Rate | 22 Final Int. Pain Rate | 23 Proc. Gain | 24 Proc. Loss | 25 Int. Gain | 26 Int. Loss | 27 Final Rel. Proc. Pain Rate | 28 Final Rel. Int. Pain Rate |
|---|---|---|---|---|---|---|---|---|---|---|---|---|---|---|
| 1 | 10.53 | 20 | 10.53 | 20 | 10.54 | 20 | 56.91 | 52.50 | 2.54 | | 6 | | 113.82 | 105.00 |
| 2 | 10.47 | 10 | 10.44 | 10 | 10.45 | 10 | 66.97 | 40.00 | 3.45 | | 2 | | 133.93 | 80.00 |
| 3 | 1.00 | 3 | 1 | 3 | 1.00 | 3 | 74.91 | 106.67 | | 2.00 | | 13 | 74.91 | 106.67 |
| 4 | 1.00 | 55 | 1 | 55 | 1.00 | 55 | 3.00 | 53.55 | | 2.00 | 24 | | 5.99 | 107.09 |
| 5 | 1.00 | 12 | 1 | 12 | 1.00 | 12 | 44.94 | 51.67 | | 2.00 | | 19 | 89.89 | 103.33 |
| 6 | 24.00 | 100 | 23.97 | 100 | 24.00 | 100 | 246.72 | 304.38 | | | | | | |

Final Average Processor Pain Rate = 49.34
Final Average Interactive Pain Rate = 60.88

Fig. 12E

| Col./Row | 15 Rule Proc. Res. | 16 Rule Int. Res. | 17 Table Proc. Res. | 18 Table Int. Res. | 19 Final Proc. Res. | 20 Final Int. Res. | 21 Final Proc. Pain Rate | 22 Final Int. Pain Rate | 23 Proc. Gain | 24 Proc. Loss | 25 Int. Gain | 26 Int. Loss | 27 Final Rel. Proc. Pain Rate | 28 Final Rel. Int. Pain Rate |
|---|---|---|---|---|---|---|---|---|---|---|---|---|---|---|
| 1 | 10.54 | 20 | 10.54 | 20 | 10.55 | 20 | 56.88 | 52.50 | 2.55 | | 6 | | 113.76 | 105.00 |
| 2 | 10.45 | 10 | 10.44 | 10 | 10.45 | 10 | 66.99 | 40.00 | 3.45 | | 2 | | 133.99 | 80.00 |
| 3 | 1.00 | 3 | 1 | 3 | 1.00 | 3 | 74.94 | 106.67 | | 2.00 | | 13 | 74.94 | 106.67 |
| 4 | 1.00 | 55 | 1 | 55 | 1.00 | 55 | 3.00 | 53.55 | | 2.00 | 24 | | 6.00 | 107.09 |
| 5 | 1.00 | 12 | 1 | 12 | 1.00 | 12 | 44.96 | 51.67 | | 2.00 | | 19 | 89.93 | 103.33 |
| 6 | 23.99 | 100 | 23.98 | 100 | 24.00 | 100 | 246.77 | 304.38 | | | | | | |

Final Average Processor Pain Rate = 49.35
Final Average Interactive Pain Rate = 60.88

| Col./Row | 15 Rule Proc. Res. | 16 Rule Int. Res. | 17 Table Proc. Res. | 18 Table Int. Res. | 19 Final Proc. Res. | 20 Final Int. Res. | 21 Final Proc. Pain Rate | 22 Final Int. Pain Rate | 23 Proc. Gain | 24 Proc. Loss | 25 Int. Gain | 26 Int. Loss | 27 Final Rel. Proc. Pain Rate | 28 Final Rel. Int. Pain Rate |
|---|---|---|---|---|---|---|---|---|---|---|---|---|---|---|
| 1 | 10.55 | 20 | 10.55 | 20 | 10.55 | 20 | 56.85 | 52.50 | 2.55 | | 6 | | 113.70 | 105.00 |
| 2 | 10.45 | 10 | 10.44 | 10 | 10.44 | 10 | 67.02 | 40.00 | 3.44 | | 2 | | 134.04 | 80.00 |
| 3 | 1.00 | 3 | 1 | 3 | 1.00 | 3 | 74.97 | 106.67 | | 2.00 | | 13 | 74.97 | 106.67 |
| 4 | 1.00 | 55 | 1 | 55 | 1.00 | 55 | 3.00 | 53.55 | | 2.00 | 24 | | 6.00 | 107.09 |
| 5 | 1.00 | 12 | 1 | 12 | 1.00 | 12 | 44.98 | 51.67 | | 2.00 | | 19 | 89.96 | 103.33 |
| 6 | 24.00 | 100 | 23.99 | 100 | 24.00 | 100 | 246.82 | 304.38 | | | | | | |

Final Average Processor Pain Rate = 49.36
Final Average Interactive Pain Rate = 60.88

Fig. 12F

| Col./Row | 15 Rule Proc. Res. | 16 Rule Int. Res. | 17 Table Proc. Res. | 18 Table Int. Res. | 19 Final Proc. Res. | 20 Final Int. Res. | 21 Final Proc. Pain Rate | 22 Final Int. Pain Rate | 23 Proc. Gain | 24 Proc. Loss | 25 Int. Gain | 26 Int. Loss | 27 Final Rel. Proc. Pain Rate | 28 Final Rel. Int. Pain Rate |
|---|---|---|---|---|---|---|---|---|---|---|---|---|---|---|
| 1 | 10.55 | 20 | 10.55 | 20 | 10.55 | 20 | 56.85 | 52.50 | 2.55 | | 6 | | 113.70 | 105.00 |
| 2 | 10.44 | 10 | 10.44 | 10 | 10.44 | 10 | 67.02 | 40.00 | 3.44 | | 2 | | 134.04 | 80.00 |
| 3 | 1.00 | 3 | 1.00 | 3 | 1.00 | 3 | 74.97 | 106.67 | | 2.00 | | 13 | 74.97 | 106.67 |
| 4 | 1.00 | 55 | 1.00 | 55 | 1.00 | 55 | 3.00 | 53.55 | | 2.00 | 24 | | 6.00 | 107.09 |
| 5 | 1.00 | 12 | 1.00 | 12 | 1.00 | 12 | 44.98 | 51.67 | | 2.00 | | 19 | 89.96 | 103.33 |
| 6 | 24.00 | 100 | 24.00 | 100 | 24.00 | 100 | 246.82 | 304.38 | | | | | | |

Final Average Processor Pain Rate = 49.36
Final Average Interactive Pain Rate = 60.88

Fig. 12G

Table 7A

| Record No. | Interactive Power (as % of Total System Interactive Power) | Compatible Processor Power Range (Shared Processors) ||
|---|---|---|---|
| | | Minimum Processor Power (as portions of processor) | Maximum Processor Power (as portions of processors) |
| 1 | 1 | 0.24 | 1.05 |
| 2 | 2 | 0.24 | 2.09 |
| 3 | 3 | 0.24 | 3.14 |
| 4 | 4 | 0.24 | 4.18 |
| ... | ... | ... | ... |
| 7 | 7 | 0.24 | 7.31 |
| 8 | 8 | 0.24 | 8.35 |
| 9 | 9 | 0.24 | 9.40 |
| 10 | 10 | 0.24 | 10.44 |
| 11 | 11 | 0.24 | 11.48 |
| 12 | 12 | 0.24 | 12.53 |
| 13 | 13 | 0.24 | 13.57 |
| ... | ... | ... | ... |
| 16 | 16 | 0.24 | 16.70 |
| 17 | 17 | 0.24 | 17.74 |
| 18 | 18 | 0.24 | 18.00 |
| 19 | 19 | 0.24 | 18.00 |
| 20 | 20 | 0.25 | 18.00 |
| 21 | 21 | 0.26 | 18.00 |
| 22 | 22 | 0.28 | 18.00 |
| ... | ... | ... | ... |
| 53 | 53 | 0.68 | 18.00 |
| 54 | 54 | 0.69 | 18.00 |
| 55 | 55 | 0.70 | 18.00 |
| 56 | 56 | 0.72 | 18.00 |
| 57 | 57 | 0.73 | 18.00 |
| ... | ... | ... | ... |
| 78 | 78 | 1.00 | 18.00 |
| 79 | 79 | 1.02 | 18.00 |
| 80 | 80 | 1.03 | 18.00 |
| ... | ... | ... | ... |
| 99 | 99 | 1.28 | 18.00 |
| 100 | 100 | 1.29 | 18.00 |

Fig. 13A

Table 7B

| Record No. | Interactive Power (as % of Total System Interactive Power) | Compatible Processor Power Range (Whole Processors) ||
| --- | --- | --- | --- |
| | | Minimum Processor Power (as no. of whole processors) | Maximum Processor Power (as no. of whole processors) |
| 1 | 1 | 1.00 | 1.00 |
| 2 | 2 | 1.00 | 2.00 |
| 3 | 3 | 1.00 | 3.00 |
| 4 | 4 | 1.00 | 4.00 |
| ... | ... | ... | ... |
| 7 | 7 | 1.00 | 7.00 |
| 8 | 8 | 1.00 | 8.00 |
| 9 | 9 | 1.00 | 9.00 |
| 10 | 10 | 1.00 | 10.00 |
| 11 | 11 | 1.00 | 11.00 |
| 12 | 12 | 1.00 | 12.00 |
| 13 | 13 | 1.00 | 13.00 |
| ... | ... | ... | ... |
| 16 | 16 | 1.00 | 16.00 |
| 17 | 17 | 1.00 | 17.00 |
| 18 | 18 | 1.00 | 18.00 |
| 19 | 19 | 1.00 | 18.00 |
| 20 | 20 | 1.00 | 18.00 |
| 21 | 21 | 1.00 | 18.00 |
| 22 | 22 | 1.00 | 18.00 |
| ... | ... | ... | ... |
| 53 | 53 | 1.00 | 18.00 |
| 54 | 54 | 1.00 | 18.00 |
| 55 | 55 | 1.00 | 18.00 |
| 56 | 56 | 1.00 | 18.00 |
| 57 | 57 | 1.00 | 18.00 |
| ... | ... | .. | .. |
| 78 | 78 | 1.00 | 18.00 |
| 79 | 79 | 2.00 | 18.00 |
| 80 | 80 | 2.00 | 18.00 |
| ... | ... | ... | ... |
| 99 | 99 | 2.00 | 18.00 |
| 100 | 100 | 2.00 | 18.00 |

Fig. 13B

METHOD AND SYSTEM FOR AUTOMATICALLY DISTRIBUTING MEMORY IN A PARTITIONED SYSTEM TO IMPROVE OVERALL PERFORMANCE

CROSS-REFERENCE TO RELATED APPLICATIONS

This application is related to a co-pending United States utility patent application, entitled "METHOD AND SYSTEM FOR AUTOMATICALLY MEASURING PARTITION MEMORY NEEDS IN A PARTITIONED COMPUTER SYSTEM", that was filed by inventors David Z. Schnee and Dwight A. Mendoza on Apr. 12, 2002 together with this application and which is incorporated by reference herein.

COPYRIGHT NOTICE

A portion of disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to methods for managing resources within a computer system. More particularly, the present invention relates to a system and method for managing resources within a computer system having multiple partitions.

Through logical partitioning, a physical computer system may be divided into two or more logical partitions ("LPARs"), each of which has a share of the physical system's resources and operates as an independent logical computer system within the physical system, having also, for example, its own operating system, user applications, data files, primary language, time of day, etc.

The share of resources allocated to a partition affects the performance of the logical system within that partition, and a lack of one or more resources, such as processor power or memory, may result in performance degradation. Also, since work loads, and consequently, resource needs, may change over time, one defined allocation of resources may not be effective for all situations. Thus, it is advantageous to be able to reallocate resources among partitions to address changes in work loads.

Currently available partitionable systems, such as the AS/400™ systems running the OS/400™ operating system, both from International Business Machines Corporation, support the dynamic reallocation of resources among partitions, e.g., without having to perform an initial program load ("IPL") afterwards, but do not provide sophisticated tools to execute such reallocations. Generally, dynamic reallocation of resources is performed either at the discretion of a human operator or automatically according to a schedule, e.g., automatically executing a preset resource reallocation based on assumed needs at predetermined times. The first technique is deficient in that it requires a human operator and is time consuming. The second technique, although not requiring an operator after the preset resource reallocations have been defined, has the drawback of reallocating resources based on assumed needs and not on current actual needs of the partitions.

Thus, there is a need for a system and method that automatically determines when partitions suffer performance degradation due to a lack of resources, and dynamically reallocates resources among the partitions to alleviate the identified performance degradation.

BRIEF SUMMARY OF THE INVENTION

It is an object of the present invention to provide a system and method that dynamically reallocates resources among partitions in a way that avoids the drawbacks described above.

It is another object of the present invention to provide a system and method that automatically determines when partitions suffer performance degradation due to a lack of resources and provides an indication of the level of need for resources.

It is another object of the present invention to provide a system and method that automatically and dynamically reallocates resources among partitions according to an indicated need for resources.

The above and other objects are achieved by a system and method for automatically reallocating resources ("tuning") among partitions based on factors including need for resources (e.g., as indicated by resource pain rates) and user assigned priority. The system includes a tuner, a storage, and partition interfaces for one or more partitions to be tuned. The partition interfaces continually obtain and store in the storage data from the partitions to be tuned regarding their performance with regard to resources, including memory, processor power, and interactive power. The tuner executes several tasks, including a validity table creation task, a memory tuning task, and a processor power and interactive power ("P/I") tuning task.

In the validity table creation task, for each allocatable amount of processor power, the tuner determines the minimum and maximum amounts of interactive power, if any, that can be validly allocated in combination with the respective allocatable amount of processor power. Then, for each allocatable amount of processor power for which can be determined both minimum and maximum amounts of interactive power that can be validly allocated in combination with the respective allocatable amount of processor power, the tuner adds an entry in a table, the entry including the respective allocatable amount of processor power and the minimum and maximum amounts of interactive power determined for the respective allocatable amount of processor power.

In the validity table creation task, the tuner creates a validity table useful for the P/I tuning task or which may be used by itself to allow someone, e.g., a system administrator, to manually tune processor power and interactive power across partitions. The validity table created through the validity table creation task shows, for a given system configuration, the amounts of processor power and interactive power that may be validly allocated in combination to a partition. The tuner executes the validity tables creation task to create a validity table at the time the tuner first starts or whenever the system configuration of processor and/or interactive resources have changed.

The memory tuning task may involve a method for managing the memory of a computer system including storage devices, computer processor power, and a plurality of partitions, where the memory, storage devices, and computer processor power of the computer system are distributively assigned among the plurality of partitions, and where the computer system uses the storage devices assigned to each partition to supplement the memory assigned to the respective partition. This method involves, for each of two or more partitions of the plurality of partitions, providing a first measurement related to the frequency with which storage devices assigned to the respective partition are used to supplement memory in the respective partition. Then, a second measurement is provided that is related to the efficiency with which the storage devices assigned to the respective partition supplement memory in the respective partition. Then, a third measurement is provided that is related to the rate at which the computer processor power assigned to the respective partition is used. Next, a memory pain value is calculated representing the degree to which computing performance in the respective partition is being degraded due to a lack of memory, the memory pain value being directly related to the first measurement and indirectly related to the second and third measurements. Finally, the first value is stored.

The memory tuning task may also involve a second method for managing the memory of a computer system having a plurality of partitions, where the memory of the computer system is distributively assigned among the plurality of partitions. This method involves obtaining, for each of two or more partitions of the plurality of partitions, a value that describes the degree to which computing performance in the respective partition is being degraded due to a lack of memory in relation to the other partitions of the two or more partitions. Then, memory is allocated among one or more of the two or more partitions so that future values expected to be obtained for each of the two or more partitions after the implementation will be more evenly distributed among each of the two or more partitions than the current values are distributed among each of the two or more partitions.

In the memory tuning task, the tuner may first determine the relative memory pain rates for each partition to be tuned. Then the tuner allocates memory among these partitions so that future relative memory pain rates expected to be obtained for each of these partitions after the allocation will be more evenly distributed among each of the partitions than the current relative memory pain rates are distributed among each of the partitions.

This allocation of memory may itself involve several steps. First, the tuner may create a memory allocation plan that provides a suggested memory change for the partitions, where the plan, if implemented, would cause future relative memory pain rates expected to be obtained for each of the partitions after the implementation to be more evenly distributed among each of the partitions than the current relative memory pain rates are distributed among each of the partitions. Second, the tuner may, for each suggested memory change, check the change against one or more rules and modify the change to conform to any rules that are violated. Third, the tuner may, adjust the suggested memory changes to accommodate available memory. Finally, the tuner may, cause the suggested memory changes to be implemented.

The procedure of causing the suggested memory changes to be implemented may also include a procedure that prepares a partition for memory to be removed so as to minimize the negative impact on performance that the memory removal might cause. This procedure involves, first, for each memory pool eligible for user adjustment, determining the amount of memory that can be removed (e.g., as determined by system limits). Then, for each such pool, memory is caused to be removed from the pool in proportion to the amount of memory that can be removed from the pool compared to the total amount of memory that may be removed from all eligible pools.

For the P/I tuning task, the tuner first determines the current relative processor pain rate and the current relative interactive pain rate for each partition to be tuned. Then the tuner allocates processor power and interactive power among these partitions so that future relative processor and interactive pain rates expected to be obtained for each of the partitions after the allocation will be more evenly distributed among each of the partitions than the current relative processor and interactive pain rates are distributed among each of the partitions.

This allocation of processor power and interactive power may itself involve several steps. First, the tuner may create a resource allocation plan that provides a suggested processor power and/or interactive power change for the partitions to be tuned, where the plan, if implemented, would cause future relative processor power pain rates and future relative interactive power pain rates expected to be obtained for each of these partitions after the implementation to be more evenly distributed among each of the partitions than the current relative processor power pain rates and current relative interactive power pain rates are distributed among each of the partitions. Second, the tuner may, for each suggested processor power change and each suggested interactive power change, check the change against one or more rules and modify the change to conform to any rules that are violated. Third, the tuner may, for each of the partitions, insure that the combination of any processor power and/or interactive power changes suggested for the respective partition are valid. Fourth, the tuner may adjust one or more suggested processor power and/or suggested interactive power changes to accommodate the total processor power and the total interactive power available for allocation. The tuner may iteratively perform the second, third, and fourth steps until each of the suggested processor power and interactive power changes that have been adjusted to accommodate available processor and interactive power are valid and in conformance with the one or more rules. Then, the tuner may cause to be implemented the suggested processor power and suggested interactive power changes that have been adjusted to accommodate available processor and interactive power. Prior to causing these suggested changes to be implemented, the tuner may perform a procedure that attempts to distribute any processor power or interactive power or both that remains unallocated.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 3 is a table showing example values that may be used for operations of the present invention;

FIG. 7 is a table in a spreadsheet layout showing an example memory allocation plan as used by the present invention;

FIGS. 12A–12G are tables in spreadsheet format examples values used to explain the operation of an operative embodiment of the present invention related to reallocation of processor power and interactive power;

FIGS. 13A and 13B are tables showing example interactive power amounts and their example corresponding valid processor power ranges;

DETAILED DESCRIPTION OF THE PREFERRED EMBODIMENTS

The preferred embodiments of a method, system, and article of manufacture containing software programs in accordance with the present invention is described with reference to the drawings in FIGS. 1–18.

Figure 1:
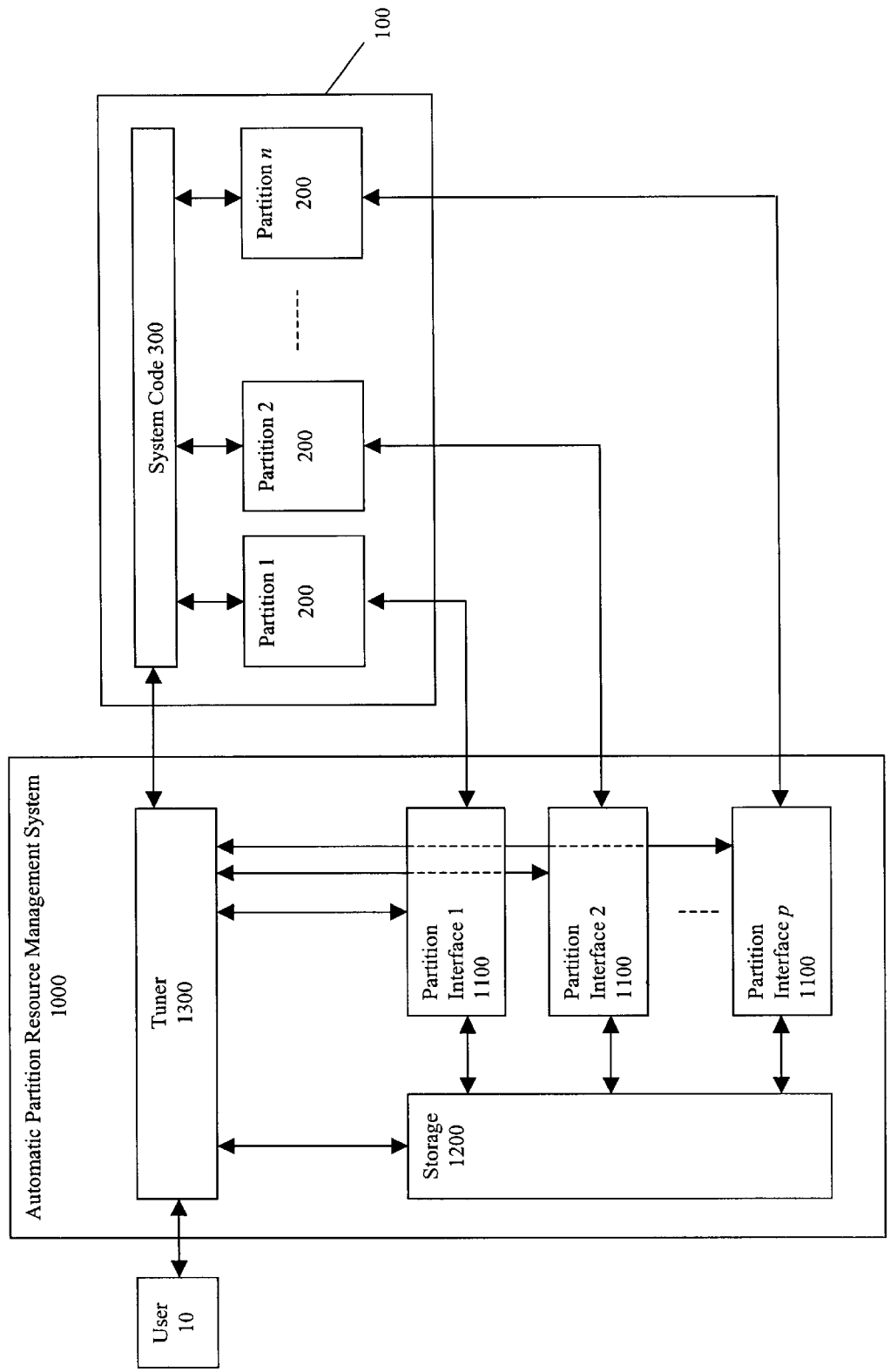
FIG. 1 is a block diagram showing an embodiment of the present invention.

FIG. 1 is a block diagram showing the structure and operating environment of an embodiment of the present invention. A physical computer system (or "System") 100 is divided into a plurality of logical partitions ("LPARs") 200, numbered 1 through n. Each LPAR may operate as an independent logical computer system within the physical system, and may have, for example, its own operating system, computer resources, primary language, time of day, user profiles, applications, and data files. The computer resources of the physical system, including, for example, processors (which may include portions of processors), memory, and storage devices (e.g., disks), are distributed among the partitions under the guidance and control of the System Computer Code (or "System Code") 300 (described below).

The term physical computer system is used broadly here to mean a single physical computer or a plurality of physical computers connected to and in communication with each other. For example, the physical computer system 100 may comprise a single AS/400™ computer system from International Business Machines Corporation or a plurality of AS/400™ systems connected in a cluster.

The System 100 operates with System Code 300, e.g., operating system and microcode, that supports partitioning, including the dynamic reallocation of resources among partitions. In addition, System Code 300 manages the System 100 main memory (RAM) together with the System 100 storage devices as a virtual storage system such that the storage devices are used to supplement main memory, such as, for example, by paging data into main memory from the storage devices when that data is required (e.g., when the data is addressed by an application) but is not at that time present in main memory. An example of system code capable of being used with the present invention is the OS/400™ V5R1 operating system from International Business Machines Corporation.

The Automatic Partition Resource Management System ("APRMS") 1000 of the present invention is a computer system that operates with a partitioned physical system 100, as described above, to (1) monitor the computing performance of one or more partitions of the physical system, (2) detect when the performance of one or more of these partitions suffers due to a lack of one or more computer resources, (3) provide an indication of the level of need for additional resources, and (4) automatically reallocate available resources among the partitions based on indicated need for the resource, which may also be referred to as tuning. The term computer system is used broadly here to mean computer hardware and software or computer software only. As shown in FIG. 1, the APRMS 1000 may comprise one or more partition interfaces ("PI") 1000, numbered 1 through p, Storage 1200, and a Tuner 1300.

The Partition Interfaces 1100 provide the means through which the APRMS 1000 communicates with and monitors the performance of partitions in the System 100, and may be implemented, for example, through computer code modules programmed to achieve these functions. The APRMS 1000 need not include a partition interface for each partition defined in the System 100, but only one interface corresponding to each partition whose share of resources (and consequently, performance) are to be automatically adjusted by the APRMS 1000. The number of partitions and the identity of the specific partitions whose share of resources are to be automatically adjusted by the APRMS 1000 is a matter of design choice for the implementer or user of the APRMS 1000. A partition designated by a user to have its resources automatically managed by the APRMS 1000 may be designated herein as an APRMS partition. Each PI 1100 is in communication with its corresponding partition 200 to obtain performance data concerning the computer resources subject to automatic adjusting by the APRMS 1000, e.g., processor and memory. Each PI 1100 also is in communication with Storage 1200 so that it may pass on the obtained performance data for storing in Storage 1200. Finally, each PI 1100 also is in communication with Tuner 1300 so that it may receive instructions from Tuner 1300 to be passed onto its corresponding Partition 200.

Storage 1200 stores the performance data retrieved by the Partition Interfaces 1100 and is accessible by the Partition Interfaces 1100 as well as Tuner 1300. Storage 1200 may be any computer data storage device, e.g., disk files.

Tuner 1300 is a computer system that analyzes performance data for each APRMS partition to (1) provide measures describing the degree to which each partition is suffering performance degradation due to a lack of resources, and (2) automatically allocate resources among the partitions to more evenly distribute among each partition the degree of performance degradation.

Tuner 1300 may also may be in communication with a User 10, e.g., through a graphical user interface, to receive data from and display data to the User 10. For example, as discussed further below, Tuner 1300 may receive from the user configuration information for the APRMS, such as minimum and maximum resource levels for each APRMS partition and a priority value for each APRMS partition describing the priority with which resources should be distributed among APRMS partitions. Also, Tuner 1300 may display data to a User 10, including, for example, data showing resource usage and resource pain levels (described below) for each APRMS partition. It should be noted that, in addition to this user interface function being performed by Tuner 1300, this function may also be performed by a separate user interface component in communication with Tuner 1300.

Tuner 1300 may also perform control and management functions for the entire APRMS 1000 system. For example, Tuner 1300 may control the timing of tasks to be executed, such as the tuning of memory, processor power, or interactive processor power resources (described below). It should be noted that, in addition to control and management functions being performed by Tuner 1300, those functions may also be performed by a separate control component in communication with System Code 300 as well as with Tuner 1300 and the other components of the APRMS 1000.

Although FIG. 1 shows Partition Interfaces 1100, Storage 1200, and Tuner 1300 as distinct components, it should be noted that one or more of these may be co-resident in the same physical component or the same computer code module.

The operation of the embodiment of FIG. 1 includes several concurrent processes. A first process includes the continual retrieval and storage of data from each APRMS partition related to the allocation and usage of resources in each such partition. A second process includes the initiation, according to certain criteria, of tasks which tune resources across the APRMS partitions.

Figure 2:
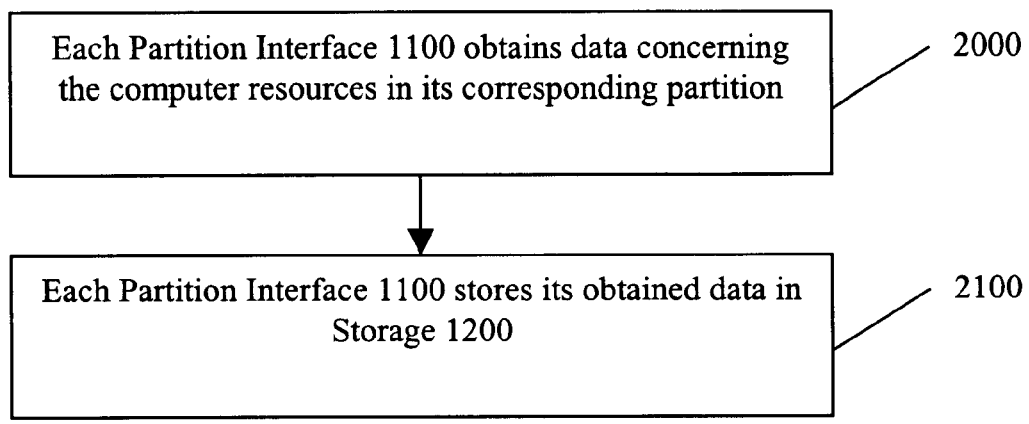
FIG. 2 is a flowchart showing an operation of the present invention.

FIG. 2 is a flowchart that shows the retrieval and storage of data related to the resources of each APRMS partition. First, each PI 1100 obtains data concerning computer resources currently assigned to and being utilized by its corresponding partition 200, step 2000. A Partition Interface may accomplish this by, for example, calling a pre-existing application program interface ("API") designed to provide this information that is part of the System Code 300. Each PI 1100 then stores the retrieved data in Storage 1200, step 2100.

The process shown in steps 2000 and 2100 may be repeated at predetermined time intervals, such as every 15 seconds. The length of this interval may be user definable and may vary as a matter of design choice for the implementer or user of the APRMS 1000. Moreover, data for different resources may be obtained at different time intervals. For example, measurements for page faults (described further below) may be made at 15 second intervals, whereas measurements for the number of disk arms (described further below), which is likely to change infrequently (e.g., when disks are added or removed) may be made at longer intervals, e.g., every three hours. In this manner, data related to resources assigned to and used by each partition may be continually retrieved from the partitions and updated at Storage 1200.

In step 2000 of FIG. 2, each PI 1100 obtains data relating to resources allocated to its corresponding partition, including one or more of the following resources: memory, processor power, and interactive processor power. Processor power may refer to the total amount of processor power available for work, while interactive processor power may refer to the amount of processor power available for tasks involving user interaction, e.g., receiving data input as it is keyed in by a user. The amount of interactive processor power may be defined as a portion of the total processor power available, e.g., a percentage of total processor power available for interactive purposes.

With regard to memory, each PI obtains several measurements, including: (1) the amount of main memory currently allocated to the corresponding partition; (2) a measure of the frequency with which storage devices are used to supplement main memory in the corresponding partition; and (3) a measure of the efficiency with which the storage devices supplement main memory. Each PI 1100 may obtain the first type of memory related measurement by, for example, accessing the partition definition stored at the partition and looking up the amount of main memory currently allocated to the partition.

The second memory related measurement, which describes the frequency with which storage devices are used to supplement main memory in the partition, may include, for example, a measure of the average number of page faults occurring over a given time interval, e.g., one second, in user addressable memory in that partition. For example, where System 100 and System Code 300 are implemented as an AS/400™ running OS/400™ V5R1, the second memory related measurement may be represented as the average number of page faults occurring per second in shared memory pools in that partition. It should be noted that the time interval for which the average number of page faults is obtained may be user definable and may vary as a matter of design choice for the implementer or user of the APRMS 1000.

Each PI 1100 may obtain this second type of memory related measurement by the following exemplary technique. The System Code 300 may track the number of page faults occurring in each partition through a user re-settable counter. An API in the System Code 300 allows a user to reset the counter and retrieve the value of the counter. A PI 1100 may call this API to reset the counter and call the API after a given time interval, e.g., 15 seconds, to obtain the number of page faults that have occurred in that partition in the given time interval. The PI 1100 may then perform several such readings over several time intervals and then apply simple exponential smoothing to obtain the average number of page faults for that partition over the given time interval. Alternatively, the PI 1100 may continually store successive readings of the number of page faults at Storage 1200 and the Tuner 1300 may apply the simple exponential smoothing to the stored successive readings to obtain the average number of page faults for a given time interval. In the exponential smoothing process used to find the average number of page faults, weights of 0.70 and 0.30, for example, may be applied to previous data and current data, respectively, for a time interval of 15 seconds where System 100 is implemented, for example, as an AS/400™.

The third memory related measurement, which describes the efficiency with which storage devices supplement main memory, may include, for example, the length of time the storage devices require to service a given number, e.g., 100, of page faults. Alternatively, in systems designed to spread data across as many storage devices, e.g., disks, as possible, such as the AS/400™, the number of disk arms currently assigned to the partition may be used to effectively describe efficiency with which storage devices supplement main memory in that partition. A PI 1100 may obtain the number of disk arms in the partition by, for example, calling an API in System Code 300 designed to provide this information.

Where the number of disk arms is used for this memory related measurement, the number retrieved may be adjusted to account for the fact that different types of disks may be better than others at alleviating page faults. For example, different types of disks may be associated with different weights that describe disk type's effectiveness in alleviating page faults. The numbers of each type of disk, multiplied by each disk type's weight, are summed to obtain an effective number of disk arms. A PI 1100 may obtain information necessary to classify disks into different types by, for example, calling a pre-existing API in System Code 300 designed to provide this information.

For example, in an AS/400™ environment, disk arms may be classified, for purposes of assigning the weights just described, into at least twelve categories according to various combinations of at least three different characteristics, including whether the disk is: (1) part of a basic auxiliary storage pool ("ASP") or an independent, online, ASP; (2) unprotected, part of a mirrored pair, or part of a RAID; or (3) compressed or uncompressed. FIG. 3 is a table showing exemplary weights that may be used for the twelve categories which the inventors have determined, through empirical observation, to provide satisfactory results where System 100 is implemented as an AS/400™.

With regard to processor power, each PI obtains measurements including, at least, the average rate at which the partition is using its currently allocated amount of processor power ("processor usage rate"). This measurement may be obtained, for example, by comparing the amount of processor time elapsed with the actual time elapsed. For example, at a point in time, a PI 1100 may obtain the time of day and the processor time elapsed since the last IPL by, for example, calling a pre-existing API in System Code 300 designed to provide this information. Then, after a given amount of time, e.g., 10 seconds, the same readings may again be taken. The difference in the processor time elapsed may then be compared with the actual time elapsed to obtain the instantaneous processor power usage rate. For example, if the readings show that 6 seconds of processor time has elapsed over an actual time interval of 10 seconds, then the instantaneous processor power usage rate may be calculated as 60%.

To obtain an average usage rate, a PI 1100 may obtain the instantaneous processor power usage rate several times at predetermined time intervals, e.g., every 15 seconds. PI 1100 may then apply simple exponential smoothing to obtain an average rate at which the partition is using its currently allocated amount of processor power. Alternatively, the PI 1100 may continually store successive readings of the instantaneous processor power usage rate at Storage 1200 and Tuner 1300 may apply the simple exponential smoothing to the stored successive readings to obtain the average rate. In the exponential smoothing process used to find the average rate at which the partition is using its currently allocated amount of processor power, weights of 0.70 and 0.30, for example, may be applied to previous data and current data, respectively, for a time interval of 15 seconds where System 100 is implemented, for example, as an AS/400™.

With regard to interactive processor power, each PI obtains measurements including, at least, (1) the average rate at which the partition is using its currently allocated amount of interactive processor power ("interactive usage rate"), (2) the interactive processor power threshold ("interactive threshold"), and (3) the interactive processor power limit ("interactive limit"). The first measurement may be obtained, for example, by comparing the amount of processor time elapsed that was used for interactive purposes ("interactive processor time") with the actual time elapsed. For example, at a point in time, a PI 1100 may obtain the time of day and the processor time elapsed since the last IPL that was used for interactive purposes by, for example, calling a pre-existing API in System Code 300 designed to provide this information. Then, after a given amount of time, e.g., 10 seconds, the same readings may again be taken. The difference in the interactive processor time elapsed may then be compared with the actual time elapsed to obtain the instantaneous interactive processor power usage rate. For example, if the readings show that 2 seconds of interactive processor time has elapsed over an actual time interval of 10 seconds, then the instantaneous interactive processor power usage rate may be calculated as 20%. In other words, this example shows that, in this time interval, 20% of processor power was used for interactive purposes.

To obtain an average usage rate, a PI 1100 may obtain the instantaneous interactive processor power usage rate several times at predetermined time intervals, e.g., every 15 seconds. PI 1100 may then apply simple exponential smoothing to obtain an average rate at which the partition is using its currently allocated amount of interactive processor power. Alternatively, the PI 1100 may continually store successive readings of the instantaneous interactive processor power usage rate at Storage 1200 and Tuner 1300 may apply the simple exponential smoothing to the stored successive readings to obtain the average rate. In the exponential smoothing process used to find the average rate at which the partition is using its currently allocated amount of interactive processor power, weights of 0.75 and 0.25, for example, may be applied to previous data and current data, respectively, for a time interval of 15 seconds where System 100 is implemented, for example, as an AS/400™.

The second interactive processor power related measurement, the interactive threshold, describes the amount of interactive processor power for which the partition is currently configured and may be obtained by, for example, calling a pre-existing API in System Code 300 designed to provide this information. For example, by calling such an API, a Partition Interface may retrieve a percentage of 5% indicating that the interactive threshold for this partition is 5% or, in other words, that 5% of total processor power in this partition has been configured for interactive usage.

The interactive threshold provides a nominal limit to interactive usage and during operation of the System 100 the interactive usage rate may climb above the configured interactive threshold. However, once the interactive usage rate in a partition exceeds the interactive threshold for that partition, System 100 and System Code 300 may take affirmative action to curtail further interactive usage in that partition until a limit is reached at which System 100 and System Code 300 effectively prevent any further interactive usage from occurring. This limit may be referred to as the interactive processor power limit ("interactive limit") and may be obtained by a PI 1100 by, for example, calling a pre-existing API in System Code 300 designed to provide this information.

Continuing the example above, a PI 1100 may call an API to obtain interactive threshold and interactive limit figures of 5% and 6%, respectively. Here, once the interactive usage rate rose above the interactive threshold of 5%, interactive usage would be increasingly curtailed until the interactive usage rate reached the interactive limit of 6%, at which point further interactive usage would be prevented by System 100 and System Code 300.

As mentioned previously, executing concurrently with the process described above of the Partition Interfaces 1100 periodically and continually obtaining data concerning resources in the APRMS partitions and storing that data in Storage 1200, is another process that includes initiating, according to certain criteria, tasks which tune resources across the APRMS partitions. This second concurrent process, which may execute as part of the control and management function of Tuner 1300, may initiate tasks that tune at least one or more of the following resources across the APRMS partitions: memory, processor power, and interactive processor power.

The control and management function of Tuner 1300 may initiate these tasks according to different criteria, including, for example, periodically at given time intervals, such as every 10 minutes for memory tuning or every 5 minutes for processor power and interactive processor power tuning. It should be noted that the time interval between memory tunings and the time interval between processor power and interactive processor power tunings each may be user definable and each may vary as a matter of design choice for the implementer or user of the APRMS 1000.

Figure 4:
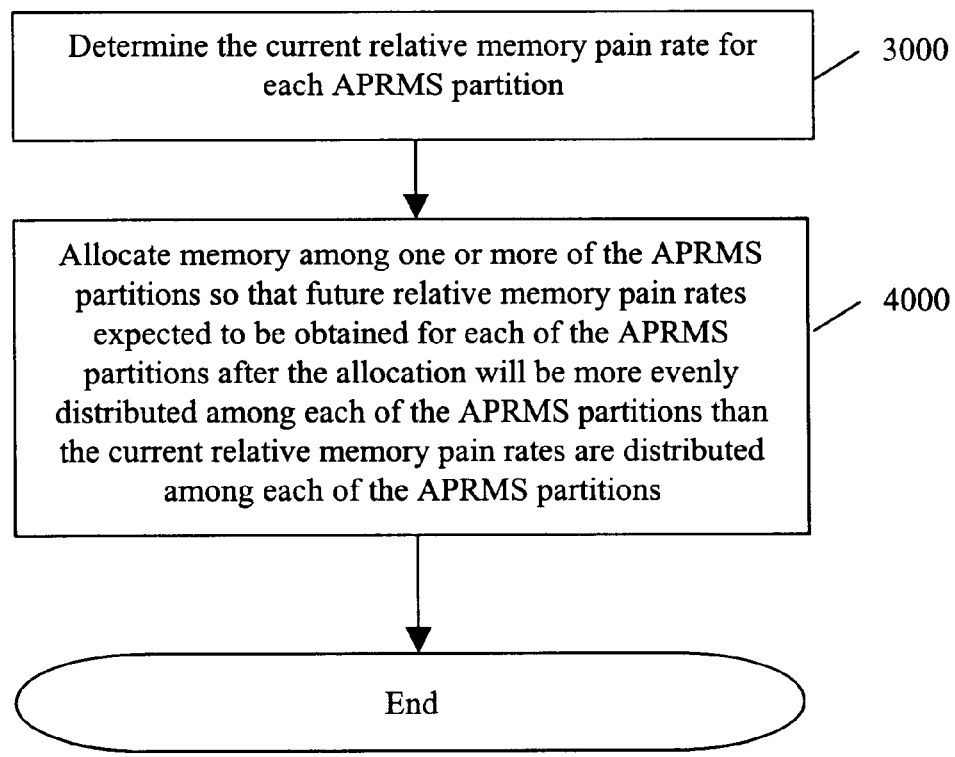
FIG. 4 is a flowchart showing the operation of an embodiment of the present invention related to memory pain determination and memory reallocation.

FIG. 4 is a flowchart showing the operation of the memory tuning task for tuning memory across APRMS partitions. Once initiated by the control and management function of Tuner 1300, the memory tuning task begins by determining the current relative memory pain rate for each APRMS partition, step 3000.

To determine a relative memory pain rate, Tuner 1300 first determines an absolute memory pain rate (also "memory pain rate" or "current memory pain rate"). As used herein, the pain rate related to a given resource may refer to the degree to which the performance of a computer system (including a logical system within a partition) suffers due to the lack of that resource. For a given partition, the memory pain rate for that partition may be described as being directly related to the frequency with which storage devices are used to supplement main memory in the partition, and inversely related to (a) the efficiency with which the storage devices supplement main memory in the partition, and (b) the amount of processor usage in the partition.

In an embodiment of the invention, where System 100 is implemented as an AS/400™, the memory pain rate for a partition may be defined as follows:

$$\frac{\text{memory}}{\text{pain rate}} = \frac{\text{average number of page faults over a time interval}}{\text{(effective number of disk arms)} * \text{(processor usage band factor)}} \quad [\text{Eq. 1}]$$

where processor usage band factor refers to a factor by which to multiply the effective number of disk arms in the partition based on the band, or range, of usage into which the processor usage rate for the partition falls. For example, through empirical observation, the inventors have found the following ranges and corresponding band factors to provide satisfactory results:

TABLE 2

| Processor Usage Rate | Band Factor |
| --- | --- |
| 0–40% | 1 |
| 40%–65% | 2 |
| 65%–85% | 4 |
| 85% and above | 7 |

It should be noted, however, that the processor usage rate ranges and corresponding band factors used for determining processor usage band factors may be user definable and may vary as a matter of design choice for the implementer or user of the APRMS 1000.

Thus, to determine the memory pain rate for a given partition, Tuner 1300 may first obtain the average number of page faults over a time interval, the effective number of disk arms, and the processor usage rate that was previously obtained and stored for that partition in Storage 1200 by one of the Partition Interfaces 1100. Then, Tuner 1300 may determine the memory pain rate for the partition in the manner described above.

Once the memory pain rate for a partition has been determined, Tuner 1300 may determine the relative memory pain rate (also "current relative memory pain rate") for that partition. The relative memory pain rate for a partition describes the memory pain rate of the partition in relation to the memory pain rate of other partitions. Tuner 1300 may determine the relative memory pain rates for each APRMS partition using, for example, priority values previously assigned to each APRMS partition by a user.

As mentioned previously, a user may assign priority values to each APRMS partition indicating the priority with which the user desires resources should be distributed among the partitions. For example, using lower number values to indicate higher priority, a user may assign Partition 1 a priority of 10, Partition 2 a priority of 20, and Partition 3 a priority of 60. The highest assigned priority here is 60 and relative priority for the partitions may be calculated as follows:

Partition 1 share: 60/10=6

Partition 2 share: 60/20=3

Partition 3 share: 60/60=1

As shown above, the relative priority of a partition may refer to the priority of the partition in relation to other partitions. In the example above, Partitions 1, 2, and 3 have relative priorities of 6, 3, and 1, respectively. Using relative priority values, Tuner 1300 may calculate the relative pain rate for a partition by directly relating (e.g., multiplying) the partition's relative priority value to its pain rate. The following table provides an illustration of how the example assigned priority values, described above, affect memory pain rates to produce relative memory pain rates.

TABLE 3

| Partition Number | Assigned Priority | Relative Priority | Current Memory Pain Rate | Current Relative Memory Pain Rate |
| --- | --- | --- | --- | --- |
| 1 | 10 | 6 | 30 | 180 |
| 2 | 20 | 3 | 50 | 150 |
| 3 | 60 | 1 | 90 | 90 |

If desired, the current memory pain rates and current relative memory pain rates for each APRMS partition may be stored and then provided, e.g., displayed, to a user 10 by Tuner 1300. The user may then use the current and relative memory pain rates as a guide to deciding which partitions should receive additional memory and in what order.

Returning to FIG. 4, once the current relative memory pain rates have been calculated for each APRMS partition, Tuner 1300 then, in step 4000, allocates memory among one or more of the APRMS partitions so that future relative memory pain rates expected to be obtained for each of the APRMS partitions after the allocation will be more evenly distributed among each of the APRMS partitions than the current relative memory pain rates are distributed among each of the APRMS partitions. The memory that Tuner 1300 allocates may be (1) unassigned and available memory, e.g., memory usable by System 100 and System Code 300 but not currently assigned to any partition, and/or (2) memory taken from one or more of the APRMS partitions.

For example, referring again to the sample values in Table 3, we find a relative memory pain rate distribution among Partitions 1, 2, and 3, of 180, 150, and 90, respectively. Tuner 1300 would allocate memory among these partitions so that the relative memory pain rates expected to be obtained after the reallocation would be more evenly distributed, e.g., so that the relative memory pain rate of Partition 3 would increase and/or the relative memory pain rates of Partitions 1 and 2 would decrease. For example, if there is available memory, Tuner 1300 may allocate that available memory to Partitions 1 and 2 to thereby decrease the relative memory pain rates expected to be obtained for those partitions in a subsequent pain reading. Also, Tuner 1300 may remove memory from Partition 3 and reallocate that memory among Partitions 1 and 2. In this way, each pass through steps 3000 and 4000 causes relative memory pain rates to become more evenly distributed among the APRMS partitions so that, eventually, the relative memory pain rates for all APRMS partitions are approximately equal.

Figure 5:
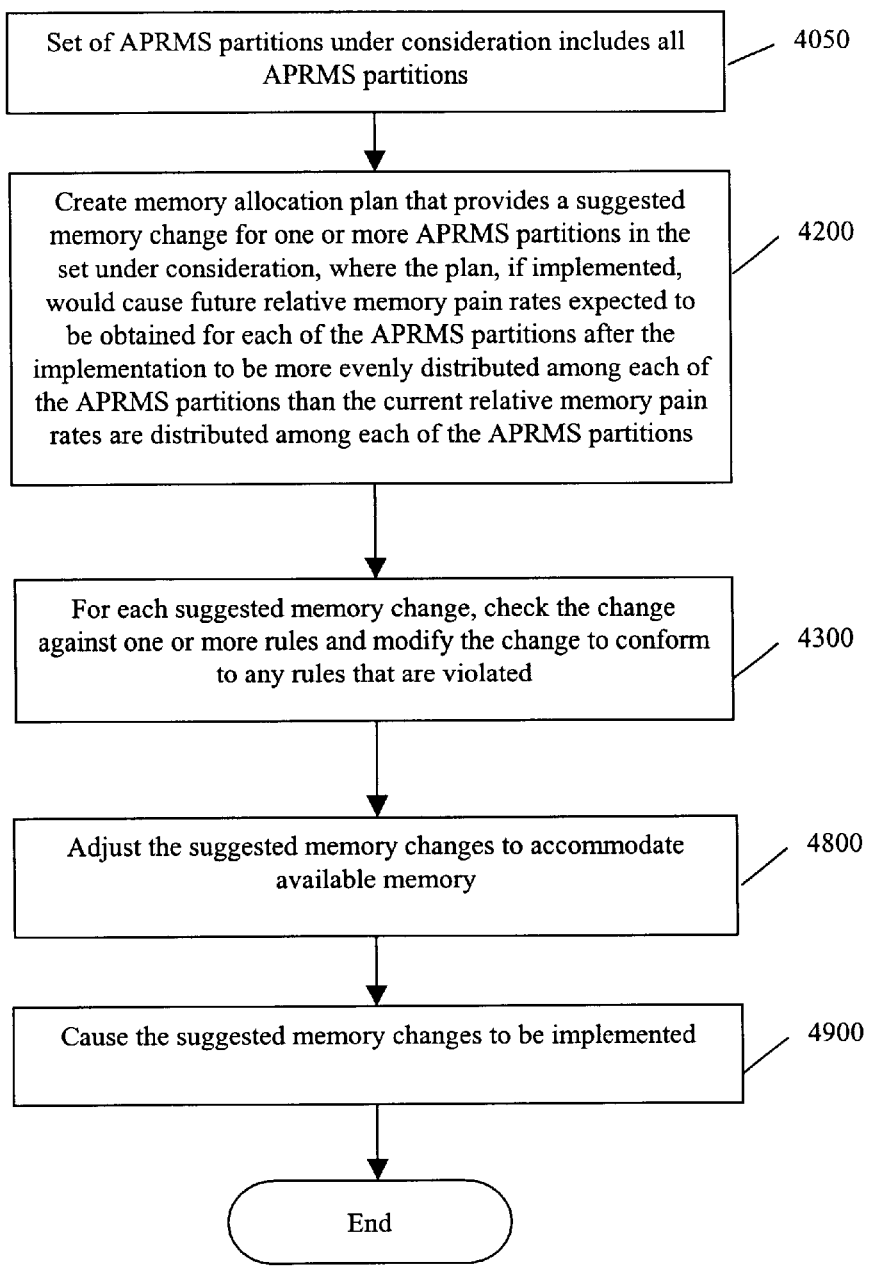
FIG. 5 is a flowchart showing an operative embodiment of the present invention related to memory reallocation.

One technique for the allocating of memory among APRMS partitions in accordance with step 4000 is shown in the flowchart of FIG. 5. The process begins with all the APRMS partitions being included in the set of APRMS partitions under consideration, step 4050. Then, in step 4200, Tuner 1300 creates a memory allocation plan that provides a suggested memory change for one or more of the APRMS partitions in the set under consideration, where the plan, if implemented, would cause future relative memory pain rates expected to be obtained for each of the APRMS partitions after the implementation to be more evenly distributed among each of the APRMS partitions than the current relative memory pain rates are distributed among each of the APRMS partitions.

Figure 6A:
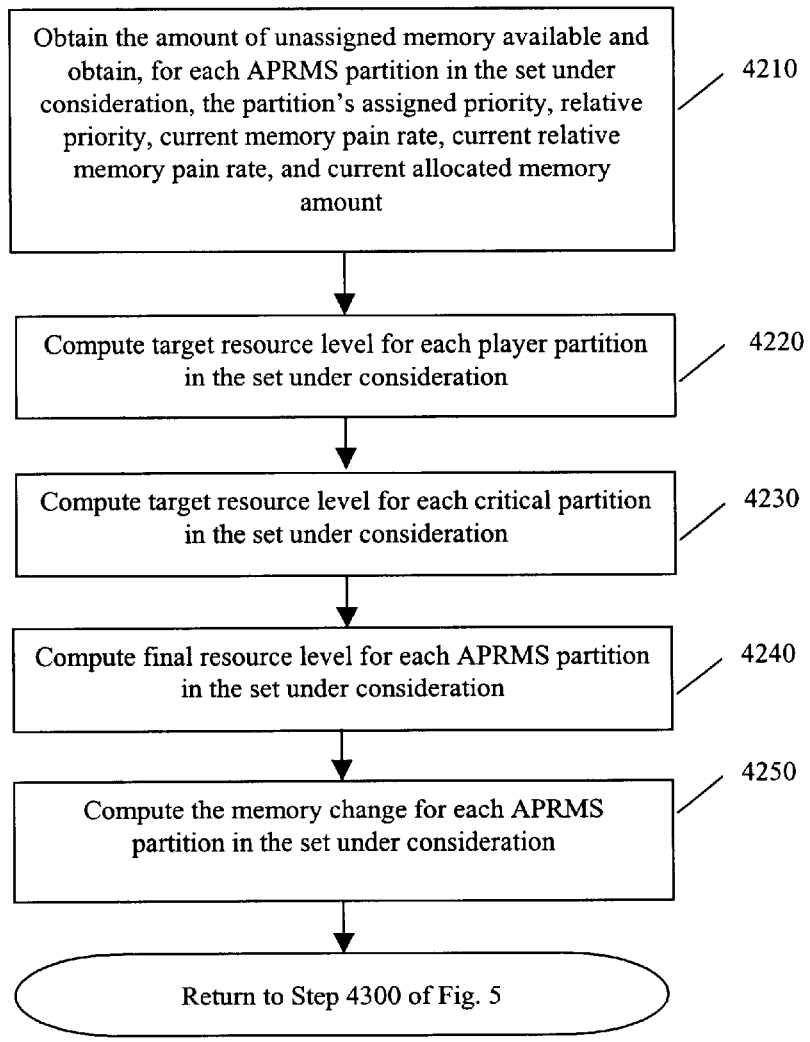
FIG. 6A is a flowchart showing further detail of the operative embodiment of the present invention related to memory reallocation.

FIG. 6A is a flowchart which presents one technique for creating a memory allocation plan. As an initial step, Tuner 1300, in step 4210, obtains the amount of unassigned memory available and also obtains, for each APRMS partition in the set under consideration, values for the following information: assigned priority, relative priority, current pain rate, current relative pain, and current resource allocated.

Unassigned memory may include memory not currently assigned to any partitions that is available for reallocation. Tuner 1300 may determine if there is any unassigned memory available, and if so, how much is available, by, for example, calling an API in System Code 300 designed to provide this information.

The values of assigned priority, relative priority, current pain rate, current relative pain, and current resource allocated may be obtained differently for each partition depending upon whether the partition may be classified as a "player" partition or a "critical" partition.

For a given resource, such as memory, APRMS partitions may be classified as either "player" partitions or "critical" partitions. As described previously, a user may interact with Tuner 1300 to provide configuration information for each APRMS partition, including a minimum and maximum resource level for each resource type. (It should be noted that any minimum or maximum resource level specified by a user must fall within minimum and maximum levels required by System 100 and System Code 300 and the user interaction function of Tuner 1300 may validate user inputted minimums and maximums to insure that this is the case). The term "player" partition may be used herein to refer to an APRMS partition whose currently assigned resource level is at or above its user assigned minimum. The term "critical" partition may be used herein to refer to an APRMS partition whose currently assigned resource level is below its user assigned minimum. Partitions may be critical in situations, such as, where a user changes a partition's configuration to increase the minimum level of resource or where a partition is first IPLed.

Tuner 1300 may obtain the amount of memory currently allocated to each APRMS partition by looking up this data previously obtained for each APRMS partition and stored in Storage 1200 by the Partition Interfaces 1100. Alternatively, Tuner 1300 may obtain the amount of memory currently allocated to each APRMS partition by calling an API in System Code 300 designed to provide this information. Having the current memory allocation for each APRMS partition, Tuner 1300 may identify each APRMS partition as a player partition or a critical partition.

For each APRMS partition classified as a player partition, the values of assigned priority, relative priority, current pain rate, current relative pain, and current resource allocated may be obtained for each player partition through various ways previously discussed. For example, the assigned priority is a user assigned priority for the partition. In addition, for a player partition P, the values of relative priority and current relative pain rate may be computed as follows:

$$\text{Relative Priority Value for Partition } P = \frac{\text{(Highest Assigned Priority Value of All } APRMS \text{ Partitions in the Set under Consideration)}}{\text{(Assigned Priority Value for Partition } P)} \quad [\text{Eq. 2}]$$

$$\text{Current Relative Pain Rate for Partition } P = \text{(Relative Priority Value for Partition } P) * \text{(Current Pain Rate for Partition } P) \quad [\text{Eq. 3}]$$

For critical partitions, initial values for assigned priority, relative priority, current pain rate, current relative pain, and current resource are obtained differently. Critical partitions, because their current resource levels are below their assigned minimums, are assumed to have a greater need than player partitions for additional resources until the critical partitions can be brought to their minimum levels. Consequently, critical partitions are treated as if they have a greater relative pain rate and higher assigned priority than any player partitions. Tuner 1300 gives this effect by automatically assigning to any partition identified as critical an assigned priority value of zero and a current pain rate of zero. Moreover, Tuner 1300 does not use and does not obtain values for relative priority or current relative pain for critical partitions. With regard to critical partitions, the Tuner 1300's goal of achieving a more even distribution of relative pain levels among partitions is given effect by allocating additional resources to the critical partition until its resource level reaches its assigned minimum.

FIG. 7 is a spreadsheet depicting an example memory allocation plan for 5 APRMS partitions, where Partitions 1–4 are player partitions and Partition 5 is a critical partition. Totals for various values appear on row 6. Sample initial values for each partition for assigned priority, relative priority, current pain rate, current relative pain, and current resource are shown in columns 2–6 of the spreadsheet.

Returning to FIG. 6A, after values are obtained for assigned priority, relative priority, current pain rate, current relative pain, and current resource for each APRMS partition in the set under consideration, Tuner 1300 then computes target resource levels for each player partition in the set under consideration, step 4220. For player partitions, the target resource calculated for each player partition represents an amount of resource, which, if each calculated target resource were to be allocated to the corresponding player partition, the relative pain rates for all player partitions would tend to be equalized. For a player partition P, a target resource level for a Resource R for that partition may be computed as:

$$\text{Target for Partition } P \text{ for Resource } R = \frac{(\text{Current Relative Pain for Partition } P \text{ for Resource } R) * (\text{Current Amount of Resource } R \text{ for Partition } P)}{(\text{Average Current Pain Rate for Resource } R)} \quad [\text{Eq. 4}]$$

Note that Average Current Pain Rate is computed as the average of the current pain rates for all APRMS partitions in the set under consideration, including critical partitions. The calculation of target resource values does not take into consideration the actual amount of resources available and consequently may be larger than actually realizable. Consequently, target resource values may need to be prorated based on the amount of resources actually available to achieve resource values that can be implemented.

For example, referring to FIG. 7, we see that the total target resource calculated for the 5 partitions equals 13233.03 (column 7, row 6). However, the total current resource assigned to the 5 partitions equals 8750 (column 6, row 6). Assuming there is no unassigned memory available, then the total amount of resource available to all APRMS partitions in the set under consideration is 8750. Therefore, the calculated target resource values must be prorated based on the total resource being available as 8750.

For critical partitions, the target resource value represents the amount of resource which, after being prorated on the same basis as the player partitions, results in the critical partition's defined minimum being assigned to it. For example, in FIG. 7, the minimum resource level defined for the critical partition, Partition 5, is 500 (column 8, line 5). The target resource for this partition is 756.18 (column 7, line 5), which is the amount of resource which, when prorated on the same basis on which the target resources for the player partitions will be prorated, results in the defined minimum for this partition of 500.

Returning to FIG. 6A, after target resources for player partitions are calculated, Tuner 1300 calculates the target resource level for each critical partition in the set under consideration, step 4230. For a critical partition C, a target resource level for a resource R for that partition may be computed as:

$$\begin{aligned}\text{Target for Partition } C \text{ for Resource } R = {} & (\text{Sum of Target Resources for Resource } R \text{ for All Player Partitions in the Set under consideration}) * \\ & (\text{The Minimum Defined for Resource } R \text{ for Partition } C) / \\ & ((\text{Sum of Current Resources of Resource } R \text{ for all Player Partitions in the Set under consideration}) + \\ & (\text{Any Unassigned Resource } R) + \\ & (\text{Current Resource of Resource } R \text{ for Partition } C) - \\ & (\text{The Minimum Defined for Resource } R \text{ for Partition } C)) \quad [\text{Eq. 5}]\end{aligned}$$

In addition, when calculating a target resource value for a critical partition, Tuner 1300 insures that the calculated value falls within a reasonable range. Specifically, Tuner 1300 limits the target resource level of resource R for a critical partition C as:

$$1.0 <= \text{Target for Partition } C \text{ for Resource } R <= (200 * (\text{Sum of Target Resources for Resource } R \text{ for All Player Partitions in the Set under Consideration})) \quad [\text{Eq. 6}]$$

Thus, if the target resource for Partition C falls below 1.0, Tuner 1300 will assign the target resource value to be 1.0, and if the target resource falls above 200*(Sum of Target Resources for Resource R for All Player Partitions in the set under Consideration), then Tuner 1300 will assign this value as the target resource for Partition C.

Returning to FIG. 6A, after target resource levels have been calculated for all player and critical partitions in the set under consideration, Tuner 1300 calculates the final resource level for each APRMS partition in the set under consideration, step 4240. The final resource level for each such APRMS partition may refer to the result obtained when the target resource level for the respective partition is prorated to achieve a realizable amount. For any APRMS partition A, the final resource value for memory may be calculated as:

$$\begin{aligned}\text{Final Memory Amount for Partition } A = {} & (\text{Target for Partition } A) * \\ & ((\text{Sum of Current Resources for All Partitions in the Set under Consideration}) + \\ & (\text{Any Unassigned Memory})) / \\ & (\text{Sum of Target Resources for All Partitions in the Set under Consideration}) \quad [\text{Eq. 7}]\end{aligned}$$

Once final resource values for each APRMS partition in the set under consideration are calculated, Tuner 1300, in step 4250, then calculates the suggested change in memory allocation for each APRMS partition in the set under consideration based on current resource allocated for the respective partition and the new resource allocation suggested for the respective partition, e.g., the final resource value calculated. For example, referring to FIG. 7, Partition 1 has a suggested memory gain of 44.90 based on a current resource of 200 and a suggested final resource of 244.90. Returning to FIG. 6A, after Tuner 1300 computes a suggested memory change for each APRMS partition, processing returns to FIG. 5 and step 4300.

In FIG. 5, after Tuner 1300 creates an initial memory allocation plan including suggested memory changes for each APRMS partition in the set under consideration, Tuner 1300 then checks each suggested change against one or more rules and modifies the change to conform to any rules that are violated, step 4300. Tuner 1300 may accomplish this, for example, by insuring that each suggested change conforms to one or more resource allocation rules, where the particular resource is memory. Such resource allocation rule(s) may be separated into those that apply to critical partitions and those that apply to player partitions, and may include one or more of the following:

TABLE 4

| Rule No. | Rule Description |
|---|---|
| | Resource Allocation Rules Applicable to Critical Partitions |
| C1 | Limit the gain for the partition to only the amount necessary to meet the partition's defined minimum. |
| | Resource Allocation Rules Applicable to Player Partitions |
| P1 | Limit the resource change for the partition to insure that the suggested new resource allocation for the partition falls within the partition's defined minimum and maximum for that resource. |
| P2 | Insure that only resource changes exceeding a predetermined threshold for that resource are implemented. |
| P3 | Limit the resource loss for the partition to the maximum allowable loss defined for the partition for that resource. |
| P4 | Apply a resource gain to the partition only if the partition's current pain rate for that resource exceeds a predetermined pain rate threshold for that resource. |

The resource allocation rule(s), such as those described in Table 4 above, may be user definable and may be provided by a user to Tuner 1300 via the user interface function.

One technique for carrying out step 4300 may be described as follows: With respect to a resource R, each APRMS partition in the set under consideration is first identified as either critical or player. If the respective partition is classified as critical with respect to the resource R, then the resource change suggested for that partition is checked against all resource allocation rules applicable to critical partitions and modified as necessary. If the respective partition is classified as a player with respect to the resource R, then the resource change suggested for that partition is checked against all resource allocation rules applicable to player partitions and modified as necessary. For step 4300 of FIG. 5, resource R may be memory.

Operation of particular rules, such as those described in Table 4, may be carried out as follows: For Rule C1, Tuner 1300 first determines if a gain for a resource R has been suggested for the critical partition, and if so, Tuner 1300 determines whether the suggested gain would result in a resource allocation to that partition greater than its minimum defined for resource R. If this is the case, then Tuner 1300 reduces the suggested gain to only that amount necessary for the partition to reach its defined minimum for resource R.

For Rule P1, Tuner 1300 determines whether a gain or a loss for resource R has been suggested for the player partition. If a gain has been suggested, Tuner 1300 determines whether the gain would result in a resource allocation to the partition that exceeds the partition's maximum defined for resource R, and if so, Tuner 1300 reduces the suggested gain so that the resource allocation to the partition does not exceed the partition's defined maximum for resource R. If a loss has been suggested, Tuner 1300 determines whether the loss would result in a resource allocation to the partition that would fall below the partition's defined minimum for resource R, and if so, Tuner 1300 reduces the suggested loss so that the resource allocation to the partition does not fall below the partition's defined minimum for resource R.

For Rule P2, Tuner 1300 determines whether the suggested change for resource R exceeds a predetermined threshold for resource R. The predetermined threshold for resource R may represent a predetermined value which the magnitude of a suggested change for resource R must meet or exceed in order for that change to be implemented. For example, the predetermined threshold for memory may be set at one megabyte of memory, although it should be noted that the predetermined threshold value may be user definable and may vary as a matter of design choice for the implementer or user of the APRMS 1000. If the suggested memory change does not meet or exceed the predetermined threshold for memory, then Tuner 1300 changes the suggested change to zero, in effect, discarding the suggested memory change.

For Rule P3, Tuner 1300 determines whether a loss suggested for resource R for the player partition exceeds the maximum allowable loss defined for resource R for that partition. If so, Tuner reduces the suggested loss to the maximum allowable amount defined for resource R for that partition. The maximum allowable resource loss may be different for each APRMS partition. Also, the maximum allowable resource loss for each APRMS partition may be user definable and may be set, for example, to be 0.5 gigabyte where resource R refers to memory. Alternatively, a user may specify a scheme which sets the maximum allowable resource loss according to certain criteria. For example, where resource R is memory, a user may define the maximum allowable loss for a particular Partition X to be the smallest of (i) 10% of the memory of System 100, (ii) 20% of the memory of Partition X, or (iii) 0.5 gigabyte. It should be noted that any fixed limit or scheme that defines the maximum allowable resource loss may vary as a matter of design choice for the implementer or user of the APRMS 1000.

It should be noted that resource allocation rules may be related to or contingent upon other rules. For example, Rule P3 may be contingent upon Rule P2 such that Rule P3 (e.g., insuring a resource loss does not exceed a maximum loss) is processed only if Rule P2 has a particular outcome (e.g., the suggested resource change is equal to or greater than the predetermined threshold).

For Rule P4, Tuner 1300 determines whether a gain for resource R has been suggested for the player partition. If so, Tuner 1300 determines whether the partition's current pain rate for resource R exceeds a predetermined pain rate threshold for resource R, and if not, Tuner 1300 reduces the suggested gain for resource R to zero. Where resource R refers to memory, the predetermined pain rate threshold may be set at, for example, 5 units of pain as computed according to Equation 1 above. It should be noted, however, that the predetermined pain rate threshold for memory may be user definable and may vary as a matter of design choice for the implementer or user of the APRMS 1000.

Returning to FIG. 5, after the memory change for each APRMS partition in the set under consideration suggested by the memory allocation plan has been checked against the resource allocation rule(s) and modified as necessary as described above, processing continues with step 4800.

Figure 6B:
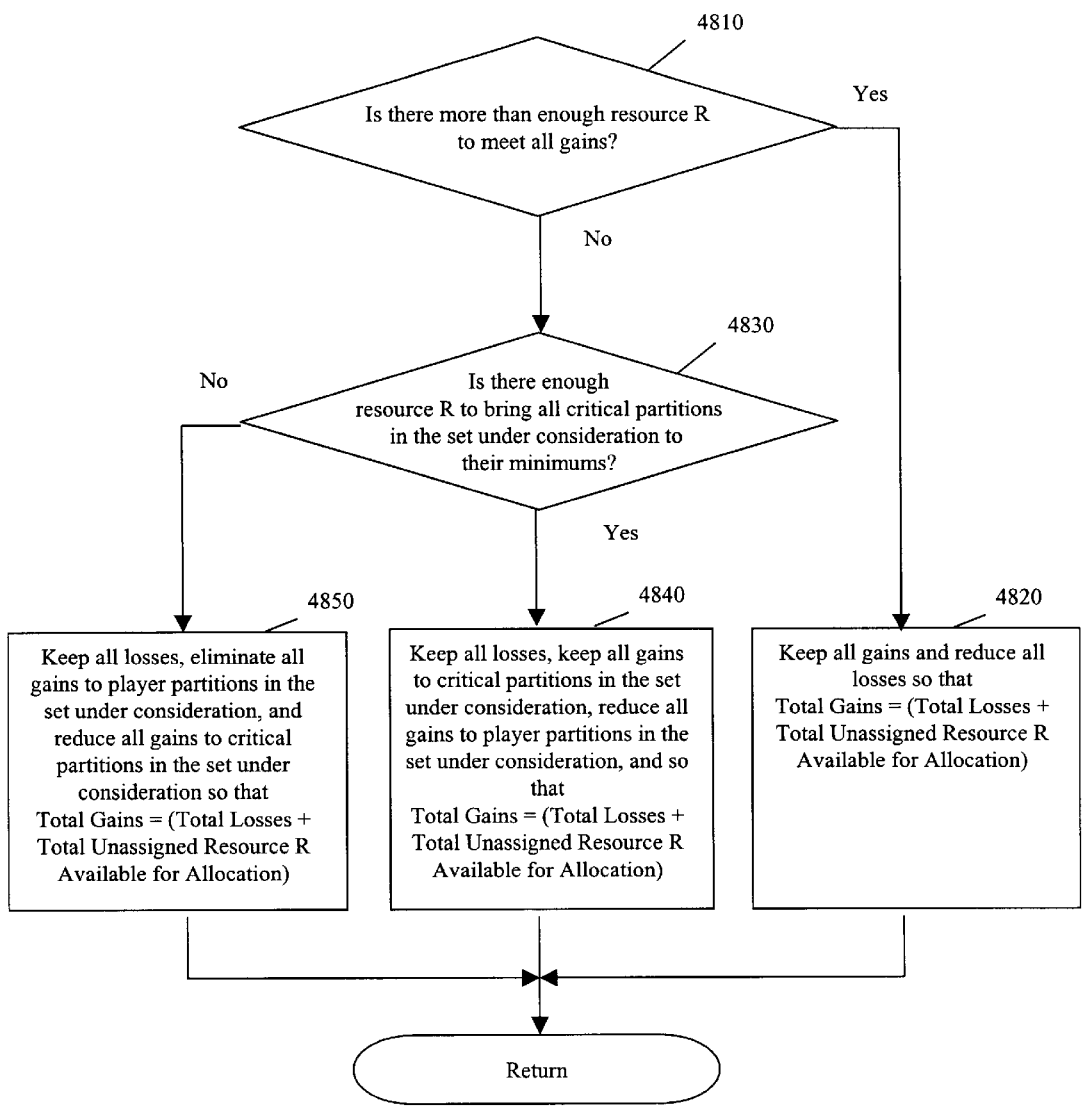
FIG. 6B is a flowchart showing further detail of the operative embodiment of the present invention related to memory reallocation.

In step 4800, Tuner 1300 adjusts the memory changes suggested by the memory allocation plan to accommodate available memory. For example, where the total gains suggested by the memory allocation plan are less than the sum of the total suggested losses and the total unassigned memory, then there is more than enough memory available (suggested losses plus unassigned) to meet all suggested gains. In that case, Tuner 1300 may reduce the suggested losses. Alternatively, where the total gains suggested by the memory allocation plan are greater than the sum of the total suggested losses and the total unassigned memory, then the memory available is not enough to meet all suggested gains and Tuner 1300 may then reduce the suggested gains. One technique for carrying out the adjustments of step 4800 is shown in the flowchart of FIG. 6B, where resource R refers to memory.

First, in step 4810, Tuner 1300 determines whether there is more than enough resource R to meet all gains, e.g., whether the amount of resource R available for allocation (e.g., total losses plus total unassigned resource R available for allocation) is greater than the total gains. If this determination is positive, then, in step 4820, Tuner 1300 (a) allows all gains to remain the same and (b) reduces all losses to only the amount necessary to meet all gains, e.g., so that total gains equals the sum of total losses and total unassigned resource R available for allocation. Tuner 1300 may accomplish the reduction of losses by, for example, equally distributing the total reduction in losses among each partition in the set under consideration designated to suffer a loss.

If the determination in step 4810 is negative, e.g., total gains is greater than the sum of total losses and total unassigned resource R available for allocation, then processing continues with step 4830 where Tuner 1300 determines whether there is enough resource R to bring all critical partitions in the set under consideration to their minimums. If this determination is positive, then processing continues with step 4840 where Tuner 1300 (a) allows all losses to remain the same, (b) allows all gains to critical partitions in the set under consideration to remain the same, and (c) reduces all gains to player partitions in the set under consideration so that total gains equals the sum of total losses and total unassigned resource R available for allocation. Tuner 1300 may accomplish the reduction of gains to player partitions by, for example, equally distributing the total reduction in gains among all player partitions in the set under consideration designated to receive a gain.

If the determination in step 4830 is negative, then processing continues with step 4850 where Tuner 1300 (a) allows all losses to remain the same, (b) eliminates all gains to player partitions in the set under consideration, and (c) reduces all gains to critical partitions in the set under consideration so that total gains equals the sum of total losses and total unassigned resource R available for allocation. Tuner 1300 may accomplish the reduction of gains to critical partitions by, for example, equally distributing the total reduction in gains among all critical partitions in the set under consideration designated to receive a gain.

One technique through which Tuner 1300 may accomplish the reduction in gains or losses for steps 4820, 4840, and 4850, is by calculating multiplication factors which will modify each gain or loss as necessary. For example, multiplication factors called GainFactorC, GainFactorP, and LossFactor may be used as the factors for gains to critical partitions, gains to player partitions, and for losses, respectively. For step 4820 in which gains remain the same and losses are reduced so that total gains equals the sum of total losses and total unassigned resource R available for allocation, Tuner 1300 may set GainFactorC=1.0, GainFactorP=1.0, and may compute the LossFactor as $$LossFactor = \frac{((\text{Gains to All Critical Partitions in the Set under Consideration}) + (\text{Total Gains to All Player Partitions in the Set under Consideration}) - (\text{Total Unassigned Resource } R \text{ Available for Allocation}))}{(\text{Total Losses to All Partitions in the Set under Consideration})} \quad [\text{Eq. 9}]$$

Following this calculation, Tuner 1300 limits LossFactor to the range of 0.0 to 1.0 if the calculated value falls out of that range.

For step 4840 in which losses remain the same, gains to critical partitions remain the same, but gains to player partitions are reduced so that total gains equals the sum of total losses and total unassigned resource R available for allocation, Tuner 1300 may set LossFactor=1.0, GainFactorC=1.0, and may compute GainFactorP as $$GainFactorP = \frac{((\text{Total Unassigned Resouurce } R \text{ Available for Allocation}) + (\text{Total Losses to All Partitions in the Set under Consideration}) - (\text{Gains to All Critical Partitions in the Set under Consideration}))}{(\text{Total Gains to All Player Partitions in the Set under Consideration})} \quad [\text{Eq. 10}]$$

Following this calculation, Tuner 1300 limits GainFactorP to the range of 0.0 to 1.0 if the calculated value falls out of that range.

For step 4850 in which losses remain the same, gains to player partitions are eliminated, and gains to critical partitions are reduced so that total gains equals the sum of total losses and total unassigned resource R available for allocation, Tuner 1300 may set LossFactor=1.0, GainFactorP=0.0, and may compute GainFactorC as $$GainFactorC = \frac{((\text{Total Unassigned Resouurce } R \text{ Available for Allocation}) + (\text{Total Losses to All Partitions in the Set under Consideration}))}{(\text{Gains to All Critical Partitions in the Set under Consideration})} \quad [\text{Eq. 11}]$$

Following this calculation, Tuner 1300 limits GainFactorC to the range of 0.0 to 1.0 if the calculated value falls out of that range.

For each step 4820, 4840, and 4850, after GainFactorC, GainFactorP, and LossFactor have been set or calculated, Tuner 1300 modifies the gains or losses accordingly. For each APRMS partition in the set under consideration, Tuner 1300 either multiplies any gain assigned to the partition by GainFactorP if the partition is a player partition, or multiplies any gain assigned to the partition by GainFactorC if the partition is a critical partition, and multiplies any loss assigned to the partition by LossFactor. After the gains and losses with respect to resource R for the APRMS partitions in the set under consideration have been modified by steps 4820, 4840, or 4850, processing returns to the next step of the task which called for the steps of FIG. 6B to be executed. For example, where the memory tuning task called for the execution of the steps of FIG. 6B from step 4800 of FIG. 5, processing would return to step 4900 of FIG. 5.

Returning to FIG. 5, at step 4900, Tuner 1300 causes the suggested memory changes to be implemented. Tuner 1300 may accomplish this, for example, by calling an API in the System Code 300 designed to reallocate memory between partitions and informing the API which partitions should suffer a memory loss and how much of a loss and which partitions should receive a memory gain and how much of a gain.

Figure 6C:
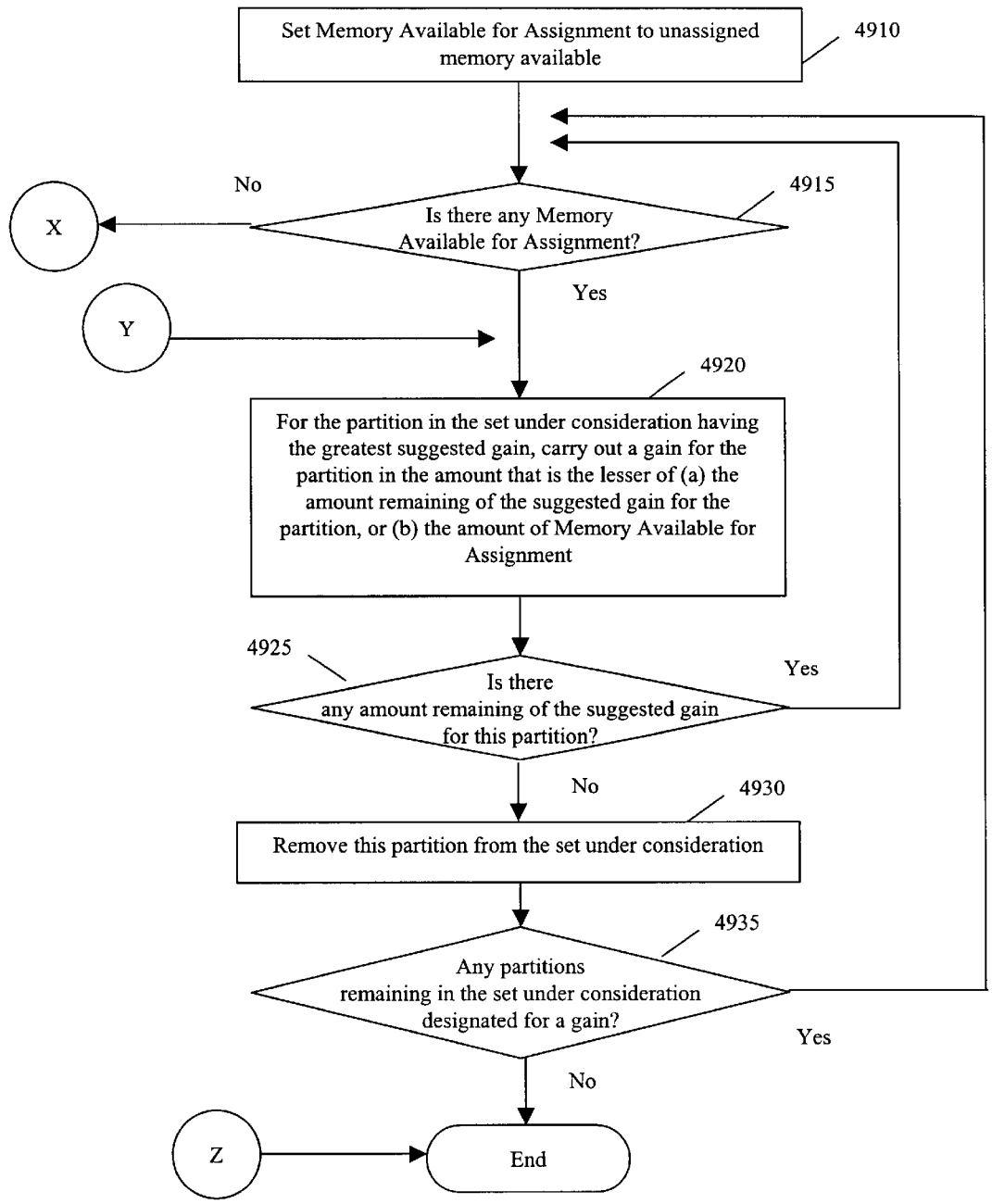
FIGS. 6C and 6D are a flowchart showing further detail of the operative embodiment of the present invention related to memory reallocation.
Figure 6D:
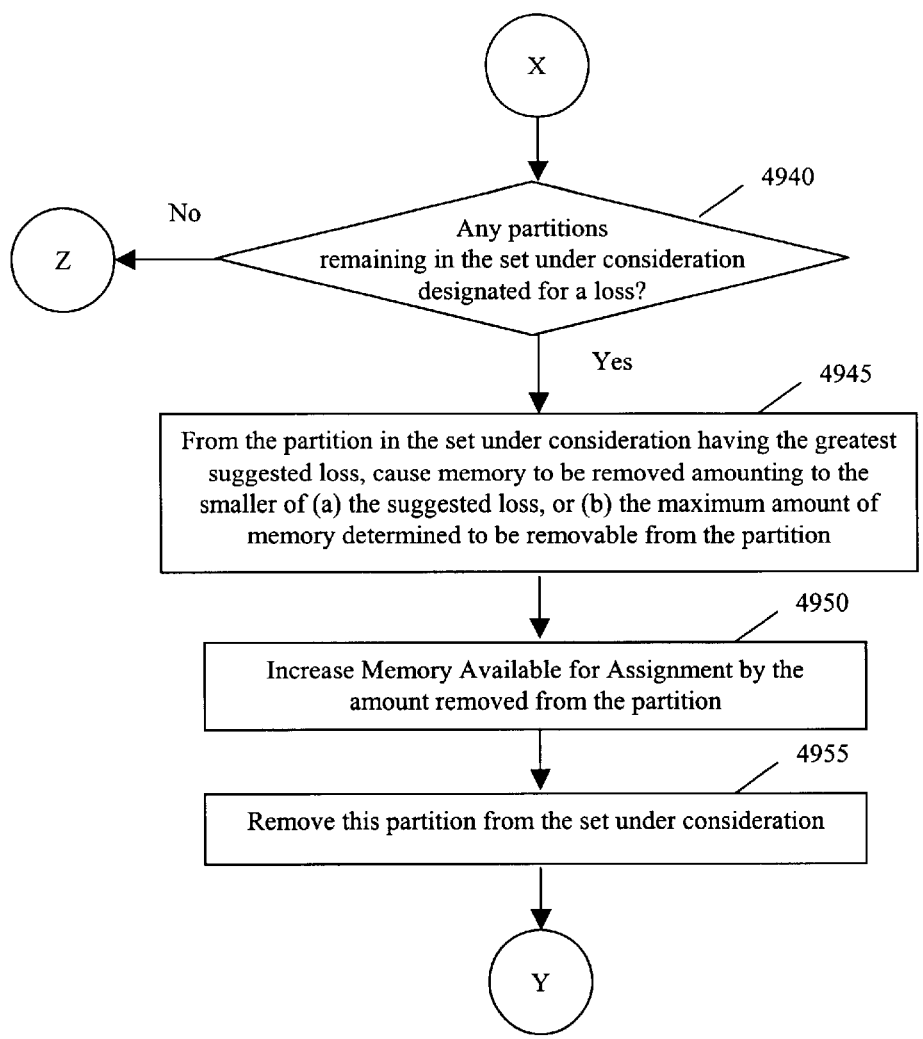

In some systems, such as the AS/400™, it may be desirable for Tuner 1300 to coordinate memory changes with the partitions themselves in addition to instructing System Code 300 to implement such changes. FIGS. 6C and 6D present a flowchart showing an exemplary technique in which this coordination may be accomplished. Referring to FIG. 6C, first, Tuner 1300 sets the Memory Available for Assignment equal to the unassigned memory available, if any, step 4910. Next, Tuner 1300 determines whether there is any Memory Available for Assignment, step 4915.

If the determination in step 4915 is negative, then processing continues with FIG. 6D and step 4940. At step 4940, Tuner 1300 determines whether there are any APRMS partitions in the set under consideration designated for a loss by the memory allocation plan. If this determination is negative, then processing ends and the memory tuning task terminates. If this determination is positive, then processing continues with step 4945 where Tuner 1300 identifies the APRMS partition in the set under consideration having the greatest suggested loss designated by the memory allocation plan and causes memory to be removed amounting to the smaller of (a) the suggested loss, or (b) the maximum amount of memory determined to be removable from the partition. Further detail regarding the procedure with which memory may be removed as required by step 4945 is provided below.

Following the memory removal of step 4945, Tuner 1300 increases the Memory Available for Assignment by the amount removed, step 4950. Tuner 1300 then removes this partition from the set under consideration, step 4955, and processing returns to FIG. 6C and step 4920.

Following either the determination of step 4915 of FIG. 6C or step 4955 of to FIG. 6D, processing continues with step 4920 of FIG. 6C, where Tuner 1300 identifies the APRMS partition in the set under consideration having the greatest suggested gain designated by the memory allocation plan and carries out a gain to this partition in the amount that is the lesser of (a) the amount remaining of the suggested gain for the partition, or (b) the amount of Memory Available for Assignment. If after carrying out this gain, Tuner 1300 determines that there is still an amount remaining of the suggested gain for the partition, step 4925, then processing returns to step 4915.

If the determination in step 4925 is negative and there is no longer any amount remaining of the suggested gain for this partition, e.g., the suggested gain for the partition has been fully satisfied, then Tuner 1300 removes the partition from the set under consideration, step 4930, and determines whether there are any partitions remaining in the set under consideration designated for a gain by the memory allocation plan, step 4935. If this determination is positive, then processing returns to step 4915. If the determination of step 4935 is negative and there are no partitions remaining in the set under consideration designated for a gain, then processing ends and the memory tuning task terminates.

The task described in step 4945 of removing memory from the partition in the set under consideration having the greatest suggested loss will now be described in more detail. After Tuner 1300 identifies the APRMS partition in the set under consideration having the greatest memory loss designated by the memory allocation plan, Tuner 1300 designates as the loss for the partition, the smaller of (a) the suggested loss for the partition, or (b) the maximum amount of memory determined to be removable from the partition, such as, for example, determined using the "Partition Memory Pool Removal Process" described below. Tuner 1300 then sends a request to the Partition Interface 1100 corresponding to this partition requesting that the amount of the designated loss be removed from this partition.

The PI 1100 then determines how much memory may be removed from this partition. For example, in some systems, such as the AS/400™, only certain types of memory may be removed from a partition, e.g., shared memory pools. The PI 1100 may make this determination by, for example, calling an API in System Code 300 designed to provide this information. After PI 1100 makes this determination, it replies to Tuner 1300's request by providing an amount of memory that may be removed from this partition which is the smaller of (i) the amount requested by Tuner 1300, or (ii) the maximum amount of memory that the PI 1100 determined could be removed from this partition.

After replying to Tuner 1300's request, PI 1100 prepares the partition for the memory to be removed. For example, where System 100 and System 300 are implemented as an AS/400™ and as OS/400™ V5R1, respectively, this may be accomplished by calling an API in System Code 300 requesting that memory be moved from this partition's shared memory pools to its base pool, from where System Code 300 can then move the memory to another partition.

Furthermore, the Pi 1100 need not take all the memory to be removed from the partition equally from all the partition's shared memory pools. For example, if the PI 1100 determines that 10 MB of memory should be removed from a partition that has 5 shared memory pools, rather than take 2 MB from each pool, the PI 1100 may decide to take 5 MB from one, 2 MB from another, 3 MB from a third, and none from the remaining two.

In general, systems often have a process running within each partition that continually monitors and adjusts memory between the pools so as to equalize the number of page faults among the pools (hereinafter referred to as the "Pool Equalizer"). When a change occurs, such as changes in the amount of memory in the partition, the Pool Equalizer will eventually readjust memory between pools so as to equalize the number of page faults among the pools. However, the Pool Equalizer takes time to recognize that a change has occurred that affects the distribution of page faults among the pools and then to react by adjusting the memory between the pools to again equalize this distribution. It follows that, indiscriminately removing memory from various pools of a partition may negatively impact performance in the partition until the Pool Equalizer recognizes and reacts to the memory removal.

Therefore, one technique that may be used by PI 1100 to prepare a partition for memory to be removed so as to minimize the negative performance impact described above is to cause memory to be removed from the pools of the partition in a manner that minimizes any adjustments the Pool Equalizer would perform afterwards. We assume that, after a removal of memory from pools of a partition, the Pool Equalizer would react by adjusting memory between the pools in order to achieve the same proportionate distribution of memory as existed prior to the removal. Based on this assumption, then one method for accomplishing a memory removal with minimal performance impact is to (a) first, for each memory pool eligible for user adjustment, determine the amount of memory that can be removed (e.g., as determined by system limits); and (b) then, for each such pool, cause memory to be removed from the pool in proportion to the amount of memory that can be removed from the pool compared to the total amount of memory that may be removed from all eligible pools.

For example, assuming a partition has two pools eligible for user adjustment with Pool A having 50 MB that can be removed and Pool B having 100 MB that can be removed, then, if 80 MB is to be removed from this partition, then 26.7 MB (computed as 80*(50/(50+100)) should be removed from Pool A and 53.3 MB (computed as 80*(100/(50+100)) should be removed from Pool B.

The method described by steps (a) and (b) above may be implemented on an AS/400™ running OS/400™ r V5R1 according to the following "Partition Memory Pool Removal" process. The PI 1100 executes this process. The input to this process is (Amount Requested), which is the amount Tuner 1300 wishes to remove from the partition, and the output from the process is (Result), which is the largest amount of memory that can be taken from the partition.

Partition Memory Pool Removal Process

1. Set (Result)=0
2. Retrieve, via system APIs, the partition's current total memory and a "quantization value" which represents the smallest increment of memory by which a memory pool can be adjusted
3. Compute (Total to be) as the partition memory if the entire request is granted.
4. If (Total to be) is less than 256 KB, return to Tuner 1300 with (Result) set to zero (no memory can be taken).
5. Compute (Five Percent)=The larger of 2000 KB and ((Total to be)*0.05) quantized to the next integer multiple of the "quantization value".
6. Retrieve, using a system API, the following data for each shared pool:
   a. For the *BASE pool:
      i. BTotMem=size of the *BASE pool
      ii. BRsvMem="reserved" memory in the *BASE pool ("Reserved" memory may be, e.g., the amount currently in-use by an operating system function).
   b. For each other shared pool:
      i. Obtain the Pool number
      ii. Obtain the Pool Total Memory
      iii. Compute Pool Available memory=(Pool size)−(Pool "reserved" memory)−256 KB.
   c. Discard any shared pool (other than *BASE) with no available memory.
7. For the *MACHINE pool divide the (Pool Available memory) by 3. For the *SPOOL pool divide the (Pool Available memory) by 2.
8. Compute the sum of all of the above (Pool Available Memory) excluding the *BASE pool. Call this total (TotAvl).
9. Attempt to change the QBASPOOL system value to (Five Percent) if that value is different from the current QBASPOOL value. Retrieve the actual value accepted by the operating system and call that (QBASPOOL).
10. Change the internal (QBASPOOL) value to the larger of itself and ((*BASE pool reserved memory)+256 KB).
11. Compute (Result)=(BtotMem)−(QBASPOOL).
12. If there are no shared pools (other than *BASE) with available memory then return to Tuner 1300.
13. Compute a (Factor)=(Amount Requested)/( TotAvl+BTotMem−QBASPOOL)
14. If (Factor) is greater than 1.0, set (Factor) to 1.0.
15. For each shared pool other than *BASE, perform the following logic.
    a. Access these pools in inverse numerical order so that the *MACHINE pool is handled last and the *SPOOL pool is next-to-last.
    b. Compute (KB to take)=(Pool Available memory)*Factor. Raise this value to the next integer multiple of the "quantization value" if needed.
    c. If (KB to take) is greater than (Pool Available memory) then reduce (KB to take) to (Pool Available memory).
    d. If (KB to take) is greater than zero, perform steps i, ii, iii, and iv below:
       i. Compute the pool's (NewSize)=(Pool Total Memory)−(KB to take).
       ii. Attempt, via a system API, to change the pool's size to (NewSize).
       iii. If step no.15(d)(ii) was successful, Compute (BTotMem)=(BTotMem)+(KB to take).
       iv. Compute (Result)=(BtotMem)−(QBASPOOL).
16. Return to Tuner 1300

After Tuner 1300 receives the PI 1100's reply to Tuner 1300's request, Tuner 1300 instructs System Code 1300 to remove from the partition the amount of memory stated in the PI 1100's reply. Tuner 1300 may accomplish this by, for example, calling an API in System Code 1300 designed for this purpose.

It should be noted that, although the method for accomplishing a memory removal with minimal performance impact described by steps (a) and (b) and the "Partition Memory Pool Removal" process is discussed above in connection with its use by the APRMS system and the memory tuning task, the method for accomplishing a memory removal with minimal performance impact described by steps (a) and (b) and the "Partition Memory Pool Removal" process above may also be used independently of the APRMS system and the memory tuning task. For example, in any situation where it is desired to remove memory from a partition, e.g., where a system administrator prepares to manually remove memory from a partition, the method for accomplishing a memory removal with minimal performance impact described by steps (a) and (b) and the "Partition Memory Pool Removal" process may be used to accomplish this partition memory removal.

Figure 8:
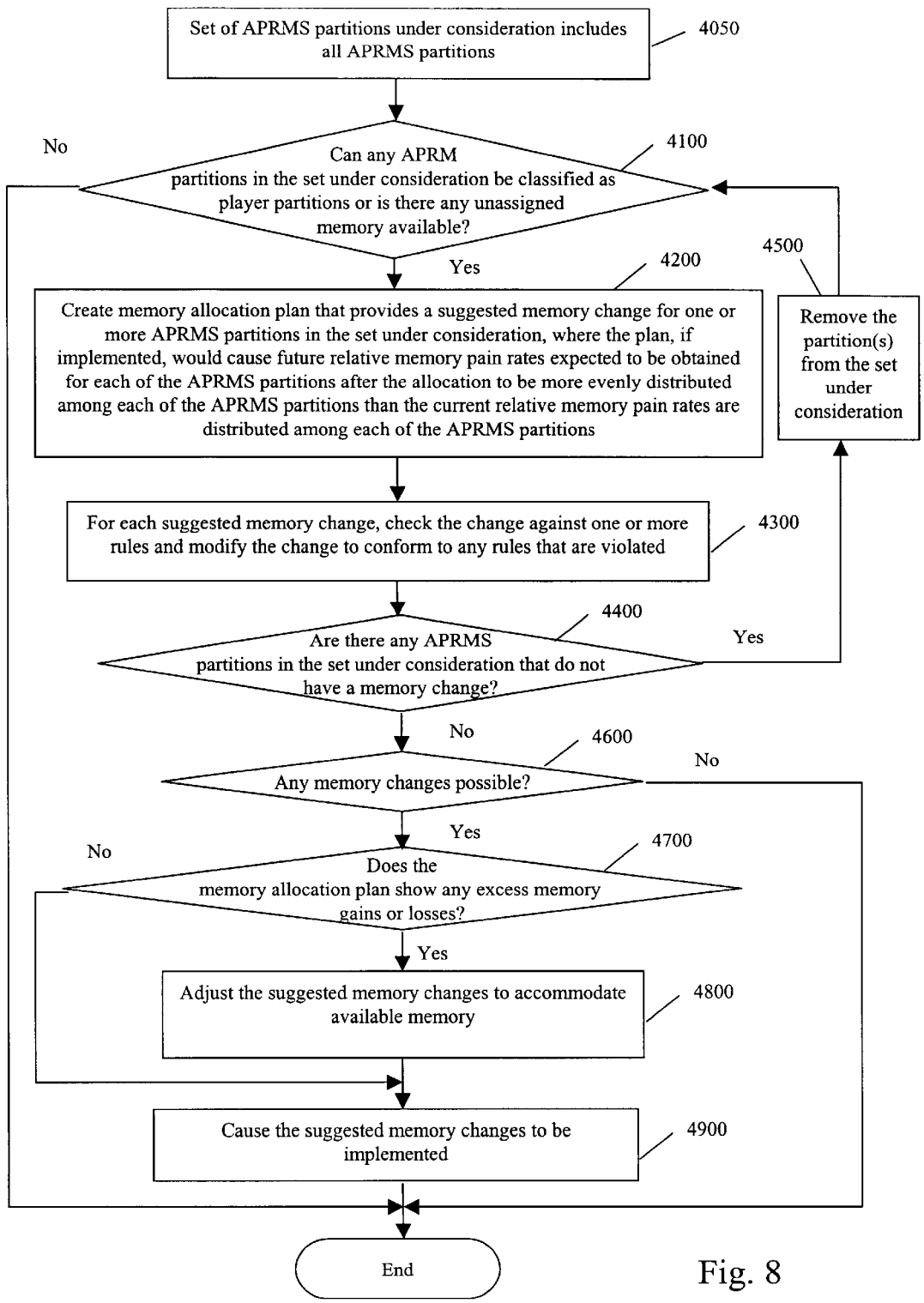
FIG. 8 is a flowchart showing another operative embodiment of the present invention related to memory reallocation.

FIG. 8 presents a flowchart describing another technique for allocating memory among APRMS partitions in accordance with step 4000 of FIG. 4. The technique described in FIG. 8 is a modification of the technique shown in FIG. 5, where the technique of FIG. 8 includes all the operations of the technique of FIG. 5 as well as additional operations. Consequently, any step in FIG. 8 having the same reference numeral as a step in FIG. 5 operates in an identical manner to the corresponding step of FIG. 5.

In FIG. 8, the process begins with the all the APRMS partitions being included in the set of APRMS partitions under consideration, step 4050. Then, Tuner 1300 determines (1) whether any APRMS partitions in the set under consideration may be classified as player partitions, or (2) if there is any unassigned memory available. Tuner 1300 may identify each APRMS partition in the set under consideration as critical or player and also may determine the amount, if any, of unassigned memory available as described previously in connection with step 4210 of FIG. 6A. If the determination in step 4100 is negative, e.g., Tuner 1300 cannot classify any APRMS partition in the set under consideration as a player partition and there is no unassigned memory available, then no memory allocation is carried out and the memory tuning task terminates.

If the determination in step 4100 is positive, processing continues with step 4200 where, as described previously in connection with FIGS. 5 and 6A, Tuner 1300 creates a memory allocation plan that provides a suggested memory change for one or more of the APRMS partitions in the set under consideration, where the plan, if implemented, would cause future relative memory pain rates expected to be obtained for each of the APRMS partitions after the implementation to be more evenly distributed among each of the APRMS partitions than the current relative memory pain rates are distributed among each of the APRMS partitions.

Then, as previously described in connection with FIG. 5, Tuner 1300 checks each suggested change against one or more rules and modifies the change to conform to any rules that are violated, step 4300. After the memory change for each APRMS partition in the set under consideration suggested by the memory allocation plan has been checked against the resource allocation rule(s) as described above and modified as necessary, processing continues with step 4400.

In step 4400, Tuner 1300 identifies any APRMS partitions in the set under consideration to whom the memory allocation plan has assigned no memory change, e.g., zero memory gain and zero memory loss. If any partitions are so identified, then Tuner 1300 removes those identified partitions from the set under consideration, step 4500, and processing goes back to step 4100.

If no partitions are identified in step 4400, then processing continues with step 4600 where Tuner 1300 checks if any memory changes are possible. Tuner 1300 may do this by checking the modified memory allocation plan to determine if the total gains and total losses are both zero, e.g., no gain or loss has been assigned to any APRMS partition. If the determination in step 4600 is negative, e.g., no memory changes are possible, then the memory tuning task terminates. If the determination in step 4600 is positive, then processing continues with step 4700.

In step 4700, Tuner 1300 determines whether the memory allocation plan contains any excess memory gains or losses. Tuner 1300 may do this by examining the total gain and total loss suggested in the modified memory allocation plan as well as the total unassigned memory. If the equation $$\text{Total Suggested Gain} = (\text{Total Suggested Loss}) + \quad\quad [\text{Eq. 8}]$$
$$(\text{Total Unassigned Memory})$$

is true, then there are no excess memory gains or losses and the memory changes suggested by modified memory allocation plan are a "perfect fit". In this case, processing continues with step 4900. If there are excess memory gains or excess memory losses, e.g., if Equation 8 above is not true, then processing continues with step 4800 where, as described previously in connection with FIGS. 5 and 6B, Tuner 1300 adjusts the suggested memory changes, to accommodate available memory, e.g., to eliminate the excess memory gains or excess memory losses.

Continuing with FIG. 8, after step 4800 or following negative determinations in steps 4100 or 4700, processing continues with step 4900 where, as described previously in connection with FIGS. 5 and 6C, Tuner 1300 causes the suggested memory changes to be implemented.

In addition to the memory tuning task, other tasks, as described previously, may be initiated, including tasks that tune processor power and interactive processor (or "interactive") power. In an embodiment of the present invention, one such task tunes both processor power and interactive power together. Such a tuning task is useful in some systems, such as an AS/400™ running OS/400™ V5R1, where processor power and interactive power are interdependent upon each other in that the amount of resource that may be allocated to one is dependent upon the amount of resource that is allocated to the other.

Figure 9:
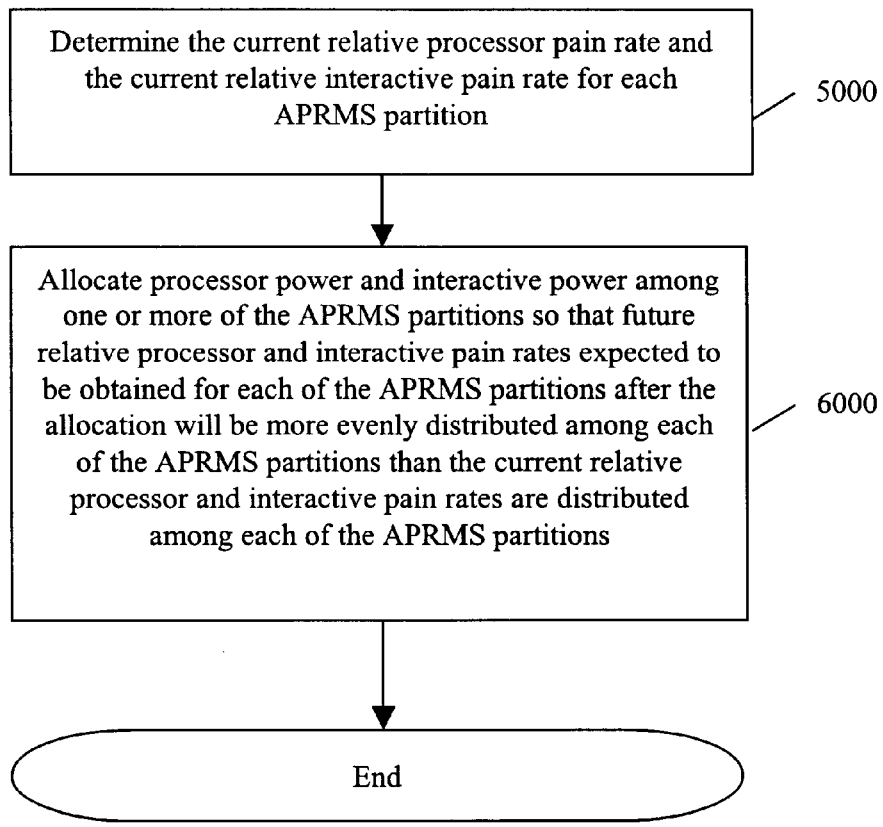
FIG. 9 is flowchart showing an operative embodiment of the present invention related to determination of processor power pain and interactive power pain and reallocation of processor power and interactive power.

FIG. 9 is a flowchart showing the operation of the task for tuning processor power and interactive power across APRMS partitions (or the "P/I tuning task"). Once initiated by the control and management function of Tuner 1300, the P/I tuning process begins by determining the current relative processor and interactive pain rates for each APRMS partition, step 5000.

To determine relative processor and interactive pain rates, Tuner 1300 first determines absolute processor and interactive pain rates. (Note that absolute processor pain rate may also be referred to as "processor pain rate" or "current processor pain rate" and absolute interactive pain rate may be referred to as "interactive pain rate" or "current interactive pain rate"). For a given partition, the processor pain rate for that partition may be described as being directly related to the processor usage rate for that partition. For example, the processor pain rate for a partition may be related to the processor usage rate multiplied by a factor, where the factor increases as the processor usage rate increases.

In a more specific example, specific ranges for processor usage may be defined with base pain values and factors associated with each usage range such that, for a given processor usage rate falling in a given usage range, the corresponding processor pain rate may be computed as the base pain value associated with the given usage range summed with the product of the factor multiplied by the amount of processor usage greater the lower limit of the given usage range. This specific example may be illustrated by the following Table 5:

TABLE 5

| Processor Usage Rate Ranges | Base Pain Value | Factor | Processor Pain Rate |
|---|---|---|---|
| 0–40% | 0 | 1 | 0 + 1 * (Processor Usage Rate - 0%) |
| 40–65% | 40 | 2 | 40 + 2 * (Processor Usage Rate - 40%) |
| 65–85% | 90 | 3 | 90 + 3 * (Processor Usage Rate - 65%) |
| 85% and higher | 135 | 4 | 135 + 4 * (Processor Usage Rate - 85%) |

Thus, following the example values in Table 5 above, it can be seen that a processor usage rate of 50 corresponds to a processor pain rate of 60 (60=40+2*(50–40)). It should be noted, however, that the processor usage rate ranges and corresponding base pain values and factors may be user definable and may vary as a matter of design choice for the implementer or user of the APRMS 1000.

Therefore, to determine the processor pain rate for a given partition, Tuner 1300 may first obtain the processor usage rate obtained and stored for that partition in Storage 1200 by one of the Partition Interfaces 1100. Then, Tuner 1300 may determine the processor pain rate for the partition in the manner described above.

Similar to the processor pain rate, the interactive pain rate for a given partition may be described as being directly related to the interactive usage rate for that partition. For example, the interactive pain rate for a partition may be related to the interactive usage rate multiplied by a factor, where the factor increases as the processor usage rate increases.

In a more specific example, two ranges for interactive usage rate ("IUR") may be defined, with the first range ("R1") running from zero to the interactive threshold ("IT") and the second range ("R2") running from just above IT to the interactive limit ("IL") and above. Within each of the two ranges, sub-ranges may be defined with base pain values ("BPV") and factors associated with each sub-range in each of the two larger ranges. Then, for a given IUR, the corresponding interactive pain rate may be computed in three stages. First, for the part of the given IUR falling within a given sub-range of R1, a first value may be determined as the BPV associated with the given sub-range of R1 summed with the product of the factor associated with the given sub-range of R1 multiplied by the difference of the given IUR minus the lower limit of the given sub-range of R1. Second, for the part of the given IUR falling within a given sub-range of R2, a second value may be determined as the BPV associated with the given sub-range of R2 summed with the product of the factor associated with the given sub-range of R2 multiplied by the difference of the given IUR minus the lower limit of the given sub-range of R2. Third, the interactive pain rate may be determined as the sum of the first and second values.

This specific example may be illustrated by reference to Tables 6A and 6B below.

TABLE 6A (for First Range "R1": 0 ≤ IUR)

| R1 Sub-Ranges | BPV | Factor | Interactive Pain Rate for R1 |
|---|---|---|---|
| 0–50% of R1 | 0 | 1 | 0 + 1 * (IUR - 0% of R1) |
| 50–75% of R1 | 50 | 2 | 50 + 2 * (IUR - 50% of R1) |
| 75–90% of R1 | 100 | 3 | 100 + 3 * (IUR - 75% of R1) |
| 90 and higher | 145 | 5 | 145 + 5 * (IUR - 90% of R1) |

TABLE 6B (for Second Range "R2": IT < IUR)

| R2 Sub-Ranges | BPV | Factor | Interactive Pain Rate for R2 |
|---|---|---|---|
| 0–50% of R2 | 0 | 10 | 0 + 10 * (IUR - 0% of R2) |
| 50–75% of R2 | 500 | 20 | 500 + 20 * (IUR - 50% of R2) |
| 75–90% of R2 | 1000 | 30 | 1000 + 30 * (IUR - 75% of R2) |
| 90% and higher | 1450 | 50 | 1450 + 50 * (IUR - 90% of R2) |

To further illustrate, assume that for a given partition, the IT and IL are set at 50% and 60% of processor power, respectively. Then, for an IUR of 40%, the interactive pain rate may be determined as follows, with reference to Tables 6A and 6B above: With an IT of 50% of processor power, R1 runs from zero to 50% and an IUR of 40% falls completely within R1. Since 40% is 80% of 50%, the IUR falls within the third sub-range of R1. Consequently, the first value corresponding to the part of IUR falling within R1 may be determined as 100+3*(80%−75%)=115. Since the IUR of 40% falls completely within R1, there is no second value corresponding to R2 and the interactive pain rate for this partition is simply the first value of 115.

In another example, assume that for the same partition, the IUR is measured as 58% of processor power. R1 runs from zero to 50% and R2 runs from just greater than 50% to above. For purposes of determining pain, however, R2 is considered to have a magnitude of 10% (60% IL−50% IT). Thus, an IUR of 58% falls within both R1 and R2 with 50% falling within R1 and 8% (58% IUR−50% IT) falling within R2. Consequently, the first value corresponding to the part of the IUR falling within R1 may be determined as 145 +5*(116%−90%)=275. Since 8% is 80% of 10% (the magnitude of R2), the part of the IUR falling within R2 falls within the third sub-range of R2. Consequently, the second value corresponding to the part of the IUR falling within R2 may be determined as 1000+30*(80%−75%)=1150. And so, the interactive pain rate corresponding to an IUR of 58% for this partition may be determined as 275+1150=1425.

Therefore, to determine the interactive pain rate for a given partition, Tuner 1300 may first obtain the interactive usage rate, the interactive threshold, and the interactive limit previously obtained and stored for that partition in Storage 1200 by one of the Partition Interfaces 1100. Then, Tuner 1300 may determine the interactive pain rate for the partition in the manner describe above.

Once the processor and interactive pain rates for a partition have been determined, Tuner 1300 may then determine the relative processor and relative interactive pain rates for the partition using the priority values previously assigned by the user to each APRMS partition to determine relative processor and relative interactive pain rates. As described previously in connection with the determination of relative memory pain rates, Tuner 1300 may determine the relative priority value of a given APRMS partition as the ratio of the highest priority value assigned to any APRMS partition divided by the priority value assigned to the given APRMS partition. For example, for Partitions 1, 2, and 3 having assigned priority values of 10, 20, and 60, respectively, the relative priority values of Partitions 1, 2, and 3, may be determined as 60/10=6, 60/20=3, and 60/60=1, respectively. Having determined the relative priority value for a partition, Tuner 1300 may then determine the relative processor or relative interactive pain rate for the partition by, for example, multiplying the partition's relative processor or relative interactive pain rate by the partition's relative priority value.

If desired, any or all of the current processor pain rates, the current relative processor pain rates, the current interactive pain rates, and the current relative interactive pain rates for each APRMS partition may be stored and then provided, e.g., displayed, to a user 10 by Tuner 1300. The user may then use the current and relative processor and/or interactive pain rates as a guide to deciding which partitions should receive additional processor and/or interactive power and in what order.

Returning to FIG. 9, once the current relative processor and relative interactive pain rates have been calculated for each APRMS partition, Tuner 1300 then, in step 6000, allocates processor power and/or interactive power among one or more of the APRMS partitions so that future relative processor and relative interactive pain rates expected to be obtained for each of the APRMS partitions after the allocation will be more evenly distributed among each of the APRMS partitions than the current relative processor and relative interactive pain rates are distributed among each of the APRMS partitions. The processor and/or interactive power that Tuner 1300 allocates may be (1) unassigned and available, e.g., processor and/or interactive power usable by System 100 and System Code 300 but not currently assigned to any partition, and/or (2) processor or interactive taken from one or more of the APRMS partitions.

Figure 10:
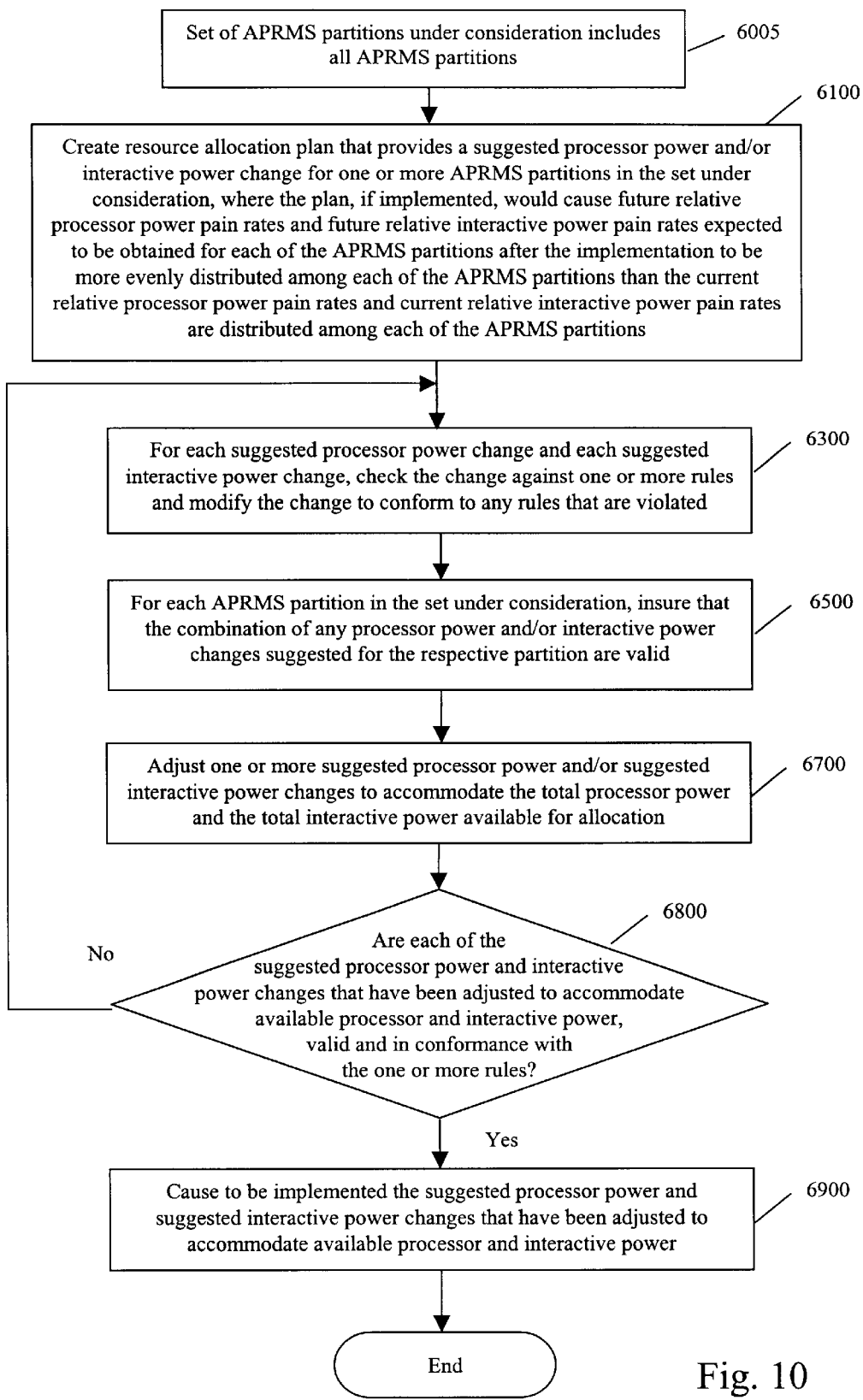
FIG. 10 is a flowchart showing an operative embodiment of the present invention related to reallocation of processor power and interactive power.

One technique for the allocating of processor and/or interactive power resources among APRMS partitions in accordance with step 6000 is shown in the flowchart of FIG. 10. The process begins with all the APRMS partitions being included in the set of APRMS partitions under consideration, step 6005. Then, in step 6100, Tuner 1300 creates a resource allocation plan that provides a suggested processor power and/or interactive power change for one or more APRMS partitions in the set under consideration, where the plan, if implemented, would cause future relative processor power pain rates and future relative interactive power pain rates expected to be obtained for each of the APRMS partitions after the implementation to be more evenly distributed among each of the APRMS partitions than the current relative processor power pain rates and current relative interactive power pain rates are distributed among each of the APRMS partitions.

Figure 11A:
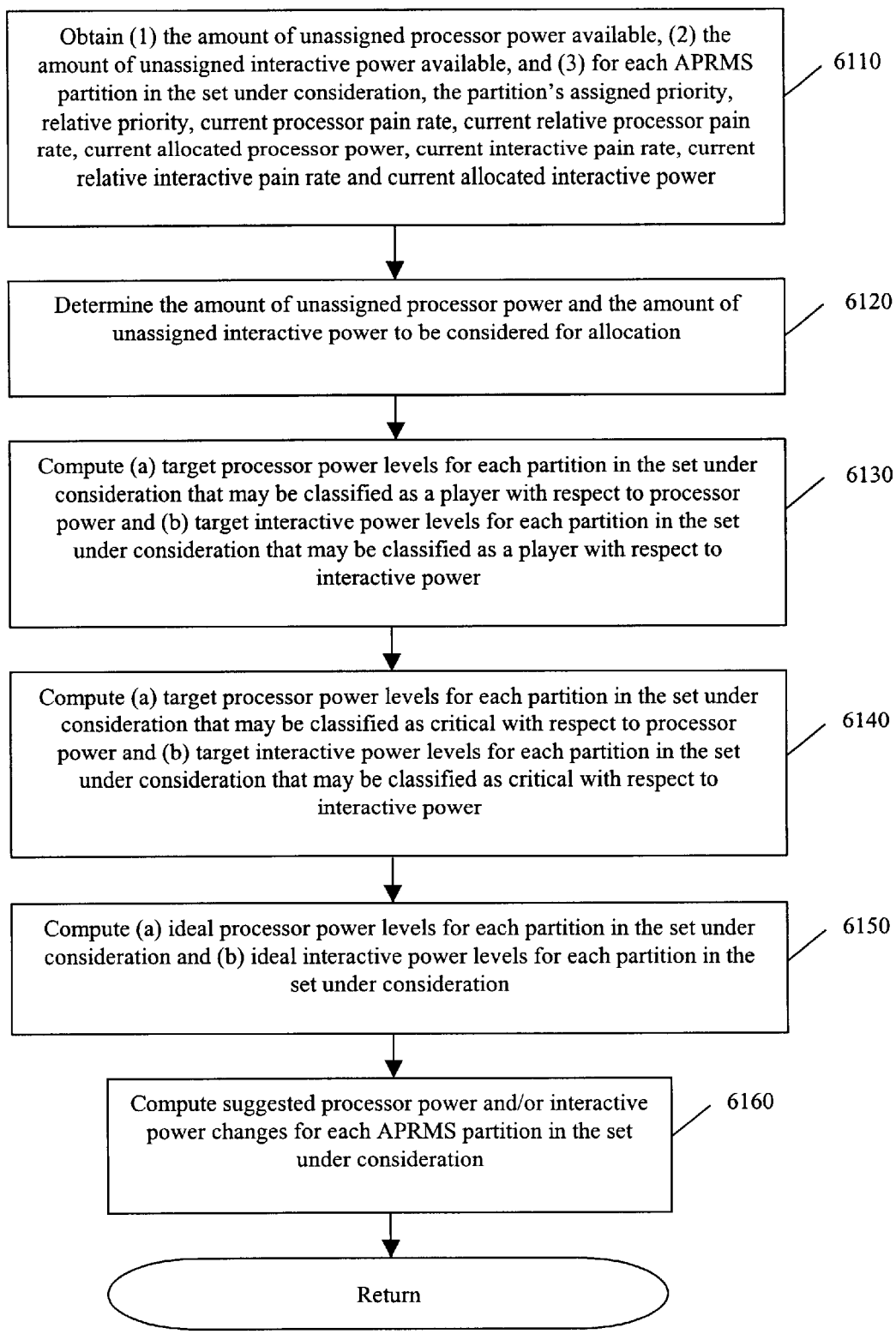
FIG. 11A is a flowchart showing further detail of the operative embodiment of the present invention related to reallocation of processor power and interactive power.

One technique for creating such a resource allocation plan is presented in the flowchart of FIG. 11A. As an initial step, Tuner 1300, in step 6110, obtains (1) the amount of unassigned processor power available, (2) the amount of unassigned interactive power available, and (3) for each APRMS partition in the set under consideration, the partition's assigned priority, relative priority, current processor pain rate, current relative processor pain rate, current allocated processor power, current interactive pain rate, current relative interactive pain rate and current allocated interactive power. Tuner 1300 may obtain the amounts, if any, of any available unassigned processor power and interactive power by, for example, calling an API in System Code 300 designed to provide this information.

The values of assigned priority, relative priority, current processor pain rate, current relative processor pain rate, current allocated processor power, current interactive pain rate, current relative interactive pain rate and current allocated interactive power, may be obtained differently for each partition depending upon whether the partition may be classified as a player or a critical partition. As described previously, with regard to any resource, such as processor power or interactive power, an APRMS partition may be classified as (a) a player partition if the current resource allocated to the partition is equal to or greater than the assigned minimum, or (b) a critical partition if the current resource allocated is below assigned minimum. For each APRMS partition, Tuner 1300 may obtain the amounts of processor power and interactive power currently allocated to the partition by, for example, calling an API in System Code 300 designed to provide this information. Then, using this Tuner 1300 may determine, with respect to both processor power and interactive power, whether each APRMS partition may be classified as a player or a critical partition.

Where an APRMS partition may be classified as a player with respect to either processor power or interactive power, Tuner 1300 may obtain for the partition the values of assigned priority, relative priority, current processor pain rate, current relative processor pain rate, current allocated processor power, current interactive pain rate, current relative interactive pain rate and current allocated interactive power through various ways as discussed previously, including the use of Equations 2 and 3 above.

Where an APRMS partition may be classified as a critical partition with respect to either processor power or interactive power, Tuner 1300 automatically assigns to that partition an, assigned priority value of zero. Furthermore, if the APRMS partition is critical with respect to processor power, Tuner 1300 assigns to the partition a current processor pain rate of zero and does not use or obtain values for relative priority or the current relative processor pain rate. If the APRMS partition is critical with respect to interactive power, Tuner 1300 assigns to the partition a current interactive pain rate of zero and does not use or obtain values for relative priority or the current relative interactive pain rate.

FIG. 12A is a spreadsheet depicting an example resource allocation plan for processor power and interactive power that may be initially created through the operation of step 6100 of FIG. 10. The spreadsheet of FIG. 12A comprises 28 columns and 6 rows and shows data for 5 APRMS partitions, where all partitions are player partitions, Partitions 1 and 2 are configured for shared processor allocation, and Partitions 3–5 are configured for whole processor allocation. Sample values for each partition for assigned priority, relative priority, current processor pain rate, current relative processor pain rate, current interactive pain rate, current relative interactive pain rate, current allocated processor power, and current allocated interactive power, appear in columns 3–9 of the spreadsheet. Totals for various values appear in row 6.

Returning to FIG. 11A, after the appropriate values are obtained for each APRMS partition in step 6110, processing continues with step 6120 where Tuner 1300 determines the amount of unassigned processor power and the amount of unassigned interactive power to be considered for allocation. As discussed above, in some systems, such as an AS/400™ running OS/400™ V5R1, processor power and interactive power are interdependent upon each other such that the amount of resource that may be allocated to one is dependent upon the amount of resource that is allocated to the other. For example, for a given system configuration (e.g., a System 100 having a given amount of processor power and interactive power for the entire System 100), there may be a range of processor power allocations that are valid for each possible amount of interactive power that may be allocated.

It should be noted here that processor power may be allocated according to multiple schemes. For example, in systems, such as an AS/400™ running OS/400™ V5R1, processor power may be allocated either in units of whole processors or in units of portions of processors (e.g., hundredths of a processor) where shared processor pools are supported. In either case, interactive power may be allocated as a percentage of the total system interactive power available.

To further illustrate the interdependence of interactive power and processor power allocations, reference is made to Tables 7A and 7B presented in FIGS. 13A and 13B, respectively. Table 7A shows exemplary interactive processor amounts and corresponding ranges of processor power that are valid for those interactive power amounts for a given system configuration having a maximum of 18 processors available for allocation and where processor power is allocated in portions of processors. For the same configuration, Table 7B shows exemplary interactive processor amounts and corresponding ranges of processor power that are valid for those interactive power amounts, where processor power is allocated in whole (or "physical") processors. Referring to Table 7A, record no. 7 shows that for an interactive power allocation of 7%, the corresponding processor power range is a minimum of 0.24 processors and a maximum of 7.31 processors. Thus, for example, for a partition where the desired interactive power allocation is 7%, the amount of processor power that must be allocated to the same partition must be at least 0.24 processors and no greater than 7.31 processors.

Tuner 1300 may determine the processor power ranges that are valid for each amount of interactive power that may be allocated by, for example, calling an API in System Code 300 designed to provide this information. For example, for each amount of interactive power that may be allocated for a given system configuration, Tuner 1300 may call this API, passing the respective amount of interactive power desired to be allocated, and receiving from the API the corresponding processor power range that is valid for the respective amount of interactive power. Alternatively, as described further below, tables (which may be called "validity tables") listing, for a given system configuration, all possible amounts of interactive power that may be allocated and their corresponding processor power ranges (such as Tables 7A and 7B) may be created ahead of time prior to the initiation of the P/I tuning task. Tuner 1300 may then simply refer to a validity table to determine the processor power range that is valid for a given amount of interactive power.

Returning to FIG. 11A, in step 6120, Tuner 1300 may determine the amount of unassigned processor power and the amount of unassigned interactive power to be considered for allocation by, for example, consulting a previously created validity table as described above. For example, Tuner 1300 may determine the preliminary total processor power available as the sum of the unassigned processor power available plus the total processor power currently allocated to all APRMS partitions in the set under consideration and also determine the preliminary total interactive power available as the sum of the unassigned interactive power available plus the total interactive power currently allocated to all APRMS partitions in the set under consideration. Then, Tuner 1300 may consult the validity table to determine whether the preliminary total processor power available falls within the range of processor power that is valid for the preliminary total interactive power available.

If the preliminary total processor power available does fall within this range, then Tuner 1300 will set the unassigned processor power to be considered for allocation to be equal to the unassigned processor power available and also set the unassigned interactive power to be considered for allocation to be equal to the unassigned interactive power available. Tuner 1300 will then set the final total processor power available (or just "total processor power available") as the sum of the unassigned processor power to be considered for allocation plus the total processor power currently allocated to all APRMS partitions in the set under consideration and also set the final total interactive power available (or just "total interactive power available") as the sum of the unassigned interactive power to be considered for allocation plus the total interactive power currently allocated to all APRMS partitions in the set under consideration. Note, here, that since unassigned processor power to be considered for allocation and the unassigned interactive power to be considered for allocation have been set to the same values as unassigned processor power available and unassigned interactive power available, respectively, total processor power available and total interactive power available remain unchanged from the values for preliminary total processor power available and preliminary total interactive power available, respectively.

However, if the preliminary total processor power available does not fall within the valid processor power range for the preliminary total interactive power available, then Tuner 1300 may limit either the unassigned processor power that will be used or the unassigned interactive power that will be used. For example, if the preliminary total processor power available falls above the maximum of the valid processor power range, then Tuner 1300 may set the unassigned interactive power to be considered for allocation to be equal to the unassigned interactive power available so that the total interactive power available remains the same as the preliminary total interactive power available, but limit the unassigned processor power to be considered for allocation to an amount less than the unassigned processor power available so that total processor power available (e.g., the sum of unassigned processor power to be considered for allocation and the total processor power currently allocated to all APRMS partitions in the set under consideration) falls within the range.

Alternatively, if the preliminary total processor power available falls below the minimum of the valid processor power range, then Tuner 1300 may set the unassigned processor power to be considered for allocation to be equal to the unassigned processor available so that the total processor power available remains the same as the preliminary total processor power available, but limit the unassigned interactive power to be considered for allocation to an amount less than the unassigned interactive power available so that the valid processor power range for the total interactive power available (e.g., the sum of unassigned interactive power to be considered for allocation and the total interactive power currently allocated to all APRMS partitions in the set under consideration) encompasses the total processor power available.

For example, assume that Tuner 1300 determines the preliminary total interactive power available to be 16%, the unassigned processor power available to be 0.5 processors and the total processor power currently allocated to all APRMS partitions in the set under consideration to be 16.25 processors. Here, the preliminary total processor power available is 16.75 processors (0.5+16.25). However, referring to Table 7A, record no. 16 shows that for an interactive power allocation of 16%, 16.70 processors is the maximum processor power allocation that is valid for the system configuration represented by the table. Consequently, Tuner 1300 may limit the unassigned processor power to be considered for allocation to 0.45 processors so that the final total processor power available (0.45+16.25=16.70) falls within the valid processor power range indicated by the validity table.

Continuing with FIG. 11A, Tuner 1300 next, in step 6130, computes (a) target processor power levels for each APRMS partition in the set under consideration that may be classified as a player with respect to processor power and (b) target interactive power levels for each APRMS partition in the set under consideration that may be classified as a player with respect to interactive power. For both processor power and interactive power, target resource levels for each player partition in the set under consideration may be computed using Equation 4 above where Resource R is alternatively processor power and interactive power.

Then in step 6140, Tuner 1300 computes (a) target processor power levels for each APRMS partition in the set under consideration that may be classified as critical with respect to processor power and (b) target interactive power levels for each APRMS partition in the set under consideration that may be classified as critical with respect to interactive power. For both processor power and interactive power, target resource levels for each critical partition in the set under consideration may be computed using Equation 5 above and limited, as necessary, according to Equation 6 above where for both equations Resource R is alternatively processor power and interactive power.

Next in step 6150, Tuner 1300 computes (a) ideal processor power levels for each APRMS partition in the set under consideration and (b) ideal interactive power levels for each APRMS partition in the set under consideration. The ideal processor power level for each such APRMS partition may refer to the result obtained when the target processor power level for the respective partition is prorated to achieve a realizable amount without considering the validity of the processor power level in relation to interactive power. Similarly, the ideal interactive power level for each such APRMS partition may refer to the result obtained when the target interactive power level for the respective partition is prorated to achieve a realizable amount without considering the validity of the interactive power level in relation to processor power. For any APRMS partition A, the ideal resource level of Resource R for that partition may be calculated as:

$$\begin{aligned}\text{Ideal Resource Level} &= ( \text{Target for Resource R for Partition A} ) \ast \\ \text{for Partition A} & \quad ( ( \text{Sum of Current Resources} \\ \text{for Resource R} & \quad \text{of Resource R for All Partitions} \\ & \quad \text{in the Set under Consideration} ) + \\ & \quad ( \text{Any Unassigned Resource R} ) ) / \\ & \quad ( \text{Sum of Target Resources for Resource R} \\ & \quad \text{for All Partitions in the} \\ & \quad \text{Set under Consideration} ) \quad [\text{Eq. 9}]\end{aligned}$$

Once ideal processor power and interactive power levels have been computed for each APRMS partition in the set under consideration, Tuner 1300 then, in step 6160, calculates suggested processor power and/or interactive power changes for each APRMS partition in the set under consideration based on the current processor power or interactive power allocated for the respective partition and the new amount of processor power or interactive power suggested for the respective partition, e.g., the ideal processor power level or interactive power level calculated. Processing then returns to the next step for the P/I tuning task, e.g., step 6300 of FIG. 10.

Returning to FIG. 10, processing continues with step 6300 where Tuner 1300 checks each suggested processor power change and each suggested interactive power change against one or more rules and modifies the change to conform to any rules that are violated. Tuner 1300 may accomplish this by, for example, insuring that each suggested processor power and interactive power change conforms to one or more resource allocation rules, such as rules C1 and P1 through P4 described above.

For rule P2, the predetermined threshold may be set at, for example, 0.01 processors where resource R refers to processor power and processor power is allocated in portions of processors or it may be set at, for example, 1 processor where processor power is allocated in whole processors. Where resource R refers to interactive power, the predetermined threshold for rule P2 may be set at, for example, 1%.

For rule P3, the maximum allowable loss for both processor power and interactive power may be set at, for example, the amount of processor power or interactive power current allocated multiplied by a factor, such as 75%. Thus, for a given partition, the maximum allowable loss in processor power may be 75% of the processor power currently allocated to the partition.

For rule P4, the predetermined pain rate threshold may be set at, for example, 10 units of pain as determined by Table 5 above where resource R refers to processor power and may be set at, for example, 35 units of pain as determined by Tables 6A and B above where resource R refers to interactive power.

Where resource R refers to processor power, an additional resource allocation rule P5, may require that, for an APRMS partition configured for whole processors, Tuner 1300 quantize a suggested processor power change to the nearest whole processor value as necessary.

Returning to FIG. 10, after the processor power and interactive power changes suggested for each APRMS partition in the set under consideration have been checked against the resource allocation rule(s) and modified as necessary, processing continues with step 6500 where, for each APRMS partition in the set under consideration, Tuner 1300 insures that the combination of any processor power and/or interactive power changes suggested for the respective partition are valid. As described previously in connection with step 6120 of FIG. 11A, Tuner 1300 may determine whether a pair of interactive power and processor power values are valid by referring to previously created validity tables, such as Tables 7A and 7B of FIGS. 13A and 13B, respectively.

Figure 11B:
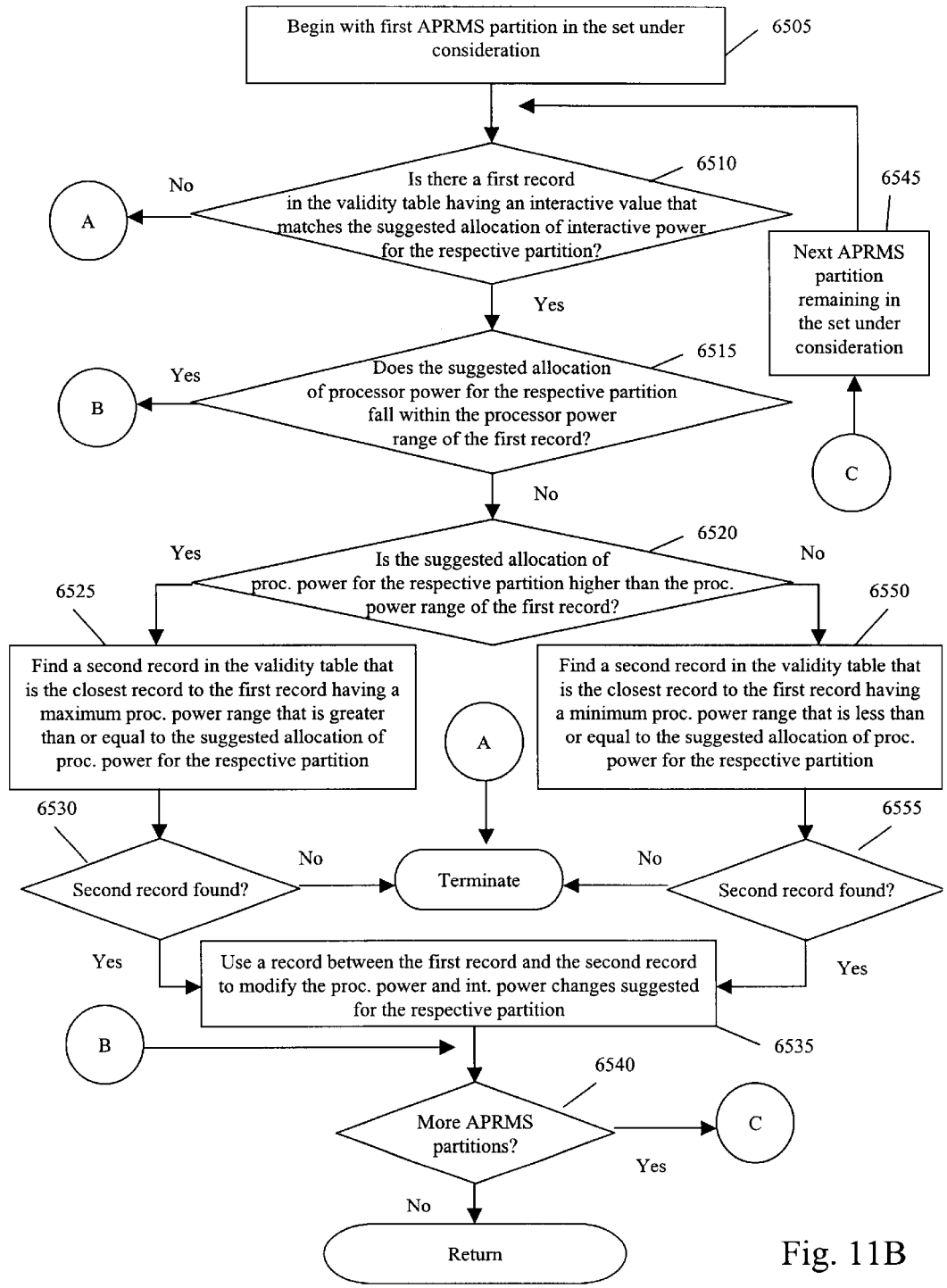
FIG. 11B is a flowchart showing further detail of the operative embodiment of the present invention related to reallocation of processor power and interactive power.

One technique for carrying out this operation of insuring processor and interactive power validity is shown in the flowchart of FIG. 11B. Beginning with the first APRMS partition in the set under consideration, step 6505, Tuner 1300 determines whether there is a first record in the validity table having an interactive value that matches the suggested allocation of interactive power for the respective partition (e.g., the sum of the current allocation of interactive power for the respective partition and the gain or loss of interactive power suggested for the respective partition), step 6510. If this determination is negative, then the P/I tuning task terminates without any allocation of processor or interactive power.

If this determination is positive, e.g., a matching record is found, then processing continues with step 6515 where Tuner 1300 determines whether the suggested allocation of processor power (e.g., the sum of the current allocation of processor power for the respective partition and the gain or loss of processor power suggested for the respective partition) falls within the processor power range of the first record. If the determination of step 6515 is positive, then processing continues with step 6540, discussed below. If the determination of step 6515 is negative, then processing continues with step 6520 where Tuner 1300 determines whether the suggested allocation of processor power for the respective partition is higher than the processor power range of the first record.

If the determination of step 6520 is positive, then processing continues with step 6525 where Tuner 1300 attempts to find a second record in the validity table that is the closest record to the first record having a maximum processor power range that is greater than or equal to the suggested allocation of processor power for the respective partition. If no such second record is found, step 6530, then the P/I tuning task terminates without any allocation of processor or interactive power. If such a record is found, then processing continues with step 6535.

If the determination of step 6520 is negative, then processing continues with step 6550 where Tuner 1300 attempts to find a second record in the validity table that is the closest record to the first record having a minimum processor power range that is less than or equal to the suggested allocation of processor power for the respective partition. If no such second record is found, step 6555, then the P/I tuning task terminates without any allocation of processor or interactive power. If such a record is found, then processing continues with step 6535.

In step 6535, Tuner 1300 uses a record between the first record and the second record (the "Intermediate Record") to modify the processor power and interactive power changes suggested for the respective partition. The Intermediate Record may be, for example, the record midway between the first and second records, rounding down. For example, where the first and second records are records no. 1 and no. 5, respectively, the Intermediate Record may be record no. 3. Where the first and second records are records no. 1 and no. 4, respectively, the Intermediate Record may be record no. 2, after rounding down since no exact midpoint record exists. The step of 6535 is useful for allowing Tuner 1300 to obtain compromise values for interactive power and processor power in situations where the suggested allocation of processor power and the suggested allocation of interactive power for the respective partition are not valid, e.g., no single record in the validity table accommodates both the suggested allocation of interactive power and the suggested allocation of processor power.

After obtaining an Intermediate Record, Tuner 1300 may modify the interactive power and processor power changes suggested for the respective partition as follows: First, Tuner 1300 modifies the interactive power change suggested for the respective partition so that the suggested allocation of interactive power (e.g., the sum of the suggested interactive power change and the current allocation of interactive power) is equal to the interactive value of the Intermediate Record. Then, if the determination of step 6520 is positive, e.g., the suggested allocation of processor power for the respective partition is higher than the processor power range of the first record, Tuner 1300 modifies the processor power change suggested for the respective partition so that the suggested allocation of processor power (e.g., the sum of the suggested processor power change and the current allocation of processor power) is equal to the maximum of the processor power range of the Intermediate Record. If the determination of step 6520 is negative, Tuner 1300 modifies the processor power change suggested for the respective partition so that the suggested allocation of processor power is equal to the minimum of the processor power range of the Intermediate Record. Processing then continues with step 6540.

In step 6540, Tuner 1300 determines whether there are any APRMS partitions remaining in the set under consideration. If there are, then Tuner 1300 moves onto the next APRMS partition in the set under consideration, step 6545, and resumes processing again with step 6510. If there are no more APRMS partitions remaining in the set under consideration, processing returns to the next step for the P/I tuning task, e.g., step 6700 of FIG. 10.

Returning to FIG. 10, after the processor power and/or interactive power changes suggested for each APRMS partition are modified, as necessary, to insure their validity, processing continues with step 6700 where Tuner 1300 adjusts one or more suggested processor power and/or suggested interactive power changes to accommodate the total processor power and the total interactive power available for allocation. For example, where, for either resource, the total gains for that resource suggested by the resource allocation plan are less than the sum of the total losses for that resource suggested by the resource allocation plan and the total unassigned resource to be considered for allocation, then there is more than enough of that resource available (suggested losses plus unassigned) to meet all suggested gains. In that case, Tuner 1300 may reduce the suggested losses for that resource. Alternatively, where, for either resource, the total gains for that resource suggested by the resource allocation plan are greater than the sum of the total losses for that resource suggested by the resource allocation plan and the total unassigned resource to be considered for allocation, then there is not enough of that resource available to meet all suggested gains and Tuner 1300 may reduce the suggested gains for that resource.

Figure 11C:
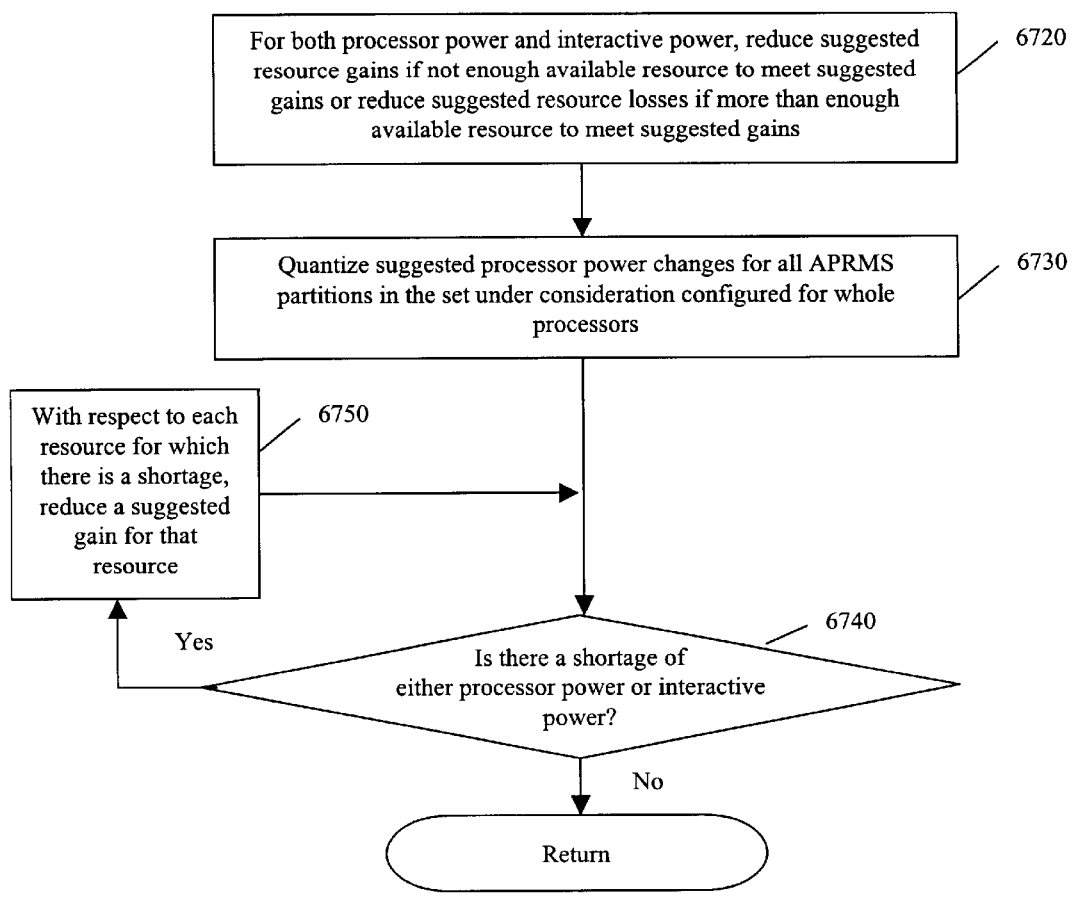
FIG. 11C is a flowchart showing further detail of the operative embodiment of the present invention related to reallocation of processor power and interactive power.

One technique for carrying out the adjustments of step 6700 is shown in the flowchart of FIG. 11C. First, in step 6720, with respect to both processor power and interactive power, Tuner 1300 reduces suggested resource gains if there is not enough of the resource available to meet suggested gains or Tuner 1300 reduces suggested resource losses if there is more than enough of the resource available to meet suggested gains. Tuner 1300 may accomplish this by, for example, using the logic shown in FIG. 6B by first setting resource R as processor power and calling for the execution of the steps of FIG. 6B, and then setting resource R as interactive power and again calling for the execution of the steps of FIG. 6B.

Returning to FIG. 11C, Tuner 1300 next quantizes suggested processor power changes for all APRMS partitions in the set under consideration that are configured for whole processors, step 6730. For example, Tuner 1300 may round suggested processor power changes less than 0.50 down to zero and equal to or greater than 0.50 up to one. Next, in step 6740, Tuner 1300 determines whether there is a shortage of either processor power or interactive power, e.g., whether, for either resource, the total gains for that resource suggested by the resource allocation plan are greater than the sum of the total losses for that resource suggested by the resource allocation plan and the total unassigned resource to be considered for allocation. If this determination is negative, e.g., there is no shortage of either resource, then processing returns to the next step of the task which called for the steps of FIG. 11C to be executed. For example, where the P/I tuning task called for the execution of the steps of FIG. 11CB from step 6700 of FIG. 10, processing would return to step 6800 of FIG. 10.

Figure 14A:
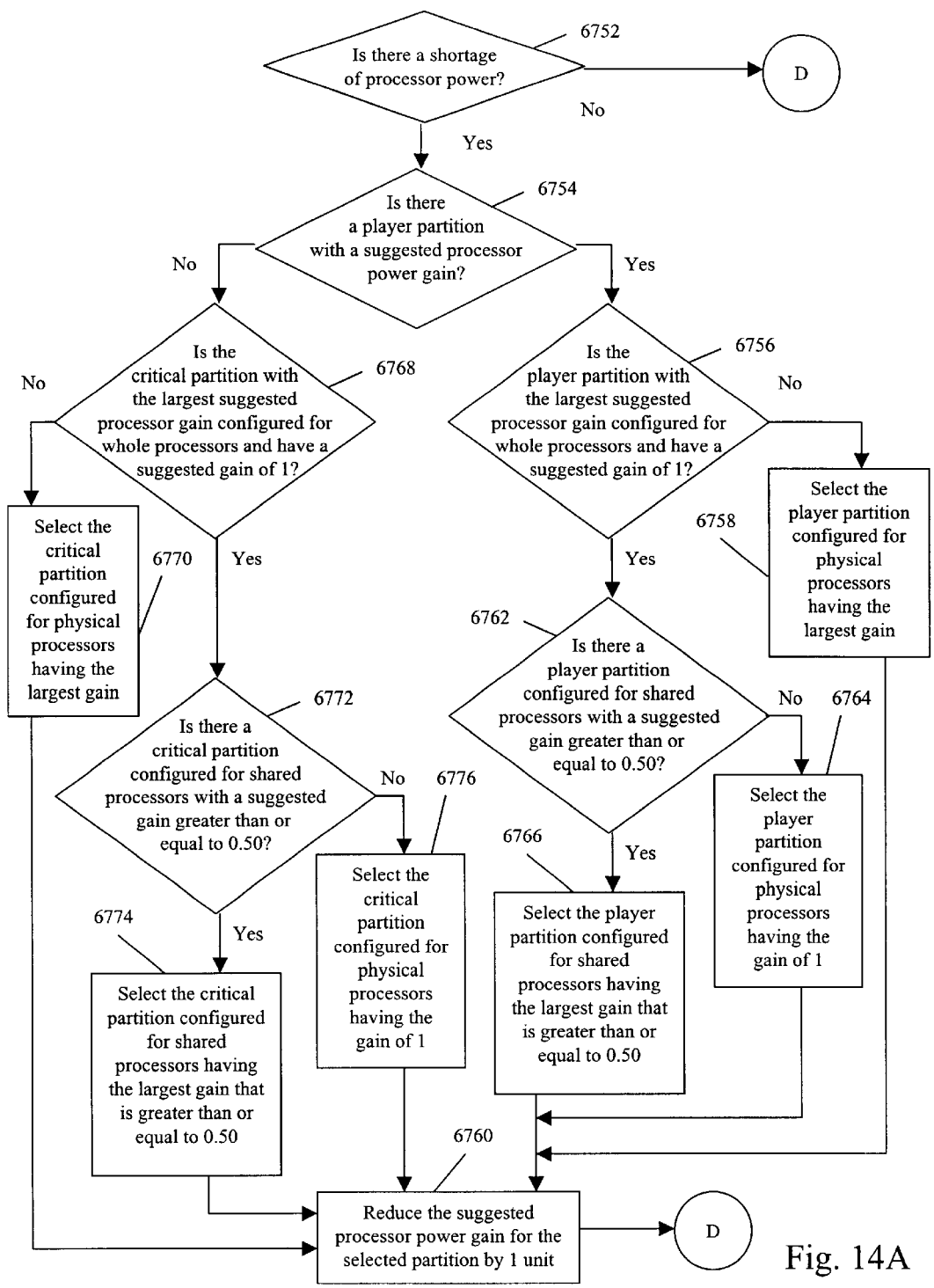
FIG. 14A is a flowchart showing further detail of the operative embodiment of the present invention related to reallocation of processor power and interactive power.
Figure 14B:
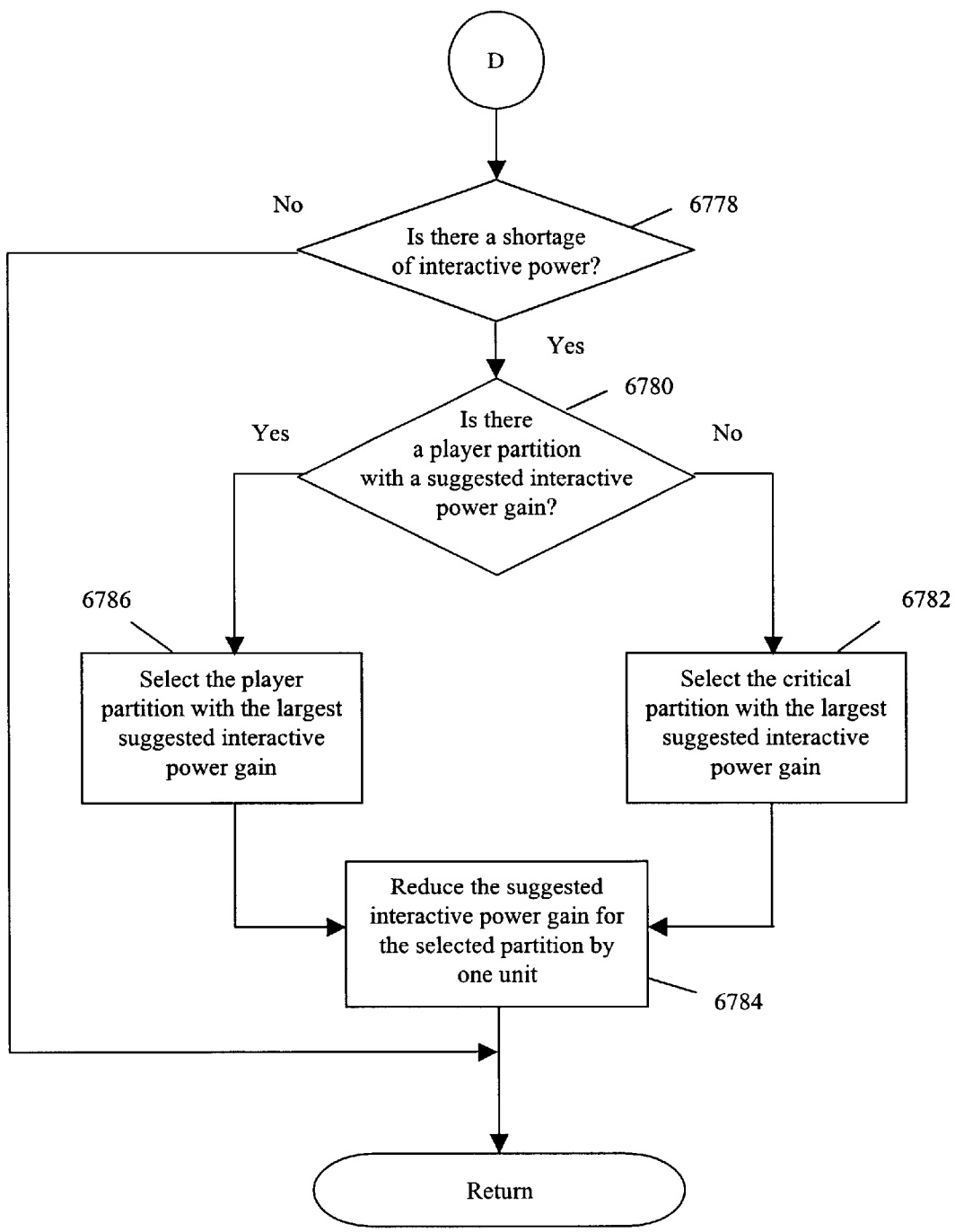
FIG. 14B is a flowchart showing further detail of the operative embodiment of the present invention related to reallocation of processor power and interactive power.

Returning to FIG. 11C, where the determination of step 6740 is positive, e.g., a shortage of either resource exists, then processing continues with step 6750, where, for each resource for which there is a shortage, Tuner 1300 reduces a suggested gain to an APRMS partition for that resource. One technique for the reducing of suggested gains of step 6750 is shown in the flowcharts of FIGS. 14A and 14B. First, in step 6752, Tuner 1300 determines whether there is a shortage of processor power, e.g., whether the total processor power gains suggested for all APRMS partitions by the resource allocation plan are greater than the sum of the total processor power losses suggested for all APRMS partitions by the resource allocation plan and the total unassigned processor power to be considered for allocation. If there is no shortage of processor power, then processing continues with FIG. 14B and step 6778.

If there is a shortage of processor power, then processing continues with step 6754 where Tuner 1300 determines whether there are any APRMS partitions in the set under consideration classified as player partitions with respect to processor power that have a suggested processor power gain. If this determination is positive, then processing continues with step 6756 where Tuner 1300 first identifies all APRMS partitions in the set under consideration that can be classified as player partitions with respect to processor power, and from this identified group, further identifies the player partition having the largest suggested processor power gain, and then determines whether the player partition having the largest suggested processor power gain is configured for whole processors and has a suggested gain of only 1. If this determination is negative, then processing continues with step 6758 where, from the APRMS partitions in the set under consideration that can be classified as player partitions with respect to processor power, Tuner 1300 selects the player partition configured for physical processors that has the largest suggested processor power gain.

If the determination in step 6756 is positive, then processing continues with step 6762 where Tuner 1300 determines whether, from the APRMS partitions in the set under consideration that can be classified as player partitions with respect to processor power, there is a player partition configured for shared processors that has a gain greater than or equal to 0.50. If this determination is negative, then Tuner 1300 selects, from the APRMS partitions in the set under consideration that can be classified as player partitions with respect to processor power, the player partition configured for whole processors having a suggested processor power gain of 1, step 6764. If the determination in step 6762 is positive, then, from the APRMS partitions in the set under consideration that can be classified as player partitions with respect to processor power, Tuner 1300 selects the player partition configured for shared processors having the largest gain that is greater than or equal to 0.50, step 6766.

If the determination in step 6754 is negative, e.g., there are no APRMS partitions in the set under consideration that can be classified as player partitions with respect to processor power that have a suggested processor power gain, then processing continues with step 6768 where Tuner 1300 first identifies all APRMS partitions in the set under consideration that can be classified as critical partitions with respect to processor power, and from this identified group, further identifies the critical partition having the largest suggested processor power gain, and then determines whether the critical partition having the largest suggested processor power gain is configured for whole processors and has a suggested gain of only 1. If this determination is negative, then processing continues with step 6770 where, from the APRMS partitions in the set under consideration that can be classified as critical partitions with respect to processor power, Tuner 1300 selects the critical partition configured for physical processors that has the largest suggested processor power gain.

If the determination in step 6768 is positive, then processing continues with step 6772 where Tuner 1300 determines whether, from the APRMS partitions in the set under consideration that can be classified as critical partitions with respect to processor power, there is a critical partition configured for shared processors that has a gain greater than or equal to 0.50. If this determination is negative, then Tuner 1300 selects, from the APRMS partitions in the set under consideration that can be classified as critical partitions with respect to processor power, the critical partition configured for whole processors having a suggested processor power gain of 1, step 6776. If the determination in step 6772 is positive, then, from the APRMS partitions in the set under consideration that can be classified as critical partitions with respect to processor power, Tuner 1300 selects the critical partition configured for shared processors having the largest gain that is greater than or equal to 0.50, step 6774.

After a partition has been selected from one of steps 6758, 6764, 6766, 6770, 6774, or 6776, processing continues with step 6760 where Tuner 1300 reduces the suggested processor power gain for the selected partition by 1 unit. For example, where the selected partition is configured for whole processors, Tuner 1300 may reduce the suggested processor power gain for the selected partition by 1 processor. Alternatively, where the selected partition is configured for shared processors, Tuner 1300 may reduce the suggested processor power gain for the selected partition by 0.01 of a processor. Following the reduction in step 6760, processing continues with FIG. 14B and step 6778.

In FIG. 14B, Tuner 1300 first, in step 6778, determines whether there is a shortage of interactive power, e.g., whether the total interactive power gains suggested for all APRMS partitions by the resource allocation plan are greater than the sum of the total interactive power losses suggested for all APRMS partitions by the resource allocation plan and the total unassigned interactive power to be considered for allocation. If there is no shortage of interactive power, then processing returns to FIG. 11C and step 6740.

If there is a shortage of interactive power, then processing continues with step 6780 where Tuner 1300 determines whether there are any APRMS partitions in the set under consideration classified as player partitions with respect to interactive power that have a suggested interactive power gain. If this determination is negative, then processing continues with step 6782 where Tuner 1300 identifies all APRMS partitions in the set under consideration that can be classified as critical partitions with respect to interactive power, and from this identified group, selects the critical partition having the largest suggested interactive power gain. If the determination in step 6780 is positive, then processing continues with step 6786 where Tuner 1300 identifies all APRMS partitions in the set under consideration that can be classified as player partitions with respect to interactive power, and from this identified group, selects the player partition having the largest suggested interactive power gain.

After a partition has been selected from either step 6782 or 6786, processing continues with step 6784 where Tuner 1300 reduces the suggested interactive power gain for the selected partition by 1 unit. For example, where interactive power is allocated in units of one percent, Tuner 1300 may reduce the suggested interactive power gain for the selected partition by one percent. Following the reduction in step 6784, processing returns to FIG. 11C and step 6740.

Returning to FIG. 11C, after Tuner 1300 reduces a suggested gain for each resource for which there is a shortage, processing goes back to step 6740 where again a determination is made of whether a shortage of either resource exists. In this manner, processing loops between steps 6740 and 6750 until no shortage of either resource exists. Processing then returns to the next step of the task which called for the steps of FIG. 11C to be executed. For example, where the P/I tuning task called for the execution of the steps of FIG. 11C from step 6700 of FIG. 10, processing would return to step 6800 of FIG. 10.

Returning to FIG. 10, at step 6800, for each of the suggested processor power and interactive power changes that have been adjusted to accommodate available processor and interactive power, Tuner 1300 determines (a) whether the adjusted suggested resource changes are valid and (b) whether the adjusted suggested resource changes are in conformance with the one or more rules.

Tuner 1300 may determine (a) by, for example, checking, for each APRMS partition in the set under consideration having an adjusted suggested processor power or interactive power change, whether the adjusted suggested processor power allocation for the partition (e.g., the sum of the current processor power allocation and any adjusted suggested processor power change for the partition) falls within the valid processor power range corresponding to the adjusted suggested interactive power allocation for the partition (e.g., the sum of the current interactive power allocation and any adjusted suggested interactive power change for the partition). For any partition, if the adjusted suggested processor power allocation for the partition does not falls within the valid processor power range corresponding to the interactive power allocation for the partition, then the adjusted suggested processor power and interactive power changes for the partition are not valid.

Tuner 1300 may determine (b) by, for example, checking, for each APRMS partition in the set under consideration having an adjusted suggested processor power or interactive power change, the adjusted suggested processor power and interactive power changes against the one or more resource allocation rules. Tuner 1300 may accomplish this by, for example, by checking whether, for each APRMS partition in the set under consideration having an adjusted suggested processor power or interactive power change, the adjusted suggested processor power and interactive power changes are in conformance with rules C1 and P1–P5 described above. Tuner 1300 may check this conformance by employing the same logic as described above in connection with step 6300 of FIG. 10, although, for purposes of step 6800, Tuner 1300 need not cause conformance to those rules.

If Tuner 1300 determines that any APRMS partition in the set under consideration has adjusted suggested processor power and interactive power allocations that are not valid or that any APRMS partition in the set under consideration has adjusted suggested processor power or interactive power changes that do not conform with any of the resource allocation rules, then processing returns to step 6300 of FIG. 10. Otherwise, if, for each APRMS partition in the set under consideration, the adjusted suggested processor power and interactive power allocations for the partition are valid and the adjusted suggested processor power and interactive power changes for the partition are in conformance with the resource allocation rules, then processing continues with step 6900.

At step 6900, Tuner 1300 causes to be implemented the suggested processor power and interactive power changes that have been adjusted to accommodate available processor and interactive power. Tuner 1300 may accomplish this, for example, by calling an API in the System Code 300 designed to reallocate processor power and interactive power between partitions and informing the API which partitions should suffer a processor power and/or interactive power loss and how much of a loss and which partitions should receive a processor power and/or interactive power gain and how much of a gain. Processing then ends and the P/I tuning task terminates.

Figure 15A:
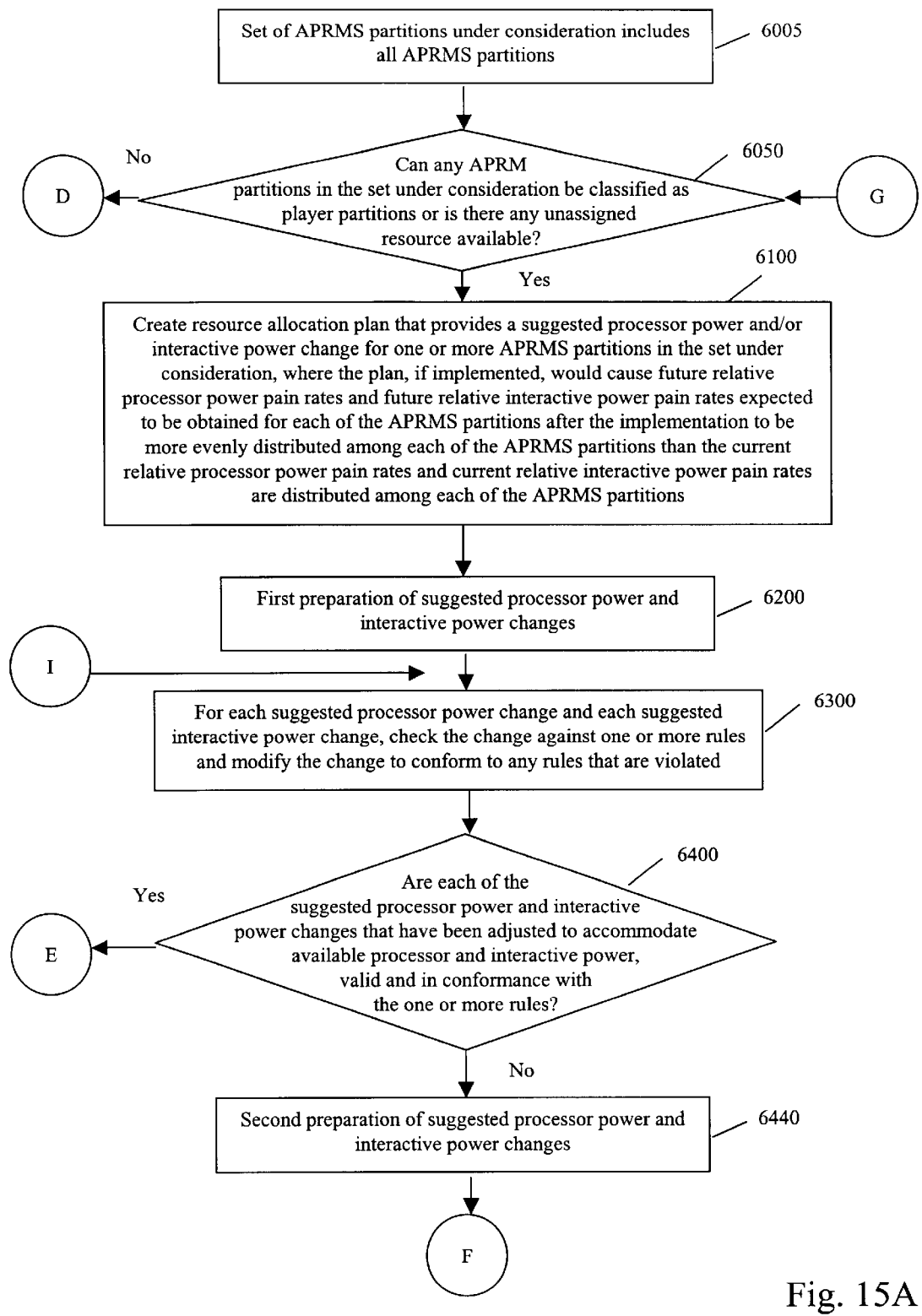
FIGS. 15A–15C present a flowchart showing another operative embodiment of the present invention related to reallocation of processor power and interactive power.
Figure 15B:
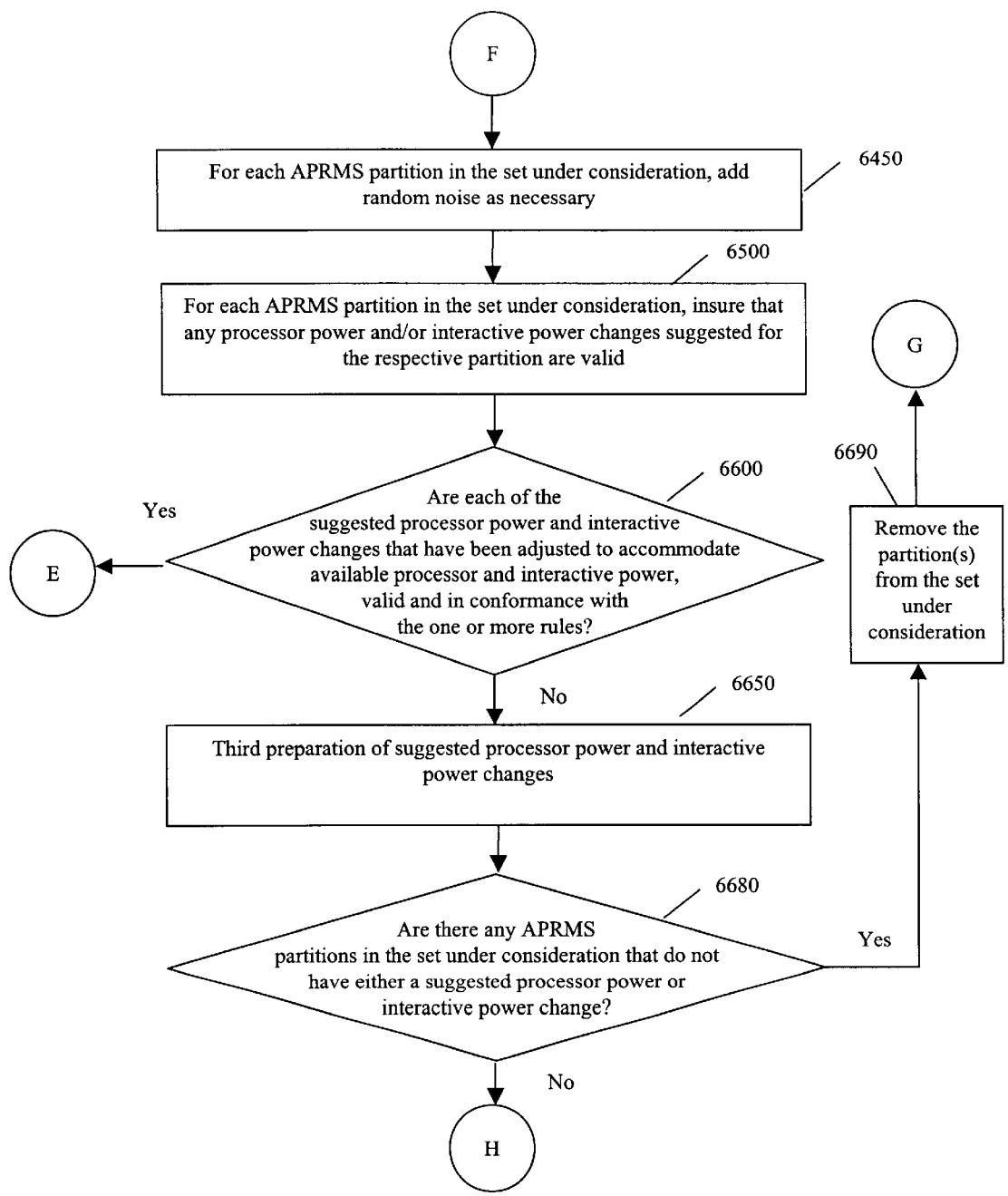
Figure 15C:
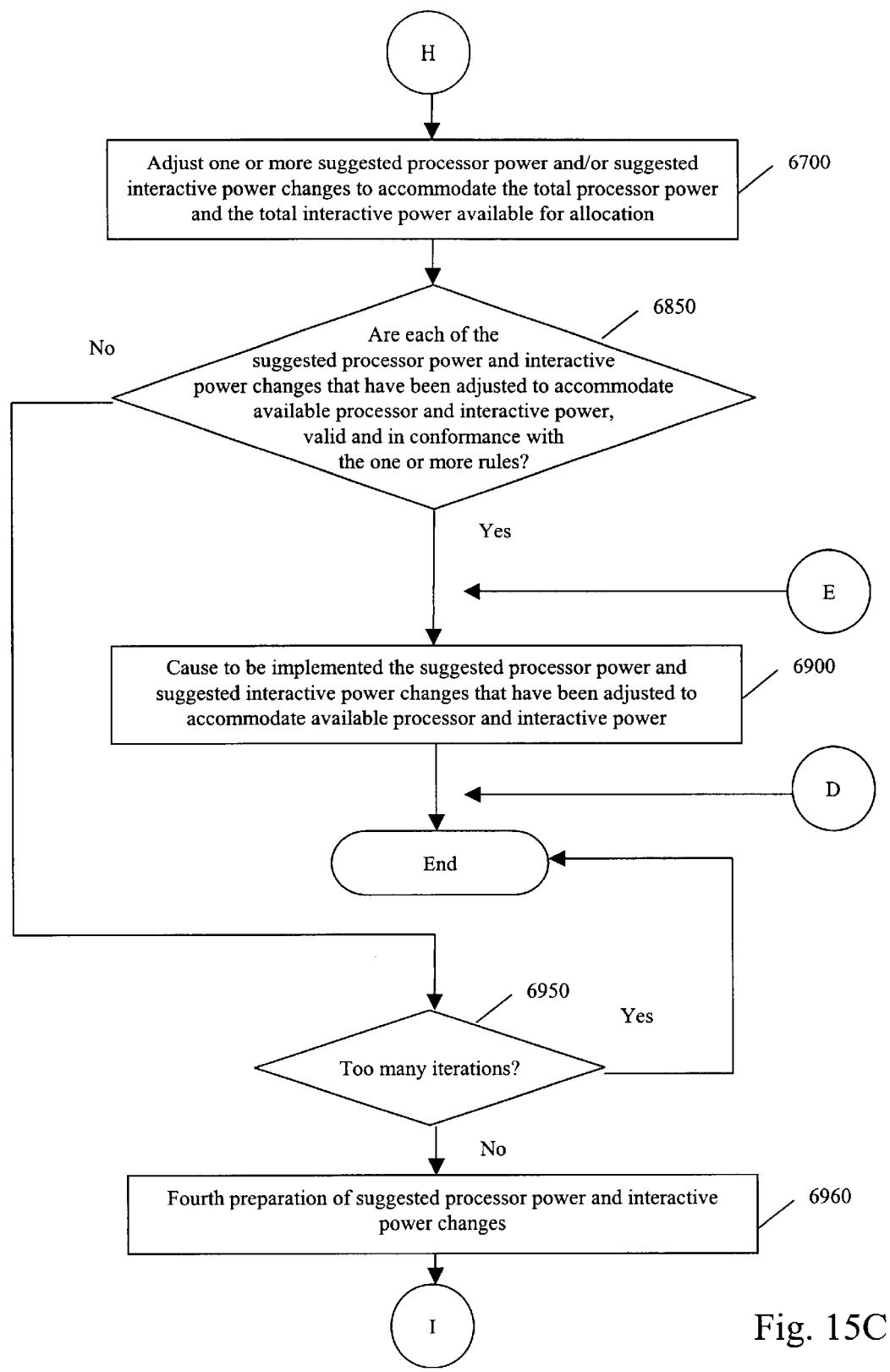

FIGS. 15A, 15B, and 15C present a flowchart describing another technique for allocating processor power and interactive power among APRMS partitions in accordance with step 6000 of FIG. 9. The technique described in FIGS. 15A and 15B is a modification of the technique shown in FIG. 10, where the technique of FIGS. 15A and 15B includes all the operations of the technique of FIG. 10 as well as additional operations. Consequently, any step in FIGS. 15A and 15B having the same reference numeral as a step in FIG. 10 operates in an identical manner to the corresponding step of FIG. 10.

In FIG. 15A, the process begins with all the APRMS partitions being included in the set of APRMS partitions under consideration, step 6005. Then in step 6050, Tuner 1300 determines, using procedures described in connection with step 6100 above, (1) whether any APRMS partitions in the set under consideration may be classified as player partitions with respect to processor power or interactive power or (2) if there is any unassigned processor power or interactive power to be considered for allocation. If both these determinations are negative, then, as shown in FIG. 15C, processing ends and the P/I tuning task terminates. If either determination in step 6050 is positive, then processing continues with step 6100, as described above in connection with FIG. 10.

Following step 6100 in FIG. 15A, processing continues with step 6200 where Tuner 1300 performs a first preparation of the suggested processor power and interactive power changes. Tuner 1300 may do this by, for example, by recording the suggested processor power and suggested interactive power allocations resulting from step 6100 of FIG. 15A in memory cells. For example, these suggested allocations may be stored in memory cells having a spreadsheet layout as shown in FIG. 12A, where the suggested allocations for each APRMS partition in the set under consideration may be stored in columns 13 and 14, labeled "ideal processor resource" and "ideal interactive resource", respectively. The same values may then also be stored in columns 15 and 16, labeled "rules processor resource" and "rules interactive resource", respectively.

Processing then continues with step 6300 of FIG. 15A where Tuner 1300 checks each suggested processor power change and each suggested interactive power change against one or more rules and modifies the change to conform to any rules that are violated in a similar manner as discussed above in connection with step 6300 of FIG. 10. In step 6300 of FIG. 15A, where a suggested resource change needs to be changed to bring it in conformance with the rules, Tuner 1300 changes the suggested resource change in the cells labeled "rules", e.g., columns 15 and 16 of FIG. 12A. For example, after step 6200 of FIG. 15A, the values stored in columns 13 and 14 of FIG. 12A would be identical with the values stored in columns 15 and 16 of FIG. 12A. Following the execution of step 6300 of FIG. 15A, the values in columns 15 and 16 of FIG. 12A would change as necessary to conform to the rules. For example, the values in rows 3, 4, and 5 of column 15 were identical to the values of rows 3, 4, and 5 of column 13 prior to execution of step 6300 of FIG. 15A. However, after execution of this step, the values in rows 3, 4, and 5 of column 15 were brought in conformance to rule P5 above and raised from a portion of a processor to 1 whole processor since partitions 3, 4, and 5 are configured for whole processors.

Processing then continues with step 6400 of FIG. 15A, where Tuner 1300 determines (a) whether the adjusted suggested resource changes are valid and (b) whether the adjusted suggested resource changes are in conformance with the one or more rules. Tuner 1300 may accomplish this by, for example, comparing the values in the cells of columns 15 and 16 with the cells of columns 17 and 18, labeled "table processor resource" and "table interactive resource", respectively, and with the cells of columns 19 and 20, labeled "final processor resource" and "final interactive resource", respectively. If the values in the cells of columns 15, 17, and 19 match and the values in the cells of columns 16, 18, and 20 match, then the determination is positive and processing continues with step 6900 of FIG. 15C described below. Otherwise, processing continues with step 6440 of FIG. 15A. Note that in a first iteration of the process shown in FIGS. 15A, 15B, and 15C, the values in columns 17, 18, 19, and 20, at this point would be zero, and therefore, the determination would be negative.

Returning to FIG. 15A, in step 6440, Tuner 1300 performs a second preparation of the suggested processor power and interactive power changes. Tuner 1300 may do this by, for example, copying the values in the cells of columns 15 and 16 into the cells of columns 17 and 18.

Processing then continues with FIG. 15B and step 6450 where Tuner 1300 adds random noise to each APRMS partition in the set under consideration as necessary. In the process shown in FIGS. 15A, 15B, and 15C, Tuner 1300 keeps track of the number of iterations of the process that are performed, for example in a variable named ITERATIONS. If ITERATIONS equals a predetermined number, then random noise will be added. For example, if ITERATIONS equals one of the numbers in the following table, then random noise will be added.

| Random Noise TABLE | | |
|---|---|---|
| ITERATION # | Interactive (%) | Processor (processing units) |
| 10 or 14 | 2 | 0.10 |
| 20 or 24 | 4 | 0.30 |
| 30 or 34 | 5 | 0.50 |
| 40 or 44 | 6 | 0.80 |
| 50 or 54 | 7 | 1.20 |

If ITERATIONS equals one of the iteration numbers in the first column above, then the corresponding numbers in the "Interactive" and "Processor" columns are selected as multipliers. Then for each APRMS partition in the set under consideration, a random number RANDOM is generated from a uniform distribution on the interval 0.0<RANDOM<1.0. The value INTADD is then calculated as (interactive multiplier from the table)*(RANDOM−0.5) and the value PROCADD is calculated as (processor multiplier from the table)*(RANDOM−0.5). The values of INTADD and PROCADD are then added to the values of "Table Interactive Resource" and "Table Processor Resource" stored in the cells of columns 17 and 18 corresponding to the APRMS partition.

Processing then continues with step 6500 of FIG. 15B, where, for each APRMS partition in the set under consideration, Tuner 1300 insures that any processor power and/or interactive power changes suggested for the respective partition are valid. In this step, Tuner 1300 may validate the processor and interactive power value pairs for each APRMS partition in the set under consideration found in columns 17 and 18 of FIG. 12A. The procedure for insuring this validation may be the same as described above in connection with step 6500 of FIG. 10.

Following step 6500 of FIG. 15B, processing continues with step 6600 where Tuner 1300 determines (a) whether the adjusted suggested resource changes are valid and (b) whether the adjusted suggested resource changes are in conformance with the one or more rules. Tuner 1300 may accomplish this determination by, for example, using the same procedure discussed in connection with step 6400 above. If the determination is positive, then processing continues with FIG. 15C and step 6900.

If the determination is negative, then processing continues with step 6650, where Tuner 1300 performs a third preparation of the suggested processor power and interactive power changes. Tuner 1300 may do this by first determining if ITERATION=1. If this is the first iteration, then Tuner 1300 prorates the resource values in columns 17 and 18 and stores the prorated values in the columns 19 and 20. For example, the value for each row X in column 19 may be computed as (the "Table" value (col. 17) of row X)*(the total current resource (col. 9, row 6))/(the total "Table" resource (col. 17, row 6)). Similarly, the value for each row X in column 20 may be computed as (the "Table" value (col. 18) of row X)*(the total current resource (col. 10, row 6))/(the total "Table" resource (col. 18, row 6)). If this is not the first iteration, then Tuner 1300 simply copies the values in the cells of columns 17 and 18 into the cells of the columns 19 and 20.

Then, Tuner 1300 forces the processor power and interactive power values for each APRMS partition in the set under consideration in columns 19 and 20 to be in conformance to the resource allocation rules using the same procedures as discussed for step 6300 of FIG. 15A above.

Processing then continues with step 6680 of FIG. 15B, where Tuner 1300 determines whether there are any APRMS partitions in the set under consideration that do not have either a suggested processor power change or a suggested interactive power change. If there are any such partitions, then Tuner 1300 removes those partitions from the set under consideration, step 6690, and processing continues with another iteration by returning to step 6050 of FIG. 15A. If there are no such partitions, processing continues with FIG. 15C and step 6700.

In step 6700 of FIG. 15C, Tuner 1300 adjusts the processor and interactive power values for one or more APRMS partitions in the set under consideration found in columns 19 and using the same procedures as discussed in connection with step 6700 of FIG. 10 and FIGS. 11C, 14A, and 14B, with the exception that in step 6700 of FIG. 15C, Tuner 1300 first determines whether ITERATION=3 and, if so, Tuner 1300 begins execution in FIG. 11C at step 6740.

Returning to FIG. 15C, after step 6700, processing continues with step 6850 where Tuner 1300 determines (a) whether the adjusted suggested resource changes are valid and (b) whether the adjusted suggested resource changes are in conformance with the one or more rules. Tuner 1300 may accomplish this determination by, for example, using the same procedure discussed in connection with step 6400 above. If the determination is positive, then processing continues with step 6900, where Tuner 1300 causes to be implemented the suggested processor power and interactive power changes that have been adjusted to accommodate available processor and interactive power. Tuner 1300 may accomplish this, for example, in the same manner as discussed in connection with step 6900 of FIG. 10.

If the determination is negative, then Tuner 1300 determines whether there have been too many iterations, step 6950. Tuner 1300 may do this by, for example, checking if ITERATION is equal to a predetermined number, such as 115. If this determination is positive, then processing ends and the P/I tuning task terminates. If this determination is negative, then processing continues with step 6960, where Tuner 1300 performs a fourth preparation of the suggested processor power and interactive power changes. Tuner 1300 may do this by, for example, copying the values in the cells of columns 19 and 20 into the cells of columns 15 and 16. Processing then continues with another iteration at FIG. 15A and step 6300.

FIGS. 12B–12G present tables in a spreadsheet layout which show exemplary values obtained through several iterations of the process of FIGS. 15A, 15B, and 15C beginning with the example initial values of the spreadsheet of FIG. 12A.

In the above embodiments, the user assigned priority values assigned to partitions and the relative priorities calculated for partitions have been discussed in the context of an assigned or relative priority for a partition being used for all resources related to the partition. However, it should be noted that any given partition may have one or more user assigned priority values and one or more calculated relative priority values. For example, a partition may have different priority values for each of memory, processor power, and interactive power, or one for memory and another for processor power and interactive power, etc.

Figure 16A:
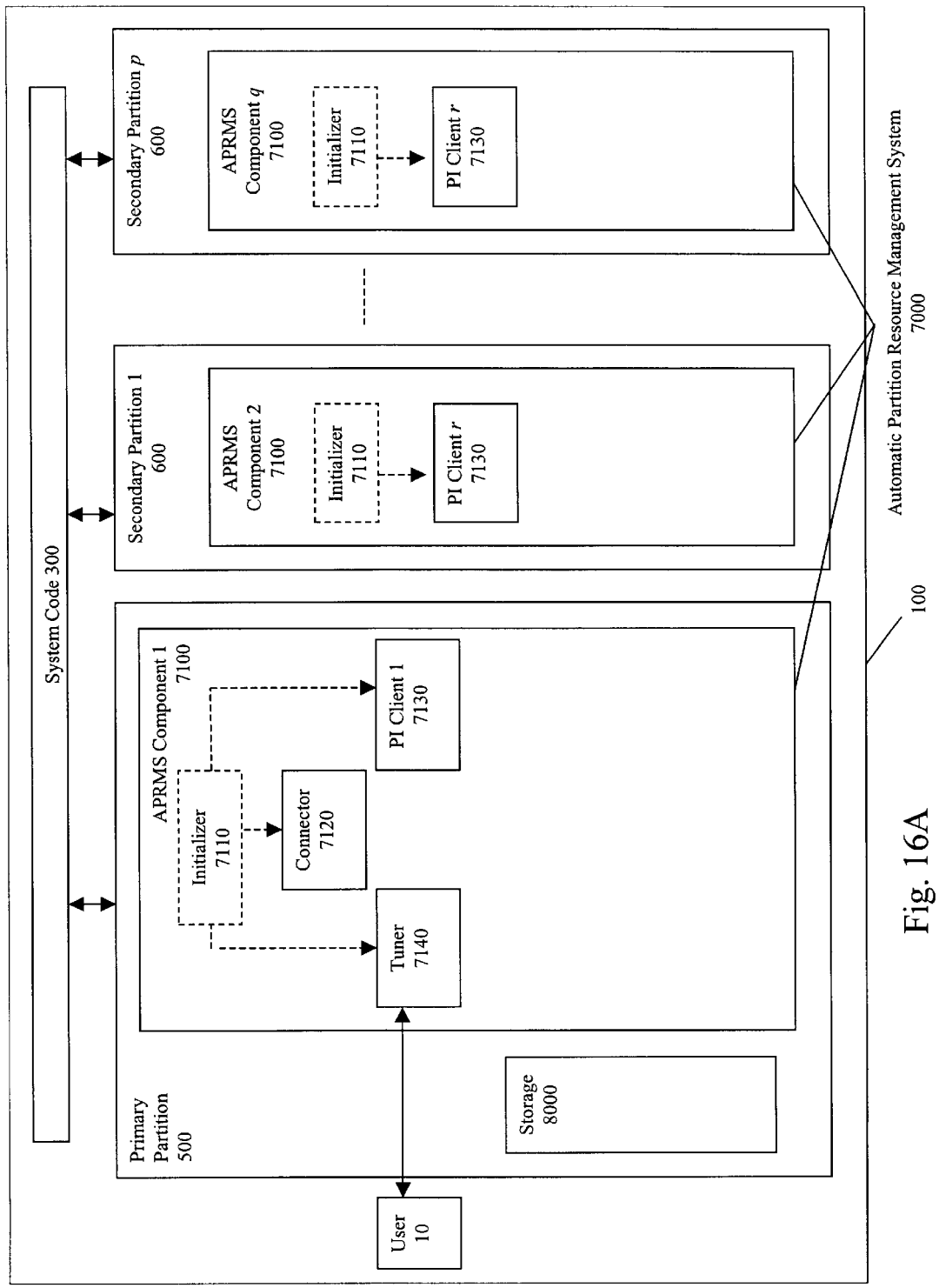
FIGS. 16A–16C are block diagrams showing another embodiment of the present invention.
Figure 16B:
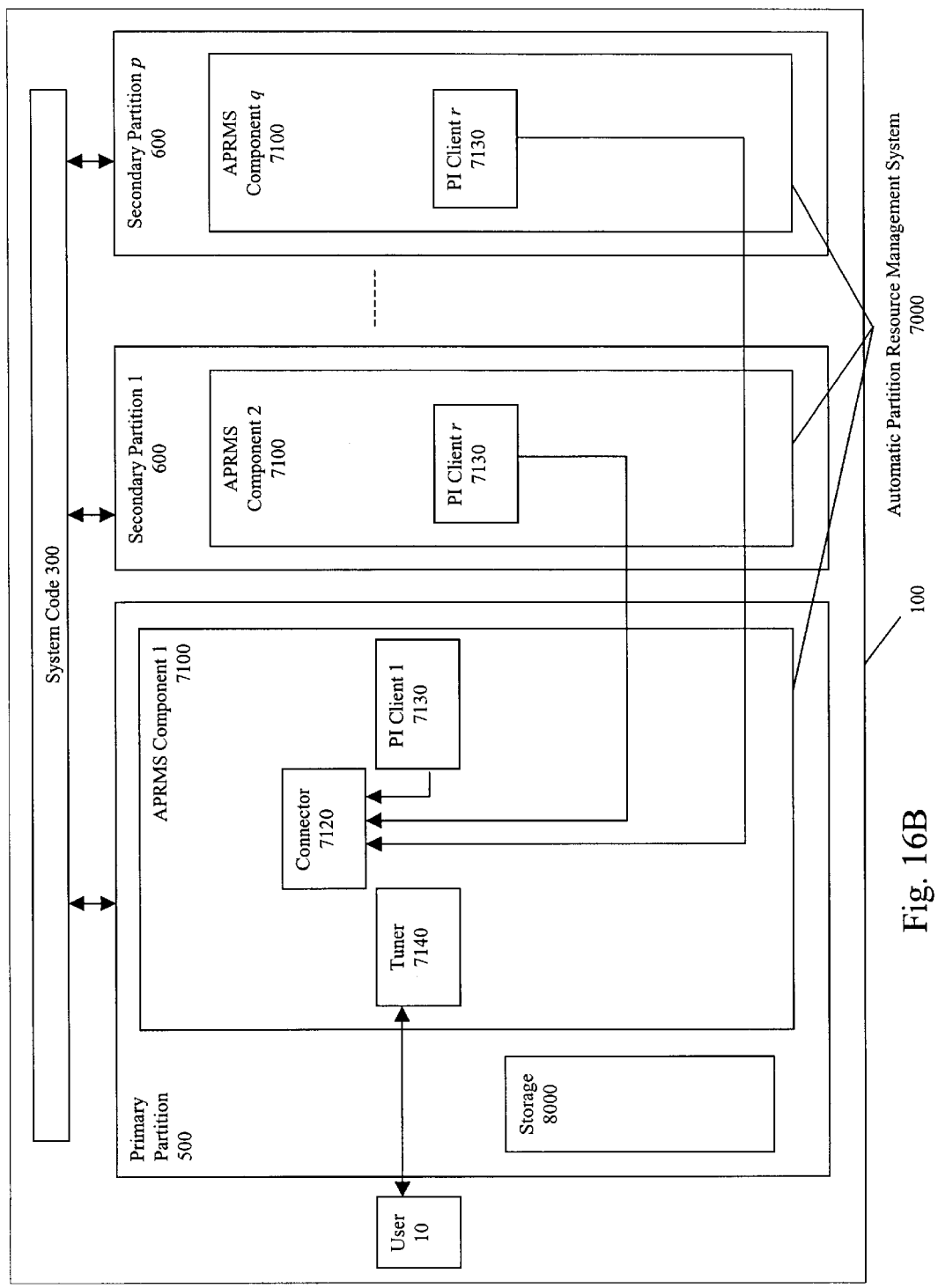
Figure 16C:
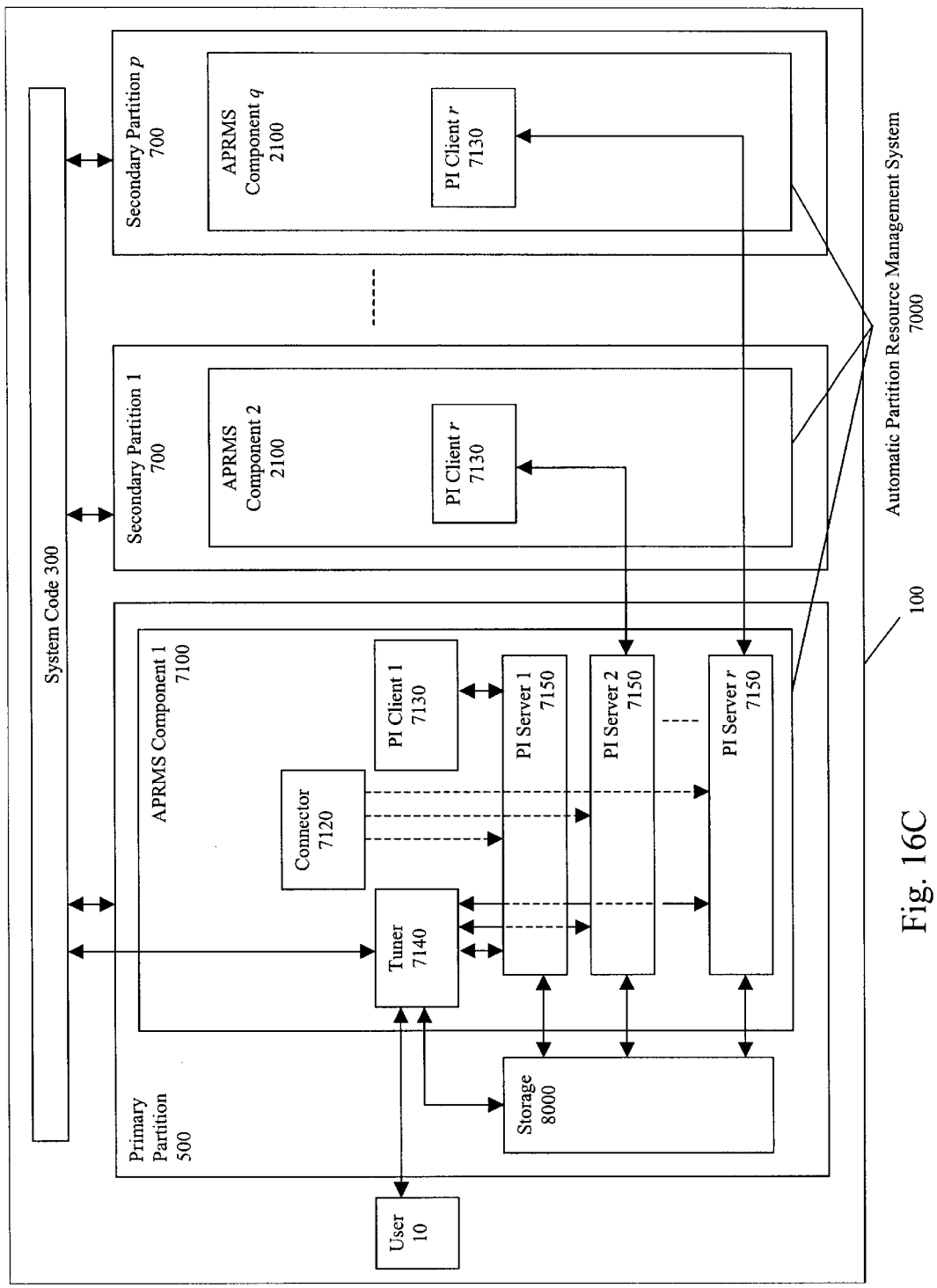

FIGS. 16A–16C are block diagrams showing an alternative embodiment of the invention. The physical computer system 100 is divided into a primary partition 500 and one or more secondary partitions 600, labeled 1 through p, where the primary partition may exercise control over the secondary partitions in a number of ways, such as, for example, controlling the resources allocated to each partition. In the embodiment of FIGS. 16A–16C, the APRMS 7000 comprises a plurality of computer code components 7100, numbered 1 through q, within the partitions of the system 100. The APRMS 7000 includes a component in the primary partition and components in one or more secondary partitions 600. The APRMS 7000 need not include a secondary partition component for each secondary partition defined in the system 100, but only for each secondary partition whose share of resources (and consequently, performance) a user decides should be automatically adjusted by the APRMS 7000. The number of secondary partitions and the identity of the specific secondary partitions whose share of resources are to be automatically adjusted by the APRMS 7000 is a matter of design choice for the implementer or user of the APRMS 7000.

As shown in FIG. 16A, each APRMS partition component may begin executing as an initialization process, shown in FIG. 16A as Initializers 7110 in each partition. The Initializers determine the type of partition in which they are executing, e.g., primary or secondary, initiate additional processes depending on the type of partition, and then terminate. If an Initializer 7110 determines that it is executing in the primary partition, it may initiate the following processes: (1) one or more Connectors 7120; (2) a Partition Interface ("PI") Client 7130; and (3) a Tuner 7140. If an Initializer determines that it is executing in a secondary partition it will initiate only a PI client 7130.

Each Connector 7120 acts to establish communication connections among different processes. Connector 7120 waits for communication connection requests from other processes and then acts to establish communication connections once those requests are received. Connector 7120 may achieve this, for example, by providing a listen socket to wait for incoming connection requests.

The PI clients 7130, in conjunction with PI servers (described further below), provide a similar function as the partition interfaces 1100 previously described, e.g., the PI clients and PI servers allow the APRMS 7000 to communicate with and monitor the performance of partitions in the system 100. Similar to the partition interfaces 1100, the PI clients 7130 may, for the partition in which they are executing, obtain performance data concerning the one or more computer resources subject to automatic adjusting by the APRMS 7000 by, for example, calling a pre-existing API of the system code in the partition designed to provide this information. As above, the PI clients may obtain such data periodically at predetermined time intervals that are user defined.

As shown in FIG. 16B, each PI client 7130 contacts a Connector 7120 to establish a communications connection. Once a connection is made with a PI client, the Connector 7120 then initiates a process in the primary partition, a PI server 7150, to take over and continue communications with that PI client, as shown in FIG. 16C. In this manner, the Connector(s) 7120 initiate a PI server corresponding to each PI client and to the primary partition and each secondary partition for which a user has determined will have its resources automatically adjusted by the APRMS 7000.

As each PI client 7130 obtains performance data for its partition, the PI client sends this data to its corresponding PI server 7150. The PI servers store this received data in a storage facility 8000 accessible to the primary partition, which may be any computer data storage device, including, for example, disk files. As described further below, in addition to receiving communication from a PI client, PI servers may send communications to the PI client as well. The communication between the PI servers and PI clients may be carried out, for example, through the use of sockets.

The tuner 7140 process operates in a similar manner as the tuner 1300 described previously. For example, the tuner 7140 accesses the performance data for each partition stored in storage 8000 to detect if one or more partitions are experiencing performance degradation due to a lack of one or more resources, and if so, provide a measure of the extent of the degradation due to the lack of resources (which may also be described as a measure of the need for more resources). Tuner 7140 then determines, according to the techniques described previously, if there are any resources available for reallocation, and if so, how those available resources should be reallocated among the partitions to best meet the greatest need for resources. Tuner 7140 then communicates with the PI clients 7130 via the PI servers 7150 and with the partition management system 300 to instruct the primary and secondary partitions 500 and 600 and partition management system 300 to carry out the determined reallocation of resources. The tuner 7140 may perform these functions periodically at predetermined time intervals that may be user definable.

Validity Tables

As described above in connection with step 6120 of FIG. 11A, Tuner 1300 may create validity tables, examples of which are FIGS. 12A and 12B, prior to the initiation of the P/I tuning task. One technique for implementing a validity table creation task, which may be executed by Tuner 1300 when the APRMS system is first started and at any time when resources have been added or removed from the system 100, can be generally described as follows:

1. For each allocatable amount of processor power, determine the minimum and maximum amounts of interactive power, if any, that can be validly allocated in combination with the respective allocatable amount of processor power; and 2. For each allocatable amount of processor power for which can be determined both minimum and maximum amounts of interactive power that can be validly allocated in combination with the respective allocatable amount of processor power, add an entry in a table, the entry including the respective allocatable amount of processor power and the minimum and maximum amounts of interactive power determined for the respective allocatable amount of processor power.

In addition, the first step above may carried out in a sequence of sub-steps, including, for example:

For each allocatable amount of processor power:

a. Instructing the system for which the table is being created to test whether the respective allocatable amount of processor power has corresponding minimum and maximum interactive power amounts; and b. Determining the minimum and maximum amounts of interactive power, if any, that can be validly allocated in combination with the respective allocatable amount of processor power based on the results of the test.

Also, the step a above may be itself carried out in a sequence of sub-steps, including, for example:

i. Instructing the system for which the table is being created to perform the test in a proposed system configuration including no partitions other than a primary partition.

One method for implementing the steps above is presented in the flowchart of FIGS. 17A–17G. First, in step 9000, Tuner 1300 determines whether the system 100 is processor pool capable, e.g., whether or not the system is configured to allow partitions to be configured for shared processors. If yes, then Tuner computes the value for "Max_subscript" as shown in step 9020. If no, then Tuner computes the value for "Max_subscript" as shown in step 9030. Following either steps 9020 or 9030, processing continues with step 9100 where Tuner 1300 creates the "preamble" string for an XML script (described further below). Tuner 1300 then computes "Subscript"=1, step 9300, and then determines again whether the system 100 is processor pool capable, step 9310. If the determination of step 9310 is positive, then Tuner 1300 computes Test_CPU as shown in step 9320. If the determination of step 9310 is negative, then Tuner 1300 computes Test_CPU as shown in step 9330. Following either steps 9320 or 9330, processing continues with step 9400 where Tuner 1300 derives the minimum and maximum interactive allocation amounts, e.g., percentage of total system interactive power, for the Test_CPU value, if any.

One technique for accomplishing the derivation of minimum and maximum interactive allocation amounts for the Test_CPU value is to execute the process shown in FIGS. 17D–17G (described in detail below). After the process of FIGS. 17D–17G executes, it returns to step 9600 of FIG. 17A. If the execution of this process was successful (e.g., returning after step 9530 of FIG. 17F or a positive determination in step 9598 of FIG. 17G), then the process returns with minimum and maximum interactive allocation amounts for the Test_CPU value that are greater than zero. If the execution of this process was not successful (e.g., returning after negative determinations in steps 9465 and 9510 of FIG. 17E, or after a positive determination in step 9535 of FIG. 17F, or after a negative determination in step 9597), then the process of FIGS. 17D–17G returns with values of zero for the minimum and maximum interactive allocation amounts for the Text_CPU value.

Following step 9400, processing continues with step 9600 where Tuner 1300 determines whether the minimum and maximum interactive allocation amounts for the Text_CPU value (which may be called the "Data Point") received from step 9400 are valid. Tuner 1300 determines that the Data Point is valid if non-zero values were obtained for the Data Point in step 9400, and conversely, determines that the Data Point is not valid if zero values were obtained in step 9400. If the Data Point is valid, it is added to the validity table being built, step 9610, and processing continues with step 9620. If the Data Point is not valid, processing goes directly to step 9620 where Tuner 1300 determines if "Max_subscript" has been reached. If it has, processing ends and the validity table creation task terminates. If it has not been reached, then Tuner 1300 adds one to "Subscript", step 9630, and processing loops back to 9310.

Figure 17A:
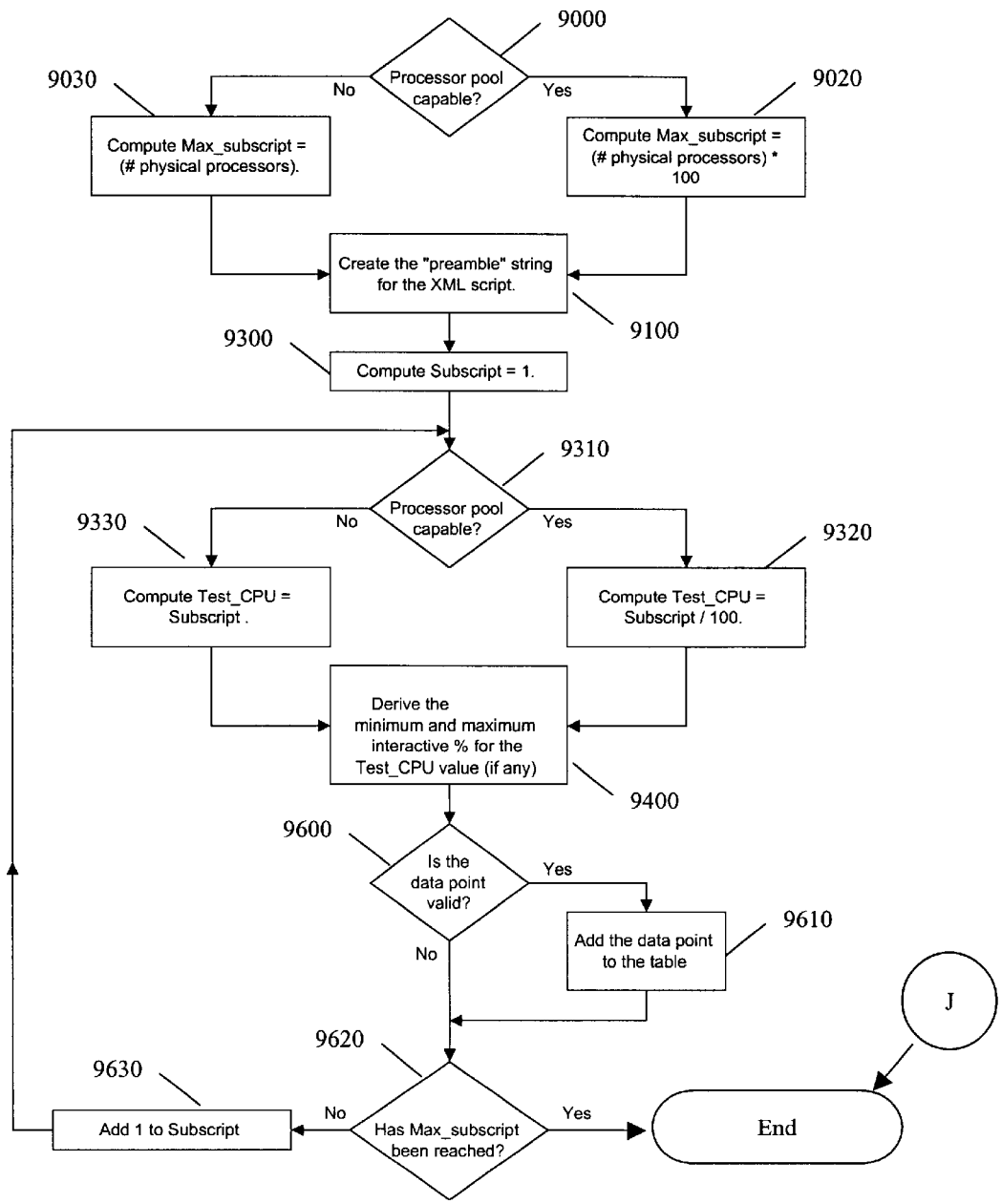
FIG. 17A is a flowchart showing an operative embodiment of the present invention related to the creation of a validity table.
Figure 17B:
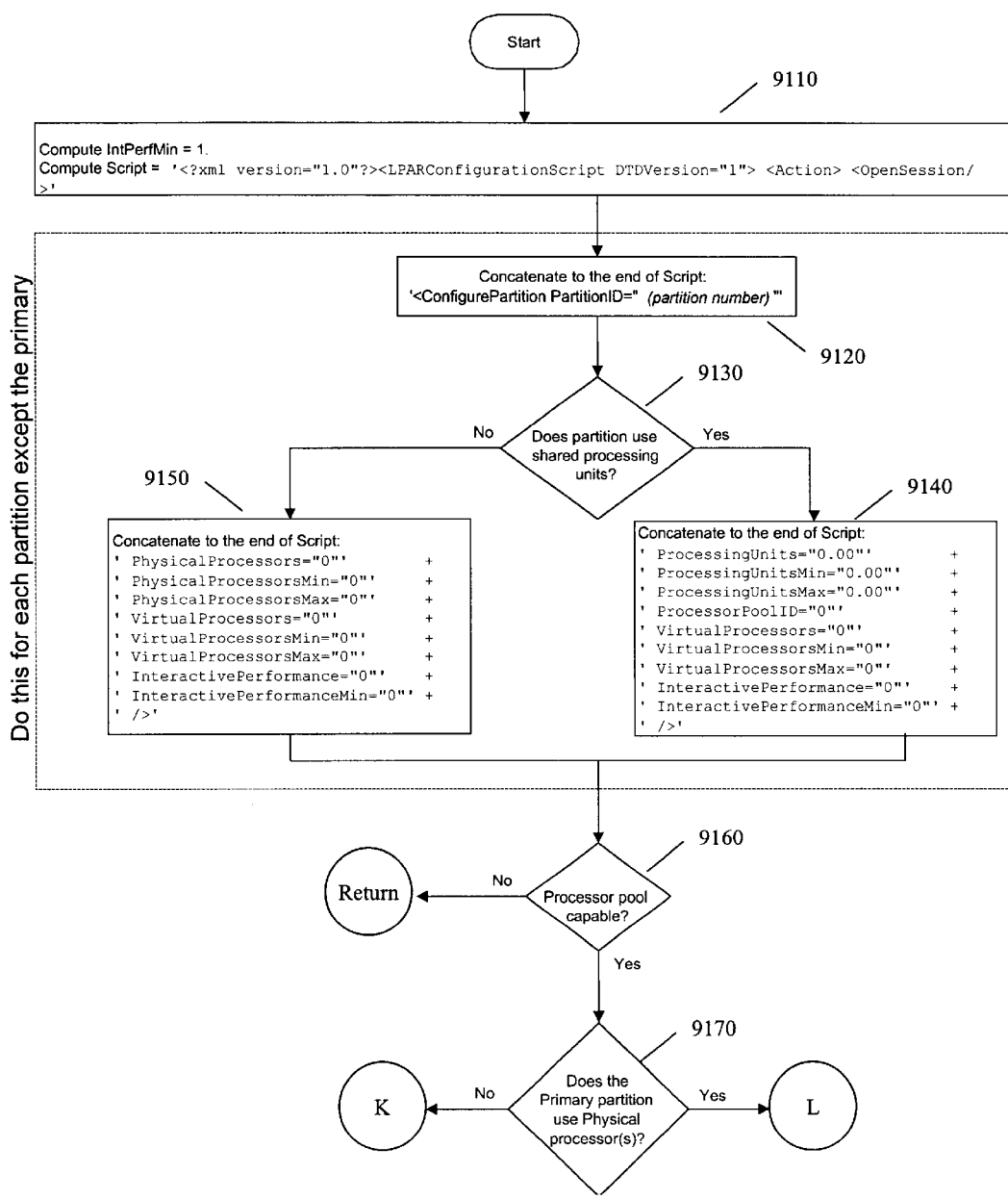
FIGS. 17B–17G are flowcharts showing further detail of the operative embodiment of the present invention related to the creation of a validity table.
Figure 17C:
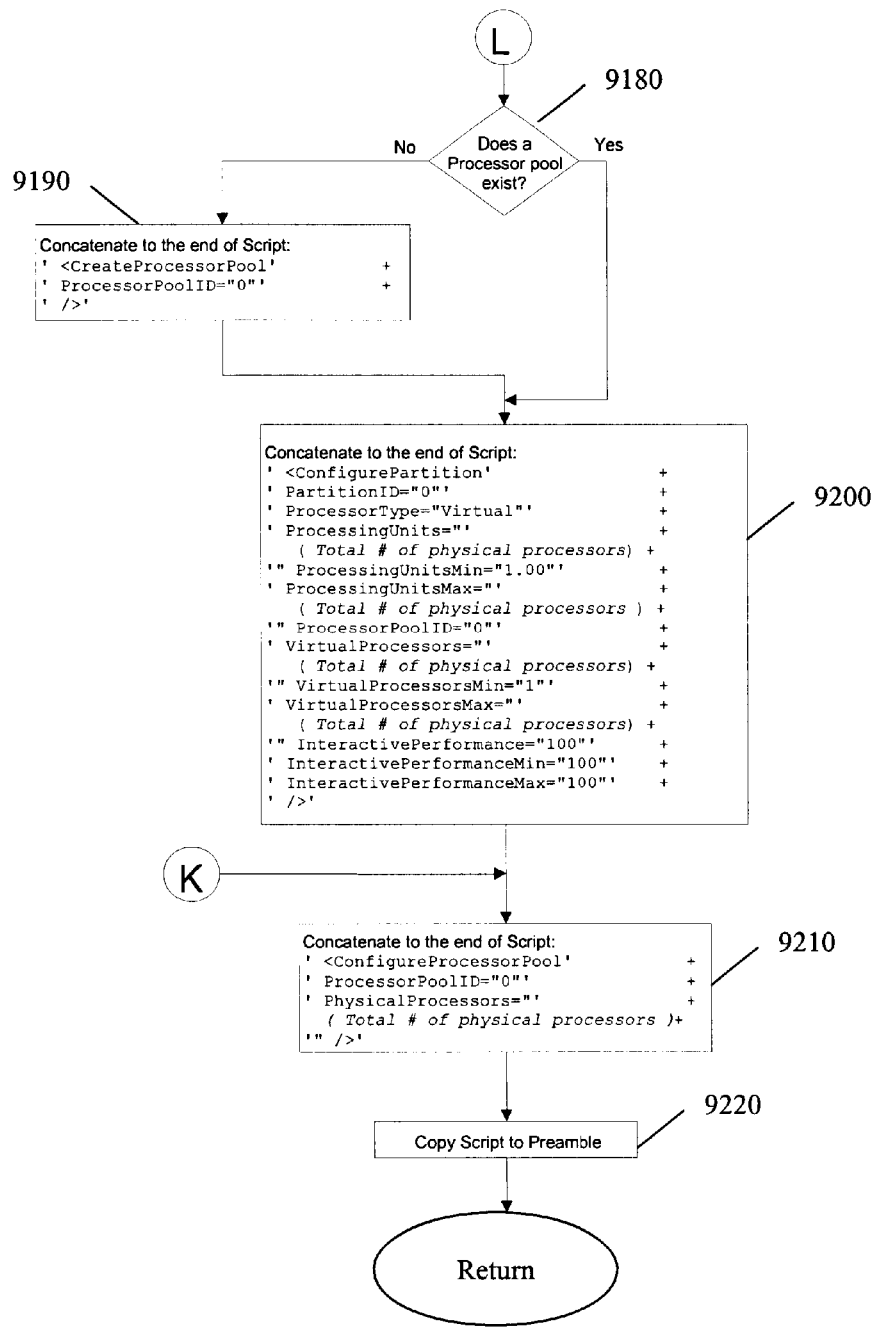

One technique for accomplishing the creation of the "preamble" string for an XML script, as recited in step 9100 above, is shown in the flowchart of FIGS. 17B and 17C. Referring to FIG. 17B, first, Tuner 1300 computes "IntPerfMin" and "Script" as shown in step 9110. Then, for each APRMS partition except a primary partition, Tuner 1300 executes the steps of 9120, 9130, and either 9140 or 9150. For each such partition, Tuner first concatenates text to the end of "Script" as shown in step 9120. Next, Tuner 1300 determines whether the partition is using shared processors, step 9130. If this determination is positive, then Tuner 1300 adds text to the end of "Script" as shown in step 9140. Otherwise, Tuner 1300 adds text to the end of "Script" as shown in step 9150. After Tuner 1300 executes the steps of 9120, 9130, and either 9140 or 9150 for each APRMS partition except the primary partition, Tuner 1300 determines whether the system 100 is processor pool capable, step 9160, and if not, then processing returns to step 9300 of FIG. 17A. If the determination of step 9160 is positive, then processing continues with step 9170 where Tuner 1300 determines whether the primary partition is configured to use whole processors. If this determination is positive, then processing continues with the steps shown in FIG. 17C at the point labeled "L". If this determination is negative, then processing continues with the steps shown in FIG. 17C at the point labeled "K".

Referring to FIG. 17C, at step 9180, which is also the point labeled "L", Tuner 1300 determines whether a pool of shared processors exists. If this determination is negative, then Tuner 1300 concatenates text to the end of "Script" as shown in step 9190. Processing then continues with step 9200. If this determination is positive, then processing continues directly with step 9200, where Tuner 1300 concatenates text to the end of "Script" as shown in that step. Processing then continues with step 9210, which is also the entry labeled "K", Tuner 1300 concatenates text at the end of "Script" as shown in that step. Tuner 1300 then copies "Script" to "Preamble" and returns to FIG. 17A and step 9300.

Figure 17D:
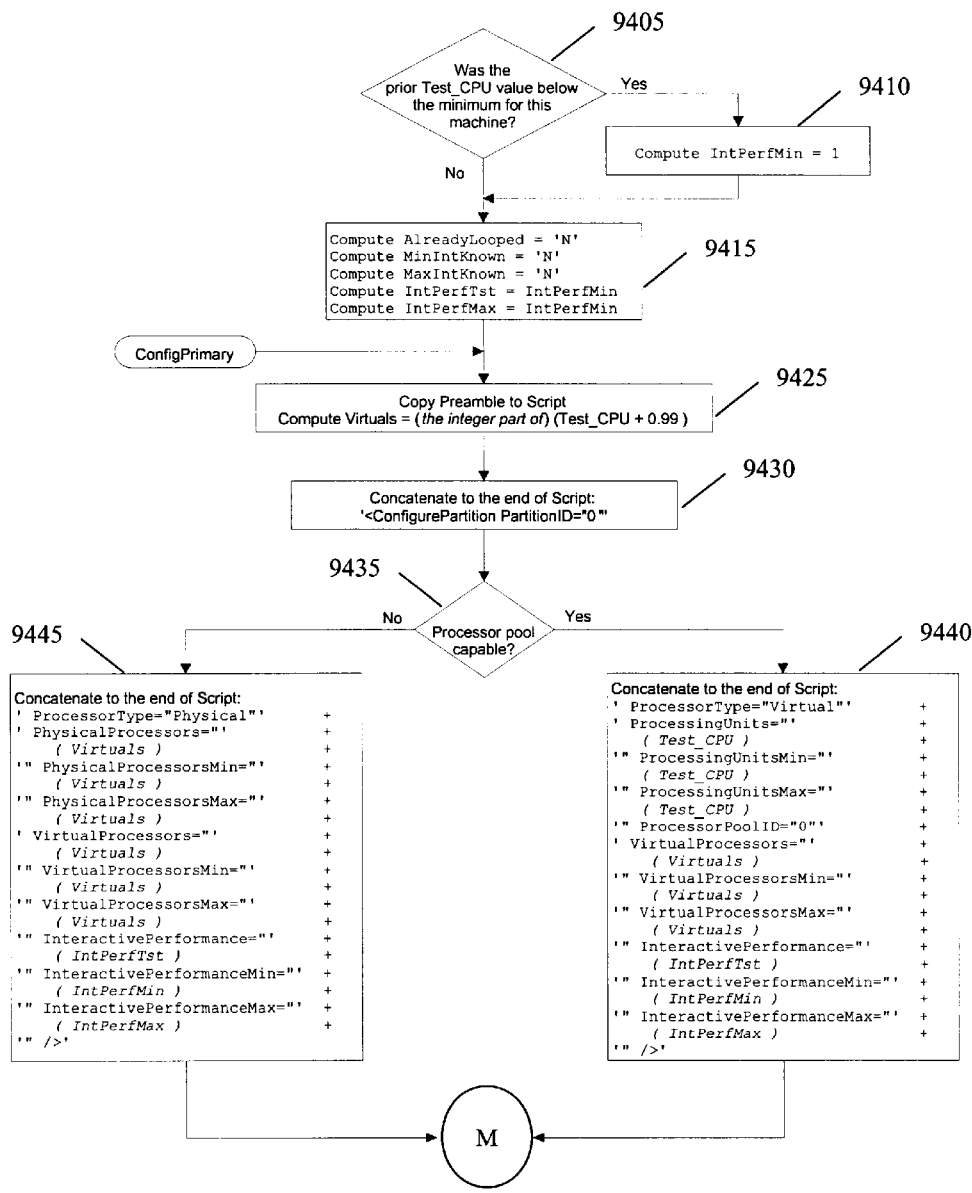

FIGS. 17D–17G present a flowchart showing one technique for deriving the minimum and maximum interactive allocation amounts as recited in step 9400 of FIG. 17A. Referring to FIG. 17D, first Tuner 1300 determines whether the prior Test_CPU value is below the minimum value allowed for the system 100. If this determination is positive, then Tuner 1300 computes "IntPerfMin" as shown in step 9410 and continues processing with step 9415. If this determination is negative, then Tuner 1300 continues processing directly with step 9415, where Tuner 1300 computes "AlreadyLooped", "MinIntKnown", "MaxIntKnown", "IntPerfTst", and "IntPerfMax", as shown in that step. Then, in step 9425, Tuner 1300 copies "Preamble" to "Script" and computes "Virtuals" as shown in that step. Processing continues with step 9430 where Tuner 1300 concatenates text to the end of "Script" as shown in that step. Then, in step 9435, Tuner 1300 determines whether the system 100 is processor pool capable. If this determination is positive, then Tuner 1300 concatenates text to the end of "Script" as shown in step 9440. If this determination is negative, then Tuner 1300 concatenates text to the end of "Script" as shown in step 9445.

Figure 17E:
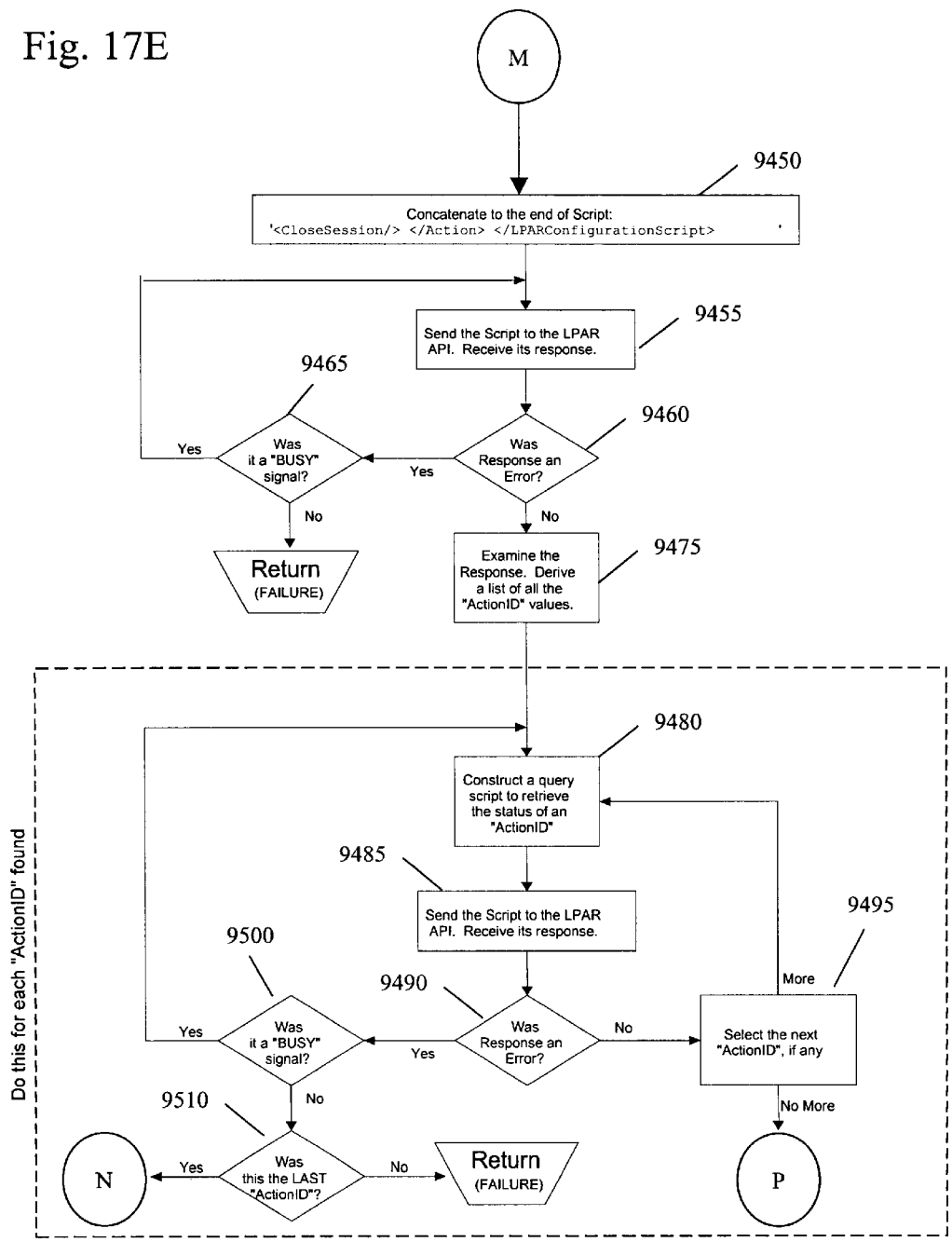

Following either steps 9440 or 9445, processing continues with FIG. 17E and step 9450 where Tuner 1300 concatenates text to the end of "Script" as shown in that step. Then, Tuner 1300 sends "Script" to an API in System Code 300 designed to receive an XML configuration script and Tuner 1300 awaits a response from the API. If, in step 9460, Tuner 1300 determines that an error was received from the API, then Tuner 1300 further determines whether the error was a "Busy" signal, step 9465. If the determination in step 9465 is negative, then processing ends and the validity table creation task terminates and indicates a failure. If the determination in step 9465 is positive, then loops back to step 9455 in order to retry the script.

If there was no error from step 9460, then processing continues with step 9475 where Tuner 1300 examines the response received from the API and prepares a list of all the "ActionID" values received in response from the call to the API in step 9455. (It should be noted that the API, having received the Script in step 9455, takes each action command embedded in the XML script and assigns an "ActionID" value to it). Then, for each "ActionID" value in the list, Tuner 1300 executes the steps of 9480, 9485, 9490, 9495, 9500, and 9510, as shown.

For each "ActionID" value, Tuner 1300 first constructs a query script to retrieve the status of the "ActionID", step 9480, and then sends the "Script" to the API in System Code 300 designed to receive an XML configuration script and Tuner 1300 awaits a response from the API. Next, Tuner 1300 determines whether the response received from the API indicates an error, step 9490. If the determination in step 9490 is negative, processing continues with step 9495, where Tuner 1300 first determines whether there are any "ActionID" values remaining. If so, then processing loops back to 9480, and if not processing continues with FIG. 17F at the point labeled "P". If the determination in step 9490 is positive, processing continues with step 9500 where Tuner 1300 determines whether the error was a "Busy" signal. If so, processing loops back to step 9480. If not, then processing continues to step 9510 where Tuner 1300 determines if the "ActionID" value currently being processed is the last "ActionID" value remaining. If this determination is negative, then processing ends and the validity table creation task terminates indicating a failure. If this determination is positive, then processing continues with FIG. 17F at the point labeled "N".

Figure 17F:
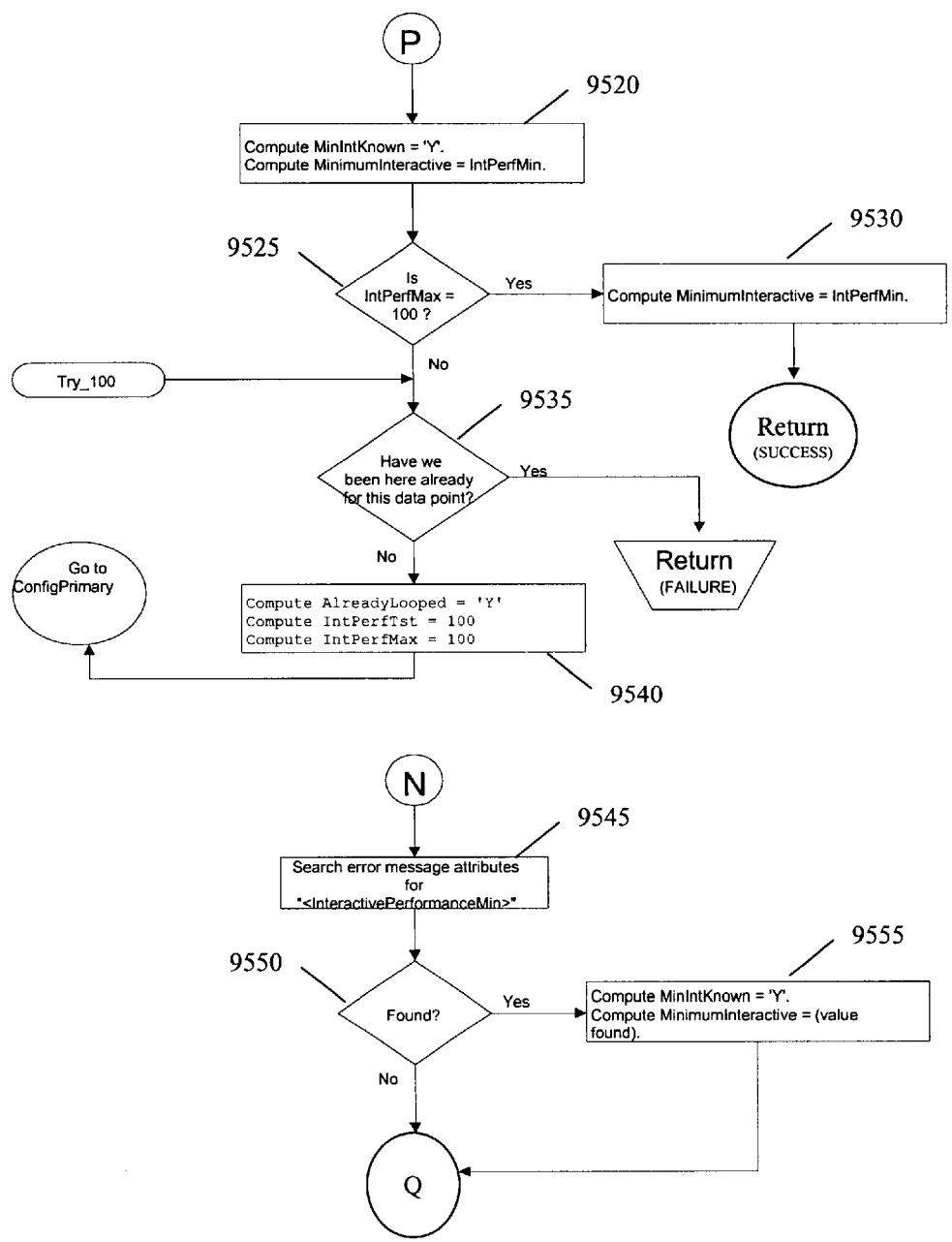

Referring to FIG. 17F, at step 9520, which is also the point labeled "P", Tuner 1300 computes "MinIntKnown" and "MinimumInteractive", as shown in that step. Next, Tuner 1300 determines whether "IntPerfMax"=100, step 9525. If this determination is positive, then processing continues with step 9530 where Tuner 1300 computes "MinimumInteractive" as shown in that step. Following step 9530, processing returns to FIG. 17A and step 9600.

If the determination of step 9525 is negative, then processing continues with step 9535 where Tuner 1300 determines whether that processing step of the validity table creation task has already been reached for the current Data Point. If this determination is positive, then processing ends and the validity table creation task terminates indicating a failure. If this determination is negative, then Tuner 1300 computes "AlreadyLooped", "IntPerfTst", and "IntPerfMax", as shown in step 9540. Following that step, processing continues with FIG. 17D and the point labeled "ConfigPrimary", which is also step 9425.

Referring again to FIG. 17F, where processing flows to step 9545, which is also labeled point "N", Tuner 1300 searches the error message attributes of the response received from the API for the text shown in that step. If the text was found, then, Tuner 1300 computes "MinIntKnown" and "MinimumInteractive" as shown in step 9555. Following step 9555, processing continues with FIG. 17G and the point labeled "Q". If the text was not found, then processing continues directly with FIG. 17G and the point labeled "Q".

Figure 17G:
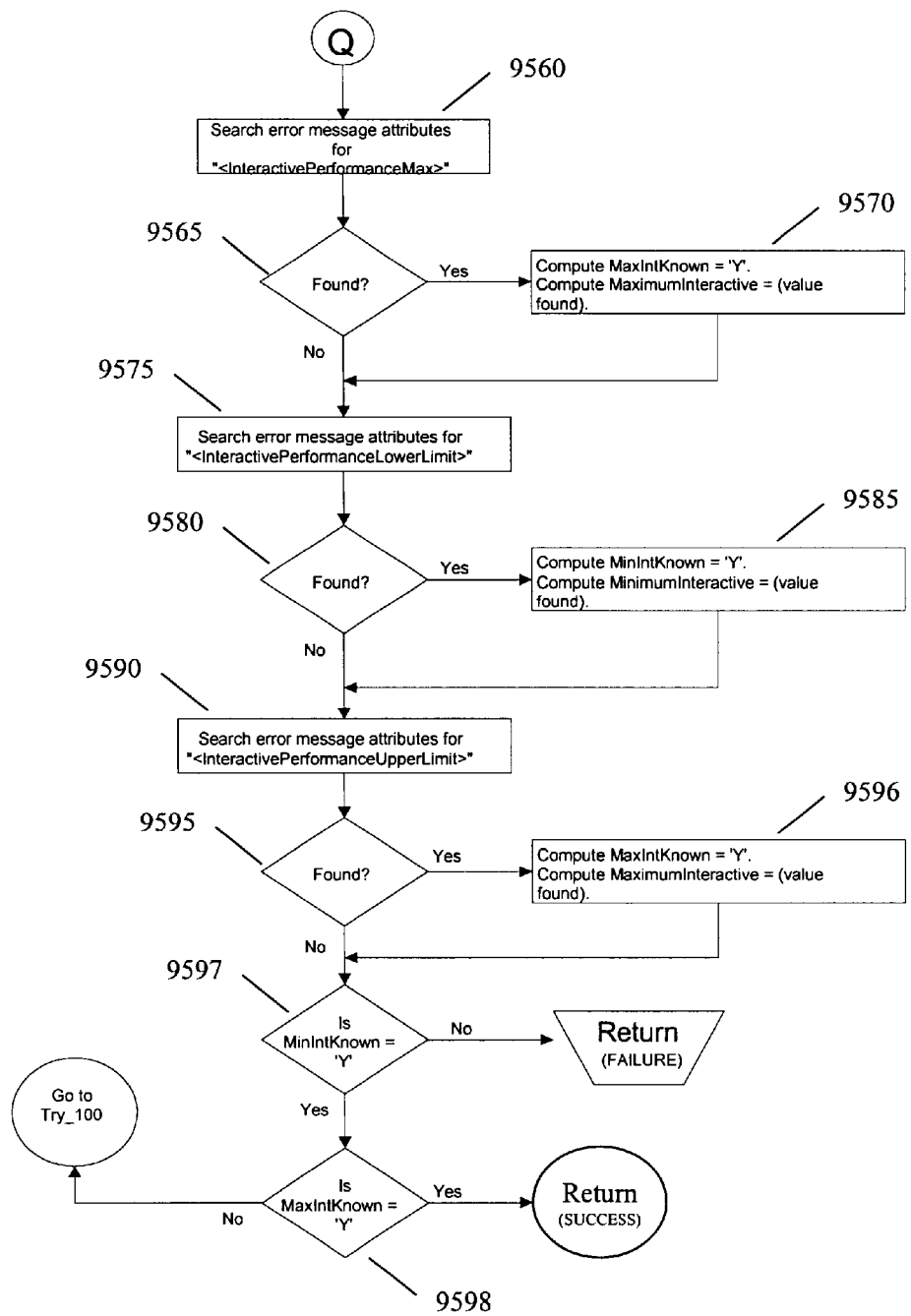

In FIG. 17G, at step 9560, which is also the point labeled "Q", Tuner 1300 searches the error message attributes of the response received from the API for the text shown in that step. If the text was found, then Tuner 1300 computes "MaxIntKnown" and "MaximumInteractive" as shown in step 9570. Following step 9570, processing continues with step 9575. If the text was not found, then processing continues directly with step 9575 where Tuner 1300 searches the error message attributes of the response received from the API for the text shown in that step. If the text was found, then Tuner 1300 computes "MinIntKnown" and "MinimumInteractive" as shown in step 9585. Following step 9585, processing continues with step 9590. If the text was not found, then processing continues directly with step 9590 where Tuner 1300 searches the error message attributes of the response received from the API for the text shown in that step. If the text was found, then Tuner 1300 computes "MaxIntKnown" and "MaximumInteractive" as shown in step 9596. Following step 9596, processing continues with step 9597. If the text was not found, then processing continues directly with step 9597 where Tuner 1300 determines if"MinIntKnown"="Y". If this determination is negative, processing ends and the validity table creation task terminates indicating failure. If this determination is positive, then Tuner 1300 determines whether "MaxIntKnown"="Y", step 9598. If this determination is positive, then processing returns to FIG. 17A and step 9600. If this determination is negative, then processing continues with FIG. 17F at the point labeled "Try_100" which is also step 9535.

The process of FIGS. 17A–17G creates a table for a given system where each entry of the table provides minimum and maximum interactive amounts that may be validly allocated in combination with each allocatable amount of processor power. The following is an excerpt of such a table containing sample values:

| CPU power (processor units) | Minimum Interactive Performance % | Maximum Interactive Performance % |
|---|---|---|
| 0.10 | 4 | 100 |
| 0.11 | 4 | 100 |
| 0.12 | 5 | 100 |
| 0.13 | 5 | 100 |
| 0.14 | 5 | 100 |
| 0.15 | 6 | 100 |
| 0.16 | 6 | 100 |
| . . . | . . . | . . . |

If desired, the validity table creation task may then use a validity table having a processor power—interactive power range format, as shown above, to derive another validity table having an interactive power—processor power range format, as shown in Tables 7A and 7B of FIGS. 13A and 13B, respectively. This may be done as follows:

1. Attempt to find the lowest row and highest row that will accommodate each allocatable amount of interactive power (e.g., each percentage from 1 to 100);
2. For a given amount of interactive power, if there is no lowest or highest row in the table having a processor power—interactive power range format that will accommodate the given amount of interactive power, then the given amount of interactive power is not a valid data point for the table of interactive power—processor power range format;
3. For a given amount of interactive power, if there is a lowest row and a highest row in the table of processor power—interactive power range format that will accommodate the given amount of interactive power, then the processor values from these lowest and highest rows are used to create an entry in the table of interactive power—processor power range format where values from these lowest and highest rows form the low and high limits of the processor range corresponding to the given amount of interactive power.

For example, referring to the table excerpt above, for a given amount of interactive power of 5%, this amount of interactive power would be accommodated by the first 5 rows of the table. Consequently, an entry in a validity table of interactive power—processor power range format would include an interactive power allocation amount of 5% and a corresponding processor power range of 0.10 processor units to 0.14 processor units.

Handling of Remainder Resources

In the P/I tuning task, for example, as described in FIG. 10 and FIGS. 15A, 15B, and 15C, the processor power and interactive power changes that are finally determined (the "Final P/I Changes"), e.g., the changes that would be implemented in step 6900 in FIG. 10 and FIG. 15C, may not fully utilize all processor power or interactive power available for assignment, e.g., there may be processor power or interactive power or both that is "left over" or remaining. In such circumstances, it may be desirable to distribute, to the extent possible, these remaining resources.

Figure 18A:
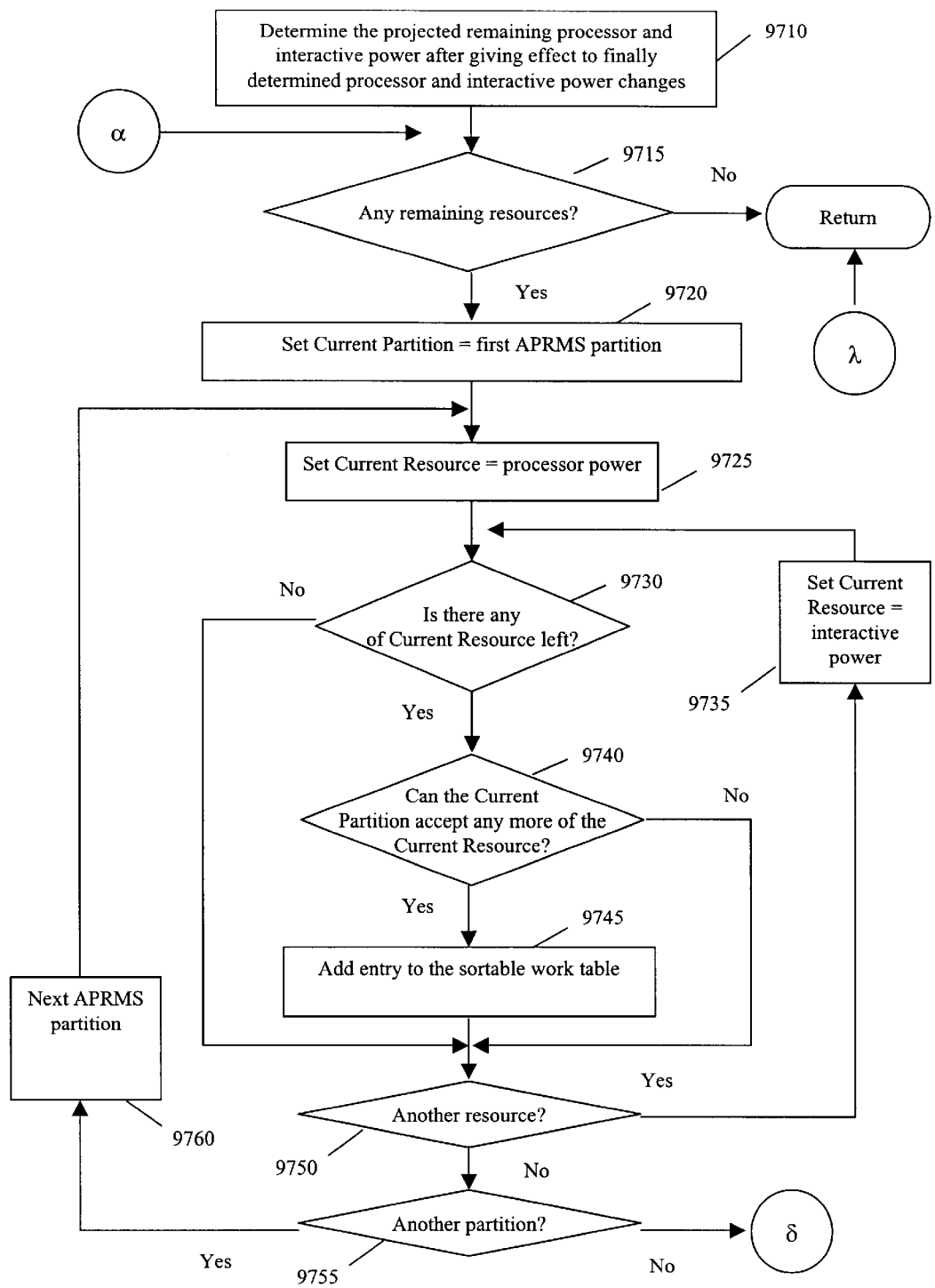
FIGS. 18A and 18B present a flowchart showing an operative embodiment of the present invention related to the distribution of remaining resources.
Figure 18B:
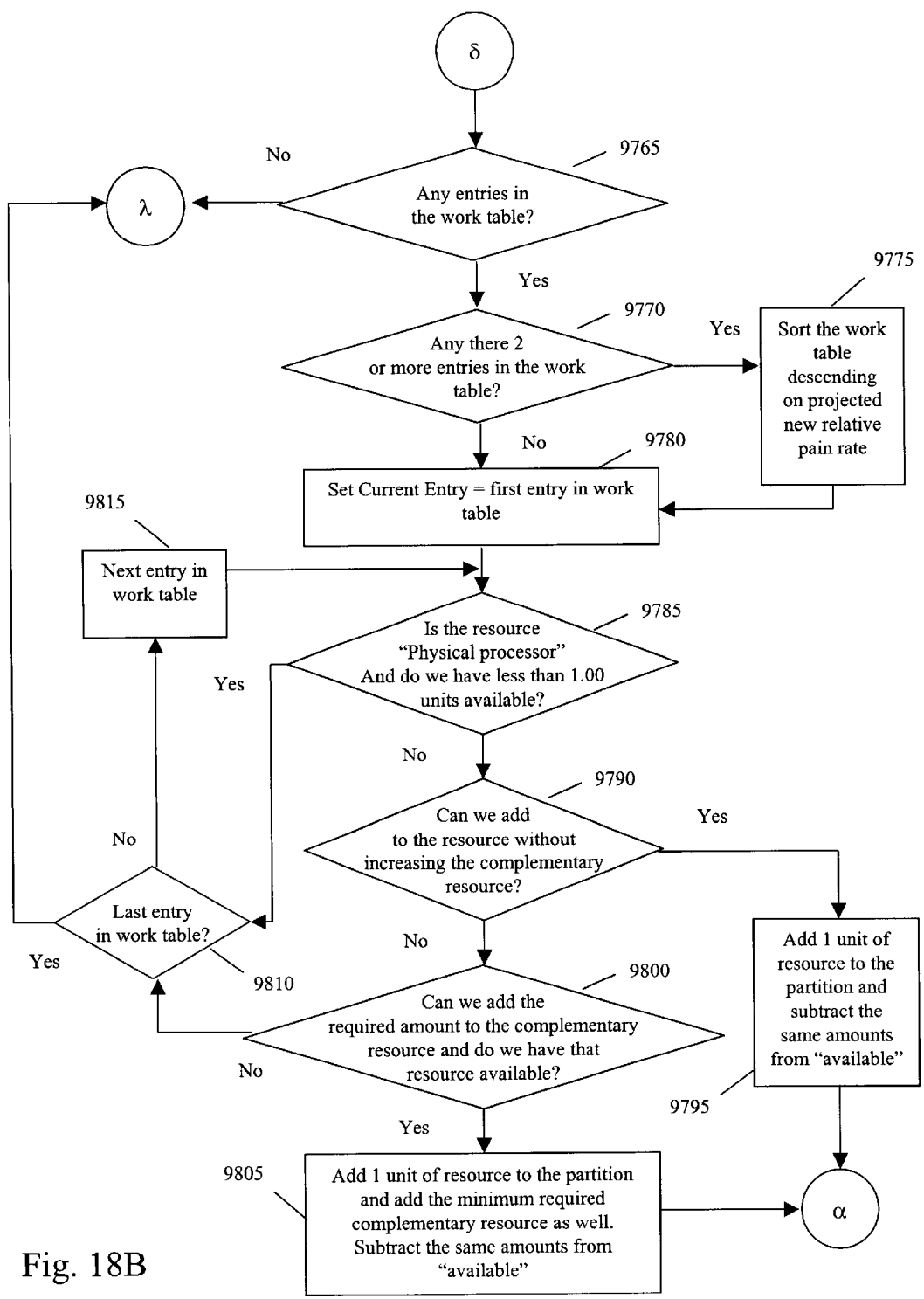

One technique for accomplishing this is the process shown in the flowchart of FIGS. 18A and 18B, which may be called the Remaining Resource Distributor. It should be noted that the process of FIGS. 18A and 18B for distributing remaining resources may be executed after the Final P/I Changes have been determined, but before they are implemented. For example, step 6900 in FIG. 10 or FIG. 15C may call the process of FIGS. 18A and 18B as an initial sub-step prior to causing the Final P/I Changes to be implemented.

Returning to FIG. 18A, Tuner 1300 first determines the projected resources that would remain after giving effect to the Final P/I Changes, step 9710. The remaining processor power may be calculated as the sum of the unassigned processor power to be considered for allocation and the total processor power losses from the Final P/I Changes minus the total processor power gains from the Final P/I Changes. Similarly, the remaining interactive power may be calculated as the sum of the unassigned interactive power to be considered for allocation and the total interactive power losses from the Final P/I Changes minus the total interactive power gains from the Final P/I Changes.

Next, Tuner 1300 determines whether there are any remaining resources, step 9715. For example, Tuner 1300 may determine whether there is any remaining processor power or remaining interactive power or both. If there are no remaining resources, then the Remaining Resource Distributor terminates and processing returns to the task which called the Remaining Resource Distributor to be executed, e.g., processing may return to step 6900 of FIG. 10 or FIG. 15C. If there are remaining resources, e.g., if there is remaining processor power or remaining interactive power or both, then Tuner 1300 sets Current Partition to the first APRMS partition, step 9720, and then sets Current Resource to processor power, step 9725.

Then, Tuner 1300 determines whether there is any amount remaining of the Current Resource, step 9730. For example if the Current Resource is processor power, Tuner 1300 would determine at this step whether there is any amount remaining processor power left. If there is no amount of Current Resource left, then processing continues with step 9750, described below. If the determination of step 9730 is positive, then processing continues with step 9740.

In step 9740, Tuner 1300 determines whether the Current Partition can accept any amount of the Current Resource. Tuner 1300 makes this determination in accordance with the one or more resource allocation rules C1 and P1 through P5 described previously. If Tuner 1300 determines that the Current Partition cannot accept any additional amount of the Current Resource without violating one or more of the resource allocation rules, then processing continues with step 9750, described below. However, if in step 9740, Tuner 1300 determines that the Current Partition can accept amounts of the Current Resource remaining without violating any of the resource allocation rules, then processing continues with step 9745.

In step 9745, Tuner 1300 adds an entry in a sortable work table. This entry may contain one or more of the following: (1) the partition number of the Current Partition; (2) a projected relative pain rate for the Current Partition, e.g., the relative pain rate for the Current Partition with respect to the Current Resource (determined as discussed above in connection with step 5000 of FIG. 9) that would result if the Final P/I Changes were to be implemented; (3) the identity of the Current Resource, e.g., processor power or interactive power; and (4) if Current Resource is processor power, whether the Current Partition is configured for whole processors or shared processors.

Following steps 9730, 9740, or 9745, processing continues with step 9750 where Tuner 1300 determines whether there is another resource. For example, if Current Resource is currently set to processor power, then Current Resource is reset to interactive power, step 9735, and processing goes back to step 9730. If Current Resource is current set to interactive power, then processing continues with step 9755 where Tuner 1300 determines whether there are any APRMS partitions remaining. If there are APRMS partitions remaining, then Current Partition is set to the next APRMS partition, step 9760, and processing goes back to step 9725. However, if it is determined in step 9755 that there are no more APRMS partitions remaining, then processing continues with FIG. 18B and step 9765.

Referring to FIG. 18B, at step 9765, Tuner 1300 determines whether there are any entries in the sortable work table. If there are no entries in the work table, then the Remaining Resource Distributor terminates and processing returns to the task which called the Remaining Resource Distributor to be executed, e.g., processing may return to step 6900 of FIG. 10 or FIG. 15C. If there are entries in the work table, Tuner 1300 then determines whether there are 2 or more entries in the work table, step 9770. If this determination is positive, then Tuner 1300 sorts the entries in the work table to place the entries in descending order based on the values for projected new relative pain rate, step 9775. Processing then continues with step 9780. Alternatively, if the determination in step 9770 is negative, then processing continues directly with step 9780, where Tuner 1300 sets Current Entry to the first entry in the work table.

Next, in step 9785, Tuner 1300 determines (1) whether the resource identified in the Current Entry is processor power and whole processors, and (2) whether the amount of remaining processor power is less than 1.00 units. If this determination is positive, then processing continues with step 9810, discussed below. If this determination is negative, then processing continues with step 9790.

At step 9790, Tuner 1300 determines, with respect to the resource identified in the Current Entry, whether any amount of that resource can be added to the partition identified in the Current Entry without increasing the complementary resource (e.g., processor power may be the complementary resource for interactive power and vice versa). Tuner 1300 makes this determination using the validity table, as described previously. For example, if the resource identified in the Current Entry is interactive power, then Tuner 1300 determines the projected interactive allocation as the current amount of interactive power allocated to the partition identified in the current entry modified by any Final P/I Change of interactive power for this partition. Also, Tuner 1300 may determine the projected processor power allocation as the current amount of processor power allocated to this partition modified by any Final P/I Change of processor power for this partition. Using the validity table, Tuner 1300 can determine whether if the projected interactive allocation is increased, e.g., by a single allocation amount (which for interactive power, may be 1%), does the projected processor power allocation still fall within the valid processor power range for the increased amount. If so, then the determination of step 9790 would be positive, otherwise it would be negative.

If the determination in step 9790 is positive, then, in step 9795, Tuner 1300 adds 1 unit of the resource identified in the Current Entry (e.g., 1% of interactive power, 0.01 shared processors, or 1.00 whole processors) to be allocated to the partition identified in the Current Entry. Tuner 1300 also subtracts the amount added from the amount of that resource remaining. Processing then goes back to FIG. 18A and step 9715.

If the determination in step 9790 is negative, then processing continues with step 9800 where Tuner 1300 identifies the amount of complementary resource that would be needed to be added to the complementary resource projected for this partition to allow the resource identified in the Current Entry to be increased (as per previous step 9790), and then Tuner 1300 determines (1) whether this amount of complementary resource can be added to this partition without violating any of the resource allocation rules C1 and P1–P5, and (2) whether this amount of complementary resource is less than the amount remaining of that resource. If this determination is negative, then processing continues with step 9810, described below.

If the determination in step 9800 is positive, then, in step 9805, Tuner 1300 adds to the amounts to be allocated to the partition identified in the Current Entry: (a) 1 unit of the resource identified in the Current Entry (e.g., 1% of interactive power, 0.01 shared processors, or 1.00 whole processors); and (b) the amount of complementary resource identified in step 9800. Then, Tuner 1300 subtracts the amount added of the resource identified in the Current Entry from the amount of that resource remaining and Tuner 1300 also subtracts the amount of the complementary resource added from the amount of that resource remaining. Processing then goes back to FIG. 18A and step 9715.

Following either steps 9785 or 9800, in step 9810, Tuner 1300 determines whether the Current Entry is the last entry in the work table. If this determination is negative, then the next entry in the work table is obtained, step 9815, and processing then goes back to step 9785. If the determination in step 9810 is positive, then the Remaining Resource Distributor terminates and processing returns to the task which called the Remaining Resource Distributor to be executed, e.g., processing may return to step 6900 of FIG. 10 or FIG. 15C.

It should be noted that the Remaining Resource Distributor of FIGS. 18A and 18B may also be used to distribute remaining memory resources, e.g., where the memory changes that are finally determined (e.g., the memory changes that would be implemented in step 4900 of FIG. 5 and FIG. 8) may not fully utilize all the memory resources available for assignment. Where the Remaining Resource Distributor is used for memory, the process of FIGS. 18A and 18B may be simplified by, for example, performing the process loop of steps 9720 through 9760 for only the single resource of memory, and noting that there is no complementary resource to memory, and so, certain steps in FIG. 18B are never performed, such as steps 9785, 9800, and 9805.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for managing the memory of a computer system having a plurality of partitions, wherein the memory of the computer system is distributively assigned among the plurality of partitions, the method comprising:

obtaining, for each of two or more partitions of the plurality of partitions, a value that describes the degree to which computing performance in the respective partition is being degraded due to a lack of memory in relation to the other partitions of the two or more partitions; and allocating memory among one or more of the two or more partitions so that future values expected to be obtained for each of the two or more partitions after the implementation will be more evenly distributed among each of the two or more partitions than the current values are distributed among each of the two or more partitions.

2. The method of claim 1, wherein the step of allocating comprises allocating unassigned and available memory.

3. The method of claim 1, wherein the step of allocating comprises reallocating memory from one or more of the two or more partitions.

4. The method of claim 1, wherein the step of allocating comprises:

creating a memory allocation plan that provides a suggested memory change for each of the one or more of the two or more partitions, where the plan, if implemented, would cause future values expected to be obtained for each of the two or more partitions after the implementation to be more evenly distributed among each of the two or more partitions than the current values are distributed among each of the two or more partitions;

checking each suggested memory change against one or more rules and modifying the respective suggested memory change to conform to any rules that are violated;

adjusting the suggested memory changes to accommodate available memory; and causing the suggested memory changes to be implemented.

5. A method for managing the memory of a computer system including storage devices, computer processor power, and a plurality of partitions, wherein the memory, storage devices, and computer processor power of the computer system are distributively assigned among the plurality of partitions, and wherein the computer system uses the storage devices assigned to each partition to supplement the memory assigned to the respective partition, the method comprising:

for each of two or more partitions of the plurality of partitions:

providing a first measurement related to the frequency with which storage devices assigned to the respective partition are used to supplement memory in the respective partition;

providing a second measurement related to the efficiency with which the storage devices assigned to the respective partition supplement memory in the respective partition;

providing a third measurement related to the rate at which the computer processor power assigned to the respective partition is used;

calculating a memory pain value representing the degree to which computing performance in the respective partition is being degraded due to a lack of memory, the memory pain value being directly related to the first measurement and indirectly related to the second and third measurements;

receiving a priority value for the respective partition;

calculating a relative priority value for the respective partition that describes the priority value of the respective partition in relation to the priority value of the other partitions of the two or more partitions;

calculating a relative memory pain value that relates the memory pain value of the respective partition with the memory pain values of each other of the two or more partitions, the relative memory pain value being directly related to the memory pain value for the respective partition and the relative priority value calculated for the respective partition; and allocating memory among one or more of the two or more partitions so that future relative memory pain values expected to be obtained for each of the two or more partitions after the allocation will be more evenly distributed among each of the two or more partitions than the current relative memory pain values are distributed among each of the two or more partitions.

6. The method of claim 5, wherein the step of allocating comprises allocating unassigned and available memory.

7. The method of claim 5, wherein the step of allocating comprises reallocating memory from one or more of the two or more partitions.

8. The method of claim 5, wherein the step of allocating comprises:

creating a memory allocation plan that provides a suggested memory change for each of the one or more of the two or more partitions, where the plan, if implemented, would cause future relative memory pain values expected to be obtained for each of the two or more partitions after the implementation to be more evenly distributed among each of the two or more partitions than the current relative memory pain values are distributed among each of the two or more partitions;

checking each suggested memory change against one or more rules and modifying the respective suggested memory change to conform to any rules that are violated;

adjusting the suggested memory changes to accommodate available memory; and causing the suggested memory changes to be implemented.

9. A system for managing the memory of a computer system having a plurality of partitions, wherein the memory of the computer system is distributively assigned among the plurality of partitions, the system comprising:

means for obtaining, for each of two or more partitions of the plurality of partitions, a value that describes the degree to which computing performance in the respective partition is being degraded due to a lack of memory in relation to the other partitions of the two or more partitions; and means for allocating memory among one or more of the two or more partitions so that future values expected to be obtained for each of the two or more partitions after the implementation will be more evenly distributed among each of the two or more partitions than the current values are distributed among each of the two or more partitions.

10. The system of claim 9, wherein the means for allocating comprises means for allocating unassigned and available memory.

11. The method of claim 9, wherein the means for allocating comprises means for reallocating memory from one or more of the two or more partitions.

12. The system of claim 9, wherein the means for allocating comprises:

means for creating a memory allocation plan that provides a suggested memory change for each of the one or more of the two or more partitions, where the plan, if implemented, would cause future values expected to be obtained for each of the two or more partitions after the implementation to be more evenly distributed among each of the two or more partitions than the current values are distributed among each of the two or more partitions;

means for checking each suggested memory change against one or more rules and modifying the respective suggested memory change to conform to any rules that are violated;

means for adjusting the suggested memory changes to accommodate available memory; and means for causing the suggested memory changes to be implemented.

13. A system for managing the memory of a computer system including storage devices, computer processor power, and a plurality of partitions, wherein the memory, storage devices, and computer processor power of the computer system are distributively assigned among the plurality of partitions, and wherein the computer system uses the storage devices assigned to each partition to supplement the memory assigned to the respective partition, the system comprising:

means for providing, for each of two or more partitions of the plurality of partitions, a first measurement related to the frequency with which storage devices assigned to the respective partition are used to supplement memory in the respective partition;

means for providing, for each of two or more partitions of the plurality of partitions, a second measurement related to the efficiency with which the storage devices assigned to the respective partition supplement memory in the respective partition;

means for providing, for each of two or more partitions of the plurality of partitions, a third measurement related to the rate at which the computer processor power assigned to the respective partition is used;

means for calculating, for each of two or more partitions of the plurality of partitions, a memory pain value representing the degree to which computing performance in the respective partition is being degraded due to a lack of memory, the memory pain value being directly related to the first measurement and indirectly related to the second and third measurements;

means for receiving, for each of two or more partitions of the plurality of partitions, a priority value for the respective partition;

means for calculating, for each of two or more partitions of the plurality of partitions, a relative priority value for the respective partition that describes the priority value of the respective partition in relation to the priority value of the other partitions of the two or more partitions;

means for calculating, for each of two or more partitions of the plurality of partitions, a relative memory pain value that relates the memory pain value of the respective partition with the memory pain values of each other of the two or more partitions, the relative memory pain value being directly related to the memory pain value for the respective partition and the relative priority value calculated for the respective partition; and means for allocating memory among one or more of the two or more partitions so that future relative memory pain values expected to be obtained for each of the two or more partitions after the allocation will be more evenly distributed among each of the two or more partitions than the current relative memory pain values are distributed among each of the two or more partitions.

14. The system of claim 13, wherein the means for allocating comprises means for allocating unassigned and available memory.

15. The system of claim 13, wherein the means for allocating comprises means for reallocating memory from one or more of the two or more partitions.

16. The system of claim 13, wherein the means for allocating comprises:

means for creating a memory allocation plan that provides a suggested memory change for each of the one or more of the two or more partitions, where the plan, if implemented, would cause future relative memory pain values expected to be obtained for each of the two or more partitions after the implementation to be more evenly distributed among each of the two or more partitions than the current relative memory pain values are distributed among each of the two or more partitions;

means for checking each suggested memory change against one or more rules and modifying the respective suggested memory change to conform to any rules that are violated;

means for adjusting the suggested memory changes to accommodate available memory; and means for causing the suggested memory changes to be implemented.

17. A computer program product comprising a computer usable medium having computer readable code embodied therein, the computer readable code, when executed, causing a computer to implement a method for managing the memory of a computer system having a plurality of partitions, wherein the memory of the computer system is distributively assigned among the plurality of partitions, the method comprising:

obtaining, for each of two or more partitions of the plurality of partitions, a value that describes the degree to which computing performance in the respective partition is being degraded due to a lack of memory in relation to the other partitions of the two or more partitions; and allocating memory among one or more of the two or more partitions so that future values expected to be obtained for each of the two or more partitions after the implementation will be more evenly distributed among each of the two or more partitions than the current values are distributed among each of the two or more partitions.

18. The computer program product of claim 17, wherein the step of allocating comprises allocating unassigned and available memory.

19. The computer program product of claim 17, wherein the step of allocating comprises reallocating memory from one or more of the two or more partitions.

20. The computer program product of claim 17, wherein the step of allocating comprises:

creating a memory allocation plan that provides a suggested memory change for each of the one or more of the two or more partitions, where the plan, if implemented, would cause future values expected to be obtained for each of the two or more partitions after the implementation to be more evenly distributed among each of the two or more partitions than the current values are distributed among each of the two or more partitions;

checking each suggested memory change against one or more rules and modifying the respective suggested memory change to conform to any rules that are violated;

adjusting the suggested memory changes to accommodate available memory; and causing the suggested memory changes to be implemented.

21. A computer program product comprising a computer usable medium having computer readable code embodied therein, the computer readable code, when executed, causing a computer to implement a method for managing the memory of a computer system including storage devices, computer processor power, and a plurality of partitions, wherein the memory, storage devices, and computer processor power of the computer system are distributively assigned among the plurality of partitions, and wherein the computer system uses the storage devices assigned to each partition to supplement the memory assigned to the respective partition, the method comprising:

for each of two or more partitions of the plurality of partitions:

providing a first measurement related to the frequency with which storage devices assigned to the respective partition are used to supplement memory in the respective partition;

providing a second measurement related to the efficiency with which the storage devices assigned to the respective partition supplement memory in the respective partition;

providing a third measurement related to the rate at which the computer processor power assigned to the respective partition is used;

calculating a memory pain value representing the degree to which computing performance in the respective partition is being degraded due to a lack of memory, the memory pain value being directly related to the first measurement and indirectly related to the second and third measurements;

receiving a priority value for the respective partition;

calculating a relative priority value for the respective partition that describes the priority value of the respective partition in relation to the priority value of the other partitions of the two or more partitions;

calculating a relative memory pain value that relates the memory pain value of the respective partition with the memory pain values of each other of the two or more partitions, the relative memory pain value being directly related to the memory pain value for the respective partition and the relative priority value calculated for the respective partition; and allocating memory among one or more of the two or more partitions so that future relative memory pain values expected to be obtained for each of the two or more partitions after the allocation will be more evenly distributed among each of the two or more partitions than the current relative memory pain values are distributed among each of the two or more partitions.

22. The computer program product of claim 21, wherein the step of allocating comprises allocating unassigned and available memory.

23. The computer program product of claim 21, wherein the step of allocating comprises reallocating memory from one or more of the two or more partitions.

24. The computer program product of claim 21, wherein the step of allocating comprises:

creating a memory allocation plan that provides a suggested memory change for each of the one or more of the two or more partitions, where the plan, if implemented, would cause future relative memory pain values expected to be obtained for each of the two or more partitions after the implementation to be more evenly distributed among each of the two or more partitions than the current relative memory pain values are distributed among each of the two or more partitions;

checking each suggested memory change against one or more rules and modifying the respective suggested memory change to conform to any rules that are violated;

adjusting the suggested memory changes to accommodate available memory, and causing the suggested memory changes to be implemented.

* * * * *